(12) United States Patent
Abecassis

(10) Patent No.: US 6,408,128 B1
(45) Date of Patent: Jun. 18, 2002

(54) REPLAYING WITH SUPPLEMENTARY INFORMATION A SEGMENT OF A VIDEO

(76) Inventor: Max Abecassis, 19020 NE. 20 Ave., Miami, FL (US) 33179

(*) Notice: Subject to any disclaimer, the term of this patent is extended or adjusted under 35 U.S.C. 154(b) by 0 days.

(21) Appl. No.: 09/190,773

(22) Filed: Nov. 12, 1998

(51) Int. Cl.$^7$ ............................ H04N 5/91; H04N 7/04; H04N 7/06; H04N 7/08; H04N 7/52
(52) U.S. Cl. ............................ 386/68; 386/81; 386/95; 386/125
(58) Field of Search ............................ 386/1, 45, 46, 386/95, 97, 125–126, 69–70; 725/88–89, 102, 136

(56) References Cited

U.S. PATENT DOCUMENTS

| | | | |
|---|---|---|---|
| 4,305,131 A | * 12/1981 | Best | |
| 5,371,532 A | * 12/1994 | Gelman et al. | 348/7 |
| 5,371,551 A | * 12/1994 | Logan et al. | 348/571 |
| 5,434,678 A | 7/1995 | Abecassis | 358/342 |
| 5,598,276 A | 1/1997 | Coouson et al. | 386/46 |
| 5,610,653 A | 3/1997 | Abecassis | 348/110 |
| 5,630,006 A | 5/1997 | Hirayama et al. | 386/92 |
| 5,636,200 A | 6/1997 | Taira et al. | 369/275.3 |
| 5,644,507 A | 7/1997 | Ostrover et al. | 364/514 R |
| 5,648,918 A | * 7/1997 | Hubbard | 702/107 |
| 5,696,869 A | 12/1997 | Abecassis | 386/52 |
| 5,737,479 A | 4/1998 | Fujinami | 386/95 |
| 5,745,643 A | 4/1998 | Mishina | 386/106 |
| 5,828,370 A | * 10/1998 | Moeller et al. | 345/328 |
| 6,018,612 A | * 1/2000 | Thomason et al. | 386/82 |
| 6,058,239 A | * 5/2000 | Doyle | 386/46 |
| 6,289,165 B1 | * 9/2001 | Abecassis | 386/46 |
| 6,311,155 B1 | * 10/2001 | Vaudrey et al. | 704/225 |

OTHER PUBLICATIONS

RCA Digital Video Disc Player RC5200P User's Manual, 1996.

* cited by examiner

Primary Examiner—Andrew B. Christensen
Assistant Examiner—Polin Chieu

(57) ABSTRACT

A method of, and a system capable of, replaying a portion of a video comprising the steps of, and the means for receiving, during a playing of a video, a replay request to replay a portion of a video, the replay request comprising a voice command; storing a request position of the playing of the video responsive to the replay request; skipping, responsive to the replay request, the video to a replay position that is responsive to a preestablished replay preference amount adjusted by segment information subject to an override range; enabling a playing of supplementary information; playing the video and the supplementary information from the replay position; and discontinuing the playing of supplementary information responsive to the request position responsive to a preestablished replay preference amount adjusted by segment information subject to an override range. The supplementary information including, for example, subtitles, substitution of the audio language, different camera angles, other textual, video, and/or audio information that may supplement, complement, the information being played, and/or substitute, the audio dialogue and/or segment of a video; and/or any information which may be utilized to elucidate, illuminate, illustrate, clarify, and/or explain, during a replay, a portion of a video.

36 Claims, 27 Drawing Sheets

Segment Category Descriptive Structure

| Code | Description | None | Implied | Explicit | Graphic |
|---|---|---|---|---|---|
| 110 | Profanity | 1 | 2 | 3 | 4 |
| 130 | Violence | 1 | 2 | 3 | 4 |
| 135 | Bloodshed | 1 | 2 | 3 | 4 |
| 150 | Monsters | 1 | 2 | 3 | 4 |
| 170 | Nudity | 1 | 2 | 3 | 4 |
| 175 | Sex | 1 | 2 | 3 | 4 |

FIG. 5B

Segment Element Descriptive Structure

| Code | Description | None | Minimal | Expanded | Extensive |
|---|---|---|---|---|---|
| 210 | Character | 1 | 2 | 3 | 4 |
| 220 | Location | 1 | 2 | 3 | 4 |
| 230 | Time | 1 | 2 | 3 | 4 |
| 340 | Detail | 1 | 2 | 3 | 4 |
| 420 | Expertise | 1 | 2 | 3 | 4 |

FIG. 5C

Segment Inclusion Descriptive Structure

| Code | Description | Highlight | Summary | Condensed | Detailed |
|---|---|---|---|---|---|
| 610 | Inclusion | 1 | 2 | 3 | 4 |

FIG. 5D

Segment Generalized Descriptive Structure

| G | PG | PG-13 | R | NC-17 |
|---|---|---|---|---|

Symbols MPAA Trademark

FIG. 5E

↑ ANGLE CHANGE

↑ ANGLE CHANGE

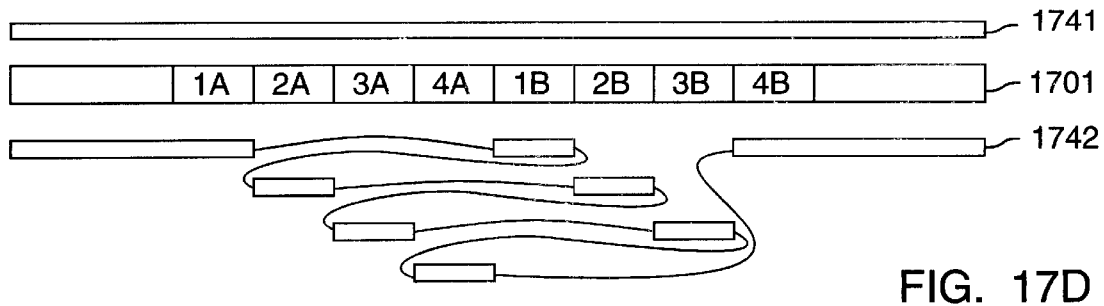
FIG. 17D
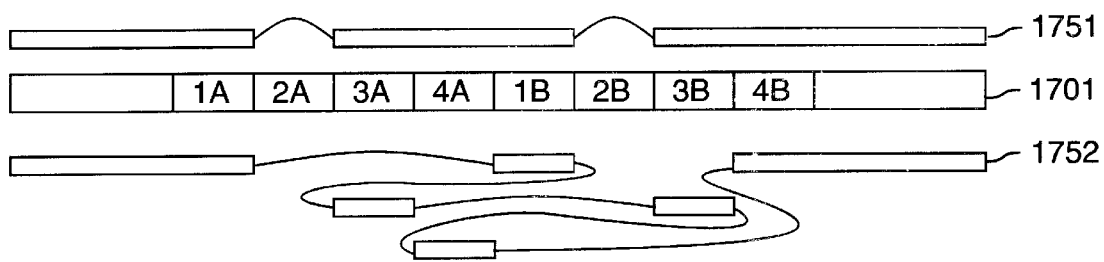
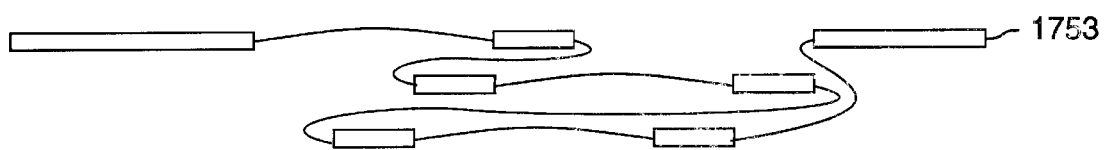
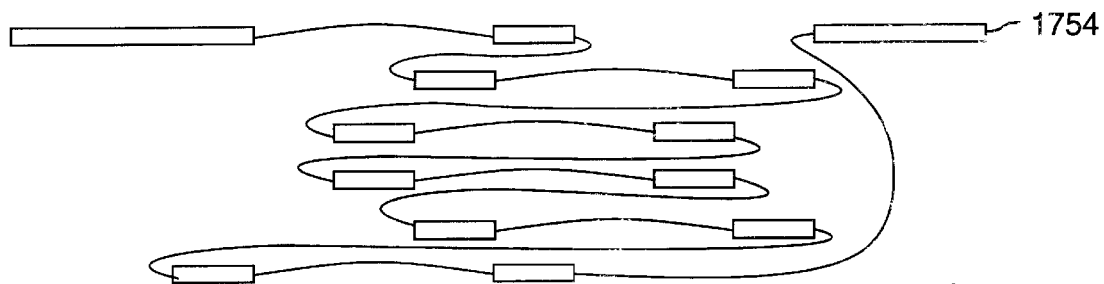
FIG. 17E

REPLAYING WITH SUPPLEMENTARY INFORMATION A SEGMENT OF A VIDEO

BACKGROUND OF THE INVENTION

1. Field of the Invention.

Systems for, and a methods of, processing, random accessing, buffering, and playing a video utilizing the information provided by a video map, where the source of the video and video map are, for example, a DVD, a DBS, and/or video-on-demand transmission, and where the means for playing the video comprises, for example, a DVD player, a personal computer, a set box, and/or a multimedia player.

2. Description of the Related Art.

A DVD (Digital Video Disc/Disk or Digital Versatile Disk) is a random access optical disc similar in physical dimensions to a CD with substantially more data storage capacity. A DVD can store one full length motion picture in one of two layers on either side of the disc. Many DVDs include subtitles and/or closed captioning in a plurality of languages for a motion picture stored in a DVD, multiple camera angles for a scene, and the capability to play one of a plurality of different content versions (e.g. a director's cut or unrated version and an "R" rated versions.

Devices capable of playing DVDs provide for, among other features, capabilities for fast-forward, fast rewind, skip-forward to the beginning of the next chapter, and to skip-backwards to the beginning of the current chapter and a previous chapter, the option to turn on/off the subtitles, and if turned on, to select the language of the subtitle, select language of the audio, cameral angles, and multiple content versions.

While the DVD format provides many capabilities and functions exceeding those provided by, for example, the VHS format, as a result of concepts rooted in the conventional linearity of motion pictures, many of the capabilities and functions specified do not fully realize the potential of a randomly accessible digital video, audio, and data format.

SUMMARY OF THE INVENTIONS

By contrast to the passive playing of videos, as in the viewing of a motion picture, or the interactive playing of a video, as in the playing of a computer game, a primary element of the "autoactive" systems and methodologies disclosed herein is the incorporation of capabilities and environments that automatically customize the playing of videos to satisfy the particular video requirement of each of a plurality of viewers, and that deliver to each viewer a more enjoyable video experience without requiring the level of active participation inherent in interactive systems, the use of personal computers, and/or by primitive consumer electronic products.

Accordingly, it is an object to provide a multimedia multisource receiver transmitter player comprising random access and communications capabilities integrating video and communication services.

It is also an object to provide a remote control device with the functionality required to control a multimedia multisource receiver transmitter player comprising random access and communications capabilities integrating video and communication services.

It is also an object to provide for a labeling of keys consistent with the functionality required to control a multimedia multisource receiver transmitter player comprising random access and communications capabilities integrating video and communication services.

It is also an object to provide for the automated selective retrieval of non-sequentially stored, parallel, transitional, and overlapping video segments from a single variable content video source, responsive to the viewer's video content preferences, and transmits the selected segments as a logical, seamless, and continuous version of the video.

It is also an object to play a version of a video that is highly responsive to a viewer's content preferences, by automatically selecting among parallel, transitional, and overlapping segments included, within the video.

It is also an object to provide content control over, for example, a video's level explicitness, detail, expertise, form of expression, subject matter, element development, and program length.

It is also an object to provide an interactive video game system comprising interactive video game software, variable content game, and a video map defining segments of the variable content game, furnishing a player of the interactive video game the automatic and logical selection of video segments responsive to the application of the player's video content preferences to the video map, and responsive to the logic of the interactive video game software.

It is also an object to provide viewers the means of accessing available videos, segments from a video, and or segments from a plurality of videos by the use of keyword or a classification tree structure as would be required by a user accessing a very large database of segments and videos.

It is also an object to provide the means for a viewer to detail the subject matter, story line, and or general content of a desired video so that producers of videos may elect to produce and provide the requested video.

It is also an object to provide a variety of reading architectures that produce a seamless reading of sequential and non-sequential segments of a variable content video from a single video source.

It is also an object to format the video stream, through placement and/or duplication of frames, group of frames, and/or segments to enhance the seamless playing of non-sequential segments.

It is also an object to provide for the playing of multiple play segments of a variable content video.

It is also an object to provide a device that furnishes a previewer, such a parent, the capability for efficiently previewing automatically selected segments from the video, responsive to the established preferences of a viewer, such as a child, to permit the previewer to indicate the inclusion of the selected segments in the video to be viewed by the viewer.

It is also an object to provide automated capabilities for efficiently retrieving and playing only a specified class, category, or subject matter included in segments within the selected video or set of videos as may be available from a database of videos.

It is also an object to integrate communications capabilities and read/write optical disc player capabilities within a single device to facilitate the downloading of a motion picture from a source remote to the player.

It is also an object to provide the means for a viewer to transport video and content preferences to enable autoconfiguring a player.

It is an object to enhance the viewing of a video by providing an elegant means and method for replaying for a viewer a non-understood segment of a video.

It is an object to utilize a video's foreground and background audio elements to provide audio during a video pause.

It is an object to provide for a plurality of fast-forward variable intermittent content skipping methods.

It is an object to provide for an automatic display of a viewer defined target within a video as the target moves relative to the video's host image.

It is an object to provide for a plurality of methods of playing presentation segments of a set of presentation segments of a scene.

It is an object to provide for the integration of a playing of a video with the acceptance of a communication.

Briefly, these and other objects are accomplished by autoactive capabilities and functions provided by systems comprising, and methodologies utilizing, integrated processing, random accessing, and buffering technologies, variable content video structures and configurations, control capabilities, software functions, and video information, such as information that describes, defines, links, and/or combines segments of a video and/or videos, with respect to a plurality of content, technical, and presentation categories, and playing functions, that facilitate the manipulation of the playing of a video, or a plurality of videos, to satisfy a wide range of content, technical, and presentation preferences. Autoactive capabilities and function being provided, whether the source of the video is, for example, a DVD, a DBS, and/or a video-on-demand transmission, and whether the means for playing the video comprises, for example, a DVD player, a personal computer, a set box, and/or a multimedia player.

These and other features, advantages, and objects, are apparent in the context of the detailed description, accompanying drawings, and appended claims, that follow.

BRIEF DESCRIPTION OF THE DRAWINGS

FIGS. 5B, 5C, 5D, and 5E, are illustrations of segment descriptive structures;

FIGS. 17A through 17H illustrate a plurality of methods of playing a set of presentation segments;

FIG. 17I illustrates an example of a fragmenting and looping of a playing of at least one segment of a video.

DESCRIPTION OF THE PREFERRED EMBODIMENTS

Figure 1:
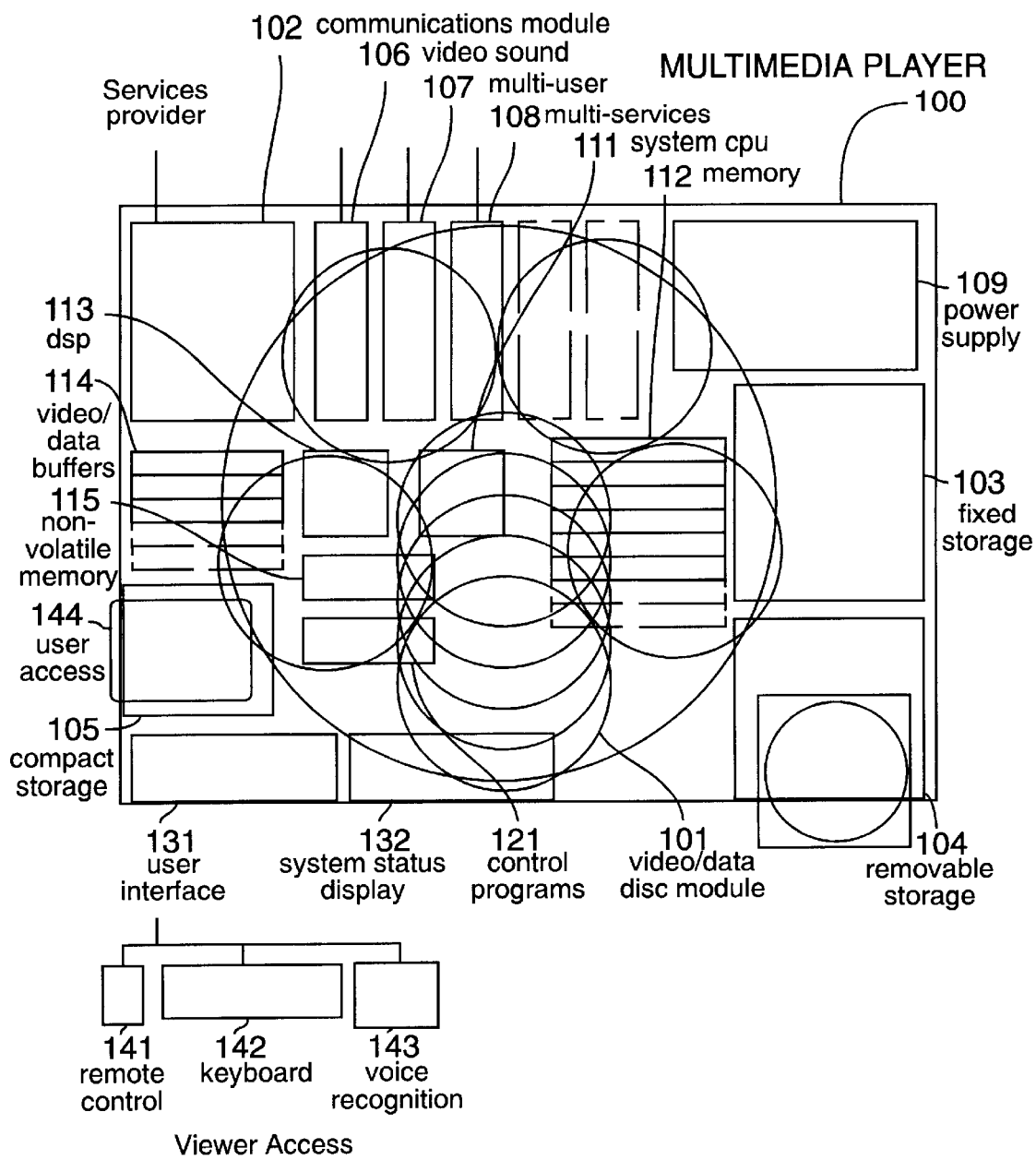
FIG. 1 is a schematic diagram of a multimedia multi-source receiver transmitter player comprising random access and communications capabilities.

The following are incorporated herein by reference: i) subject-matter-related U.S. Pat. Nos. 5,434,678, 5,589,945, 5,610,643, 5,634,849, 5,664,046, 5,684,918, 5,696,869, 5,717,814, and 5,724,472, by the same inventor; ii) U.S. Pat. Nos. 5,636,200, 5,630,006, 5,778,142, 5,745,643, 5,598, 276, 5,644,507, 5,737,479, 5,778,135, and 5,678,012; and iii) the RCA DVD player RC5200P user's manual, 1996.

For purposes of the present disclosure, various terms used in the art are defined as follows:

The term "viewer" as used herein is meant to include and be interchangeable with the words "player" (when referring to a person), "subscriber", and "user". That is, the term "viewer" is to be understood in the general sense of a person passively viewing a video, interactively playing a video game, retrieving video from a video provider, and/or actively using multimedia, internet, and/or communication services.

The terms "video", and "video program" are interchangeable and refer to any video image regardless of the source, motion, or technology implemented. A video comprises still characters, graphics, images, motion pictures, films, interactive electronic games, and multimedia productions; full motion pictures and television programming; news, sports, cultural, entertainment, commercial, advertisements, instructional, and educational programming. A video comprises video, audio, subpicture information, data and other information associated with the video. Unless otherwise qualified to mean a computer software program, the term "program" is interchangeable and may be replaced with the word video. While a particular feature may be detailed with respect to a specified viewing, gaming, or computing application, it is intended to apply the teachings herein broadly and harmoniously across the different classes of applications that generate a video. The teachings herein with respect to a video applied to, for example, movies, news, sports, educational videos, advertisements, informationals, commercials, and other videos for the promotion of products and services.

A video also comprises a "variable content video" and a "variable content game", which are characterized by a nonlinear architecture facilitating a variety of possible logical sequences of segments. A video herein comprises a video map and video/audio/subpicture information including parallel, transitional, and overlapping segments to provide viewing of a program's story-line/interactive action at different levels of forms of expression, levels of detail, and, for example, length, with a greater seamless continuity among non-sequential segments. Additionally a video may include a user interface, software program routines, and system control codes for controlling the playing of the video. The term "segment" refers to a part of the video whether one or a plurality of frames.

The terms "non-sequential" and "nonlinear" are intended in the sense that the video includes within a segment (e.g. an "R" rated segment) presenting a scene in a manner which would normally exclude the playing of another segment (e.g. a "PG" rated segment) with a different presentation (e.g. version) for the same scene. In a physical sense, the segments are "linearly" arranged and one would follow the other, whether immediately or after one or a plurality of other frames and/or segments.

The term "seamless" is intended in the sense that the transmission of sequential and non-sequential frames is indiscernible to the eye, and not in the sense of the natural video seams that result in the intended changes from one scene to another, from one camera angle to the other, or from one gaming sequence to the other.

The term "content preferences" refers, specifically and principally, although not exclusively, to a viewer's preferences for the form of expression, explicitness, the absence of objectionable segments, content categories and levels, length, and detail. The set of content preferences also include "technical preferences" and "presentation preferences" as herein identified. In the broadest sense, the term "content preferences" further comprises video, programming, and subject matter preferences ("programming preferences"). Programming preferences refer exclusively to a viewer's preferences as to specific videos (e.g. Sega's "Sherlock Holmes Consulting Detective"), types of videos (e.g. interactive video detective games), broad subject matter of videos (e.g. mysteries), and/or time and date that the viewer may desire to view a video. Programming preferences are principally directed at the selection of a specific video.

The term "video-on-demand system" refers to any point-cast capable video delivery system that is responsive to a viewer's programming preferences, i.e. provides a viewer-selected video at a viewer-selected time. Video-on-demand comprises for example movies-on-demand, video dialtone, cellular video, and digital satellite systems that are responsive to a viewer's time and date preferences and that usually provide VCR functionality in the viewing of a video.

The term "content-on-demand system" refers to a video-on-demand system that is additionally responsive to a viewer's content preferences. A content-on-demand system not only permits a viewer to obtain a specific program(s) or segment(s) of programs in response to the viewers programming preferences, a content-on-demand system also permits the viewer to receive a customized version of the program(s) or segment(s) of programs that are responsive to the viewer's content preferences. A content-on-demand system and the delivery of variable content video services is independent of the specific hardware and network infrastructure employed.

The term "network" herein refers to any private or public, wired and non-wired video transmission infrastructure, such as may be provided by the utilization of one or a hybrid combination of the following: fiber optic, coaxial cable, twisted copper wire, cellular, radio, satellite, and/or other existing and/or forthcoming video transmission technologies. Examples, include a Broadband Integrated Services Digital Network ("B-ISDN") utilizing fiber optic cable in its primary trunks, a Digital Subscriber Line that promises high bandwidth over twisted copper-pair phone lines, and the internet. In the broadest sense, a network also comprises the utilization of, for example, the U.S. Postal Service to deliver DVDs.

Where not clearly and unambiguously inconsistent with the specific context, these and other terms defined herein are to be understood in the broadest sense.

Preferred embodiments of the various inventive elements disclosed herein utilize a multimedia multisource receiver transmitter player ("Multimedia Player") comprising synergistically integrated random access and communications capabilities. The Multimedia Player comprises the various functions, capabilities and components of a variety of consumer electronic systems including, for example, a DVD player (e.g. Pioneer's DVL-909 DVD/LD Player ), a game system (e.g. Nintendo 64 video game system), a net surfboard (e.g. Philips Magnavox Internet TV Terminal), a Direct Broadcast Satellite ("DBS") receiver (e.g. Sony's SAS-AD3 Digital Satellite System), a multimedia computing device (e.g. Gateway's Destination Digital Media Computer); a nonlinear editing system (e.g. Avid' Media Composer 9000); and a set-top box capable of retrieving video-on-demand services from a remote video services provider (e.g. Scientific-Atlanta's Explorer 2000 digital set-top)

A Multimedia Player permits a viewer to obtain videos, multimedia, and other services from storage means within the Multimedia Player, sources locally accessible, and/or from a remote services provider. Additionally, the Multimedia Player, as per the various inventions detailed herein, comprises the means and operational methods of, for example, i) customizing a playing of a motion picture stored in a DVD; ii) time shifting and customizing the playing of a motion picture obtained from, for example, a DBS transmission; iii) playing real-time audio during a slow-motion and freezing of a motion picture; iv) automatically tracking the subject of a video zoom; v) integrating communications (e.g. phone answering) with a playing (e.g. auto-replay) of a motion picture; and vi) autoconfiguring a host Multimedia Player.

FIG. 1 is a schematic diagram of a fully featured Multimedia Player 100 comprising the following primary modules and subsystems: i) random access video/data disc module (e.g. a multi-disc DVD read/write drive) 101; ii) communications module 102; iii) fixed storage subsystem 103; iv) removable storage subsystem 104; v) compact portable storage subsystem 105; vi) external video/audio input/output support module 106; vii) multi-user modules 107; and viii) multi-services modules 108.

The communications module 102 may be as simple as a modem card or device, or as sophisticated as may be required by a direct fiber optic access to a remote video and communication services provider. The communications module may support a plurality and variety of cabling connections such as fiber optic cable, coaxial cable, and twisted pair copper wire, and the cabling required to access a variety of networks. Additionally, the communications module may support a plurality of competing broadcasts and pointcast video delivery systems. In this fashion by merely depressing the appropriate keys in a remote control device a viewer can easily switch between off the air transmissions and on-line services. By this method a video services provider can satisfy a wide range of video requirements without necessarily utilizing video-on-demand system capacity. In such instances a Multimedia Player may be connected to a local receiving means. The receiving means may be, for a example, an indoor antenna, an outdoor antenna, or an existing system, such as the electrical system, that may serve as an antenna.

The fixed memory subsystem 103 refers to any nonvolatile memory storage device principally utilized to randomly read/write and store significant quantities of information. An example of a fixed memory storage subsystem is a personal computer's hard disk drive.

The removable memory subsystem 104 refers to any nonvolatile memory storage device principally utilized to transport information to and from two similarly equipped devices. Examples of removable memory storage subsystems are personal computer floppy disk drives, micro disk drives, backup tape drives, and removable hard disks. The random access disc module 101 is another example of a removable storage subsystem.

The compact portable storage subsystem 105 and user access media 144 is principally distinguished from a removable storage subsystem 104 by the size of the media and the greater variety of memory storage technologies that are generally implemented. Nonetheless, some of the removable storage media, such as for example a micro disk, are also considered user access media 144. With present technology, user access media is available in dimensions similar to conventional credit cards. Examples of other removable storage media and user access media are: laser read/write cards, in which at least one surface of the card permits a laser to read/write information; electronic cards, in which the information is stored in electronic components; magnetic cards embodying magnetic storage technology, of which a credit card is an example, electronic cartridges commonly utilized in electronic video game systems, smart cards, and PCMCIA cards.

Clearly, a variety of memory devices are available utilizing technologies and combinations of technologies to suit particular performance requirements. The above classifications of the memory devices are directed at bringing attention to functional capabilities of a Multimedia Player rather than to a particular technology. The classifications are not intended to restrict a subsystem to a particular classification, limit the selection of subsystems which may be implemented, or to limit the function of the particular subsystem implemented.

It is intended that a full featured Multimedia Player additionally "play" a variety of laser readable media, such as, DVDs, laser discs, CDs, photo CDs, and interactive videos and games, in a conventional manner. The wide range of video/data discs that may be accommodated and the various configurations are diagrammatically emphasized in FIG. 1 as the five stacked circles and the five circles inside the representation of the video/data disc unit 101.

The external video/audio input/output support module 106 supports video/audio/data transmission to the primary video display system comprising, for example, a monitor/television, stereo system, and keyboard/voice recognition-response. Additionally, the input/output module supports video/audio input from local sources such as for example VCR's, video cameras, and videophones. The construction of the external support module follows the conventional practices of consumer electronic products as for example: DVD players, VCRs, and personal computers.

Multi-user modules 107 principally support separate controlled independent access by other users of the Multimedia Player's processing, video, and communications resources. The construction of multi-user modules following established networking technologies.

In a preferred embodiment, instead of utilizing one of the Windows or Unix operating systems, the Multimedia Player will incorporate a small footprint multi-user multitasking real-time operating system with a streamlined user interface patterned after, for example, the simpler interface of a DBS receiver. A multi-layer approach to the functionality/complexity of such functions as surfing the net; contact management and email, DVD/Internet hybrid games, applications and services; video editing; multimedia and word processing; and portfolio management and banking, are made available at a streamlined level that provides functionality required by most users at a markedly reduced level of complexity. The interface of the cited Web TV is an example.

Multi-services modules 108 provide a host of services, such as for example residential security, and appliance operation management. The operation of the module being principally a software application running under the multi-user operating system implemented. The construction of the particular multi-service module being responsive to the particular application.

The Multimedia Player further comprises computing elements and video processing elements readily found in multimedia devices and video electronic systems such as, for example, and not limitation, microprocessor 111, memory units 112, video processor or digital signal processor (e.g. Chromatic Research's Mpact 2 media processor) 113, video, audio, and data buffers 114, and nonvolatile memory 115.

The video audio module or board 106 and the video processor 113 comprise compression-decompression technologies to both retrieve and decompress videos and compress and transmit videos. The compression technologies may include hardware, firmware, software, or any combination of these. One or a plurality of existing and forthcoming video compression methods may be implemented such as: Motion-JPEG, MPEG 1, MPEG 2, Fractals, and Wavelets. It should be appreciated that as more media becomes available in a digitally compressed format from a variety of sources, for example, DBS, DVD, digital camcorders, resident compression capability becomes less necessary.

A Multimedia Player's control programs that manage the Multimedia Player's resources, and the retrieval and processing of data and video information, reside in dedicated chips 121. Alternatively, or additionally, control programs are stored in mass memory devices 103 from installed or downloaded software, in removable memory media 104, or in an user access media 144.

A Multimedia Player's user control interface 131 includes communications to the buttons and keys located on the cabinet of the device, and to the associated control devices 141–142–143. The keys, buttons, and switches, conventionally found in consumer electronic systems and deemed advantageous to the operation of the Multimedia Player may also be implemented. These controls are further augmented by a plurality of function comprising: segment skipping control, magnification controls, content preferences control, video map control, and system menu control. The user control interface 131 additionally supports infrared and/or RF remote control units 141 (e.g. numeric control pad, and keyboard with a touchpad); wire connected control units 142 (e.g. cable connected computer keyboard, mouse, and game controller); and a voice recognition unit 143.

The keyboard, similar to a personal computer implementation, facilitates system setup, keyword retrieval, and system functions requiring the entry of alpha characters. Since a preferred configuration of a Multimedia Player comprises significant multimedia capabilities, a keyboard pointing means is advantageous. A keyboard connector used to connect a standard AT keyboard or a dedicated keyboard is supplied. Alternatively, an infrared-based or radio-based keyboard is implemented. Further, given the computing an d storage capabilities of Multimedia Player, a voice response subsystem option accommodating at least the few commands, such as play, stop, mute, audio, skip, required to control the basic operations can additionally be provided. The sophistication of the voice recognition capability can be enhanced as the hardware/software configuration of the Multimedia Player advances within mass market price points.

Implemented in the Multimedia Player is a digital system status display subsystem 132, which provides visual feedback and system status information similar to the implementations in VCR and DVD devices.

In general, parts, subassemblies, and components of a Multimedia Player are of conventional characteristics and are freely substituted by like functioning elements and components. For example, and not limitation, while fiber optic-based communications are preferred, copper phone lines and coaxial cable-based communications are considered, albeit less capable, nonetheless, functional equivalents. Additionally, a certain degree of redundancy of components is illustrated in FIG. 1 to schematically show and detail significant functions.

Clearly, redundant components in general, and redundant electronic components in particular, are intended to be eliminated in a preferred embodiment. For example, while a Multimedia Player may include a removable memory subsystem and a compact memory subsystem, one is the functional equivalent of the other and one or the other may be eliminated. In general, where cost effective, components and electronics are designed to serve a combination of functions.

Further, the configuration of the Multimedia Player's various modules, components, and subsystems, are intended to offer flexibility analogous to that found in a personal computer. Specifically with respect to the multi-user capabilities, a Multimedia Player may be configured, for example, with more than one DVD module whether inside the primary cabinet or in a mating or sister cabinet. Various embodiments of Multimedia Players do not include all, or even most, of the means, and/or capabilities detailed herein. The particular configuration of a Multimedia Player is responsive to the particular function or functions desired.

Responsive to user friendliness, a more advanced wireless plug and play communications and power motherboard and cabinet design is preferred. The motherboard and cabinet permitting the replacement of, for example, the power supply 109 just as easily as a battery is replaced in a portable personal computer. In a preferred embodiment of a Multimedia Player, every component and subsystem is added or replaced without resorting to screwdrivers and the need to unplug and plug communications and power cables.

Figure 2:
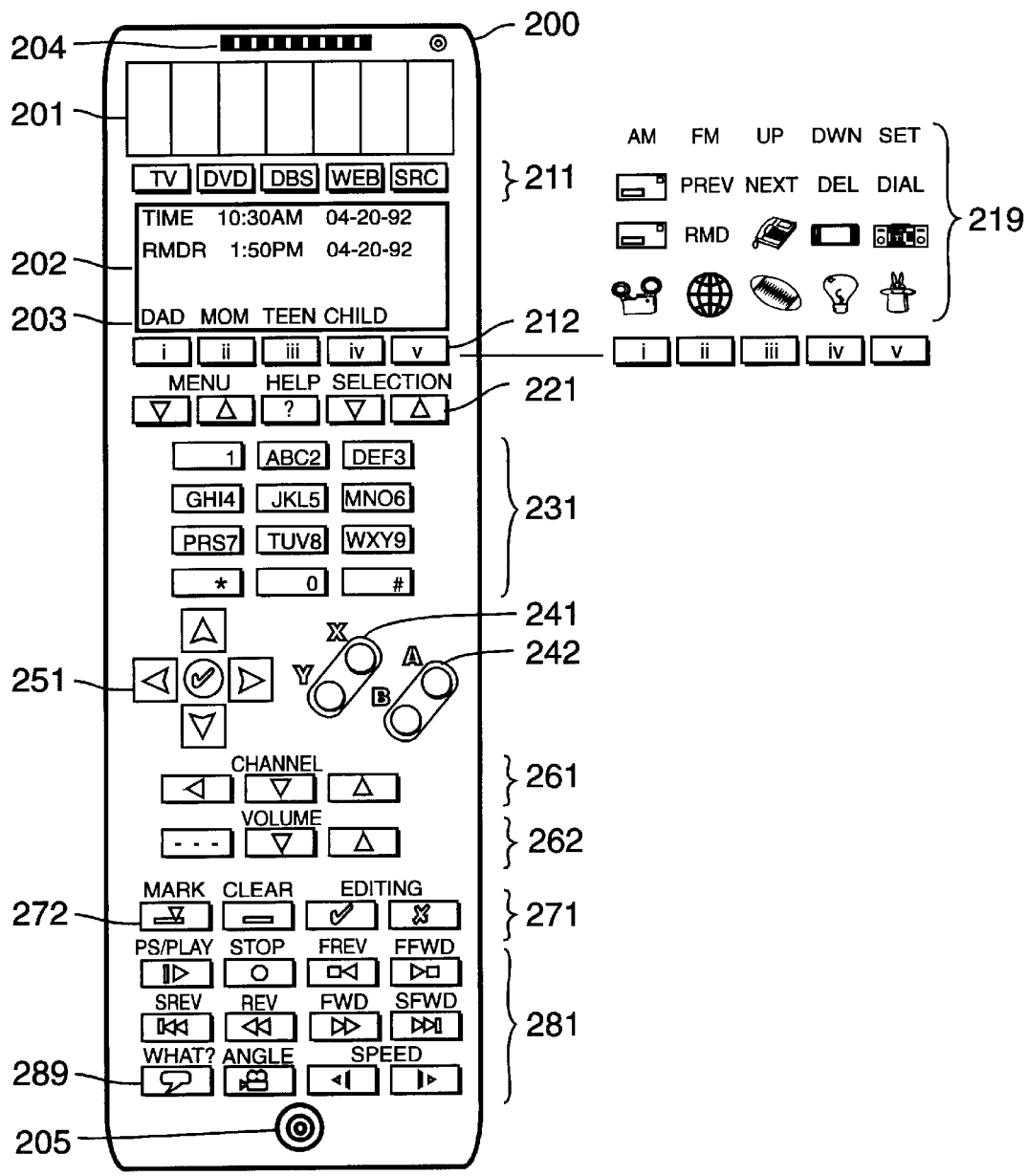
FIG. 2 is an illustration of a remote control device.

A remote control device as per the teachings herein may be based on any number of technologies both wired and non-wired. FIG. 2 is an illustration of a remote control device 200 that, for example, comprises: optical power panels 201; a display screen 202 that additionally responsibly labels 203 interactively defined function keys i–v 212; speaker 204; microphone 205; multimedia source selection/on-off keys (e.g. Broadcast TV, DVD, DVS, WEB, and other sources SRC) 211; menu, help, and selections control keys 221; telephonic alphanumeric key pad 231; gaming controls 241–242; screen position and menu controls 251; channel controls (Last Channel, Up Channel, Down Channel) 261; volume controls (Mute. Lower, Higher) 262; edit controls keys 271; and video control keys (e.g. Pause/Play) 281.

The interactively defined and labeled function keys i–v 212 permits a reduced set of function keys to provide access to individual sets of multiple functions for each of a plurality of viewers, as is suggested by the labels 203. The function keys 212 also provide, for example, subject category selection, program selection, content preference selection, and source selection 219. Pressing one of the i–v keys 212 results in an appropriate new menu of labels and/or icons to be displayed 203.

In particular the interactively defined and labeled function keys may be automatically configured and reconfigured by a specific video transmission or other information downloaded from, for example, the Multimedia Player. For example, when a specific viewer accesses the remote control, the display may show blinking icons for voicemail and email received for that individual.

The SFWD and SREV keys in the video control key set 281, in particular provide a viewer access to the functions that utilize the capabilities that are made possible by a video's segment information. During the viewing of a video, pressing the SFWD key causes the termination of the playing of the current segment, and the seamless playing of the next logical segment defined by the segment information. For example, during the viewing of a panel discussion, a viewer may for a variety of reasons prefer to exclude a panelist from the program. This the viewer can effectively do with the skip functions. Advanced skip functions automate the skipping of every instance of the appearance of that panelist in the program. That is each time the panelist begins to speak, the panelist gets skipped. A SREV key replays the current segment or the immediately ended segment.

It is noted that segment information for the skip and replay functions need not be congruent with, and may supplement, other segment information (e.g. definitions) detailed further below.

The edit controls keys 271 permit flagging a segment during the viewing of the video. The segment exclude key permits automatically excluding the current scene/segment the next time the program is viewed. The segment include key is utilized for example, by a parent to indicate that a possibly objectionable segment may be included in the program provided a child.

The MARK key 272 permits the viewer to define a segment. The first time the MARK key is pressed, it identifies the beginning frame. The second time the MARK key is pressed, it identifies the end frame. The segment include and segment exclude editing keys would then be utilized to code the viewer defined segment. Additionally, interactively defined and labeled function keys; menu, help, and selections control keys; and alphanumeric key pad; can provide access to segment coding functions.

Keys may be labeled, and other keys found in the art may be added responsive to the particular requirements of the functions implemented. For example, shuttle controls may be provided alternatively to, or in addition to, the gaming control shown which can serve the functions provided by the shuttle controls. Other examples are suggested by the remote controls provided with the RCA's RC5200P DVD player, and the Mitsubishi's HS-U580 VCR.

Further, the capabilities, functions, keys and other elements of a remote control device may be synergistically integrated with a remote keyboard with integrated touch pad and/or pointing device. In such embodiments, the function keys or dedicated keys, for example, may be configured to provide direct access to the various functions.

Figure 3:
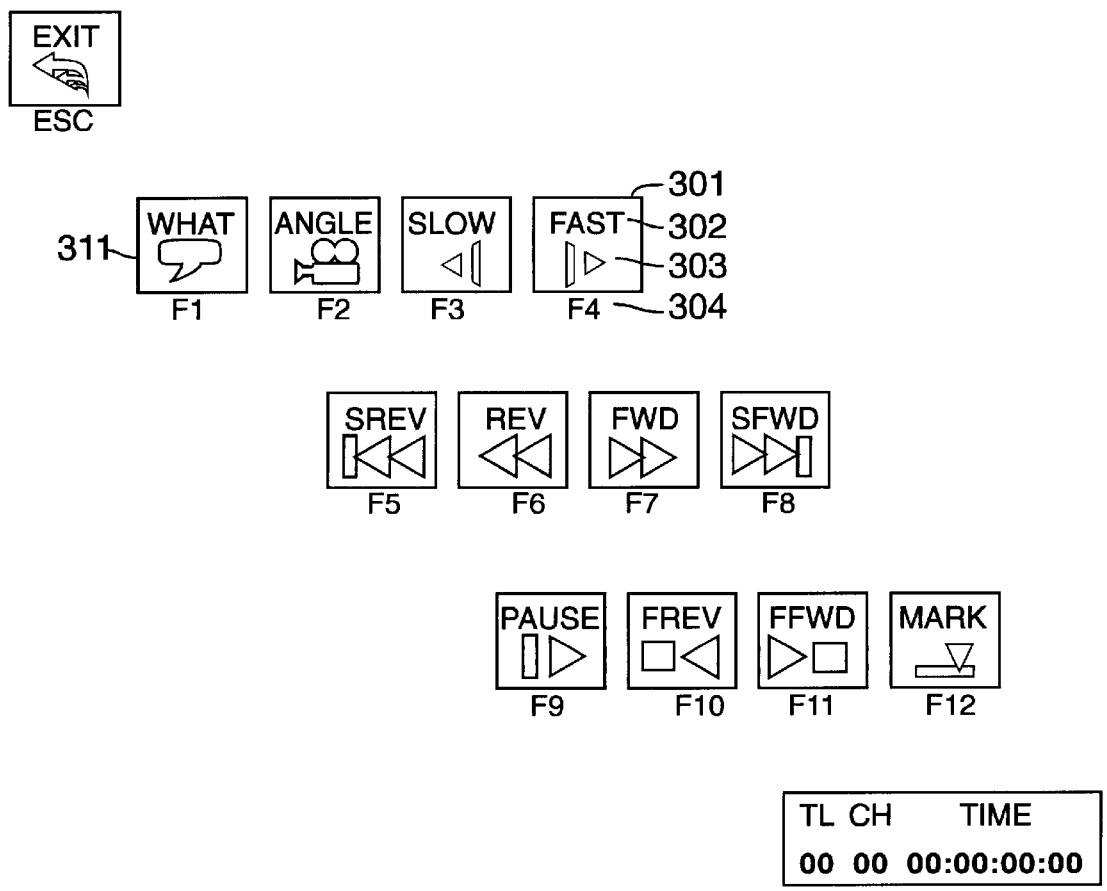
FIG. 3 is an illustration of a labeling of function keys.

FIG. 3 is an illustration of the function key labeling which may be displayed on a monitor, on a keyboard strip, displayed on the keyboard, or printed on the keyboard. For purposes of illustration the functions keys are arranged in FIG. 3 in a cascading manner. Clearly, a conventional horizontal linear layout or a variety of other layouts responsive to the particular keys utilized may be implemented. Key labeling 301 may comprise, for example, a function label 302, e.g. Fast, function icon 303, and key identifier (e.g. F4) 304. Where the keys are displayed on a monitor or other display means, the key labeling may be responsive to a pointing device's cursor position.

Further, the remote control device detailed with respect to FIG. 2 comprises all of the components and elements, e.g. a DSP and electronics, required to serve as a standalone portable phone for conventional phone communications, and/or as a phone communications capable remote control device synergistically integrated with the capabilities of the Multimedia Player. The utilization of a phone communications capable remote control device is advantageous in, for example, the integration of the playing of a video; with the acceptance of a communication, as detailed with respect to the flow chart of FIG. 18.

A variable content video, segment information, play routines specific to the video, and control codes for automatically configuring or controlling the functions of the Multimedia Player may be provided by means of a variety of existing and evolving technologies. In addition to the hard formats such as tape, DVD, optical/magnetic disk, memory chips and modules (e.g. RAM, DRAM, high capacity flash memory, bubble memory); a video may be provided by soft formats such as may be implemented in a variety of communications networks utilizing for example analog or digital cable transmissions, fiber optic transmission, phone and satellite communications. A Multimedia Player need not be physically accessible by a viewer nor physically located near the television set. The Multimedia Player may provide a viewer access to remote video resources and may itself be remotely controlled by the viewer. Fiber optic and coaxial communications easily permit the required transfer rates over long distances between controllers, Multimedia Players, and other video sources.

It is within a network-based implementation, that the various advantages and capabilities of variable content video services are realized. With respect to the specific hardware technologies and architectures of an underlying video delivery system, the following U.S. patents, incorporated herein by reference, detail a variety of program transmission technologies embodying varying degrees of capabilities: U.S. Pat. Nos. 5,815,194; 5,815,146; 5,793,411; 5,790,174; 5,247,347; 5,133,079; 5,130,792; 4,995,078; 4,891,694; and 4,506,387.

Figure 4:
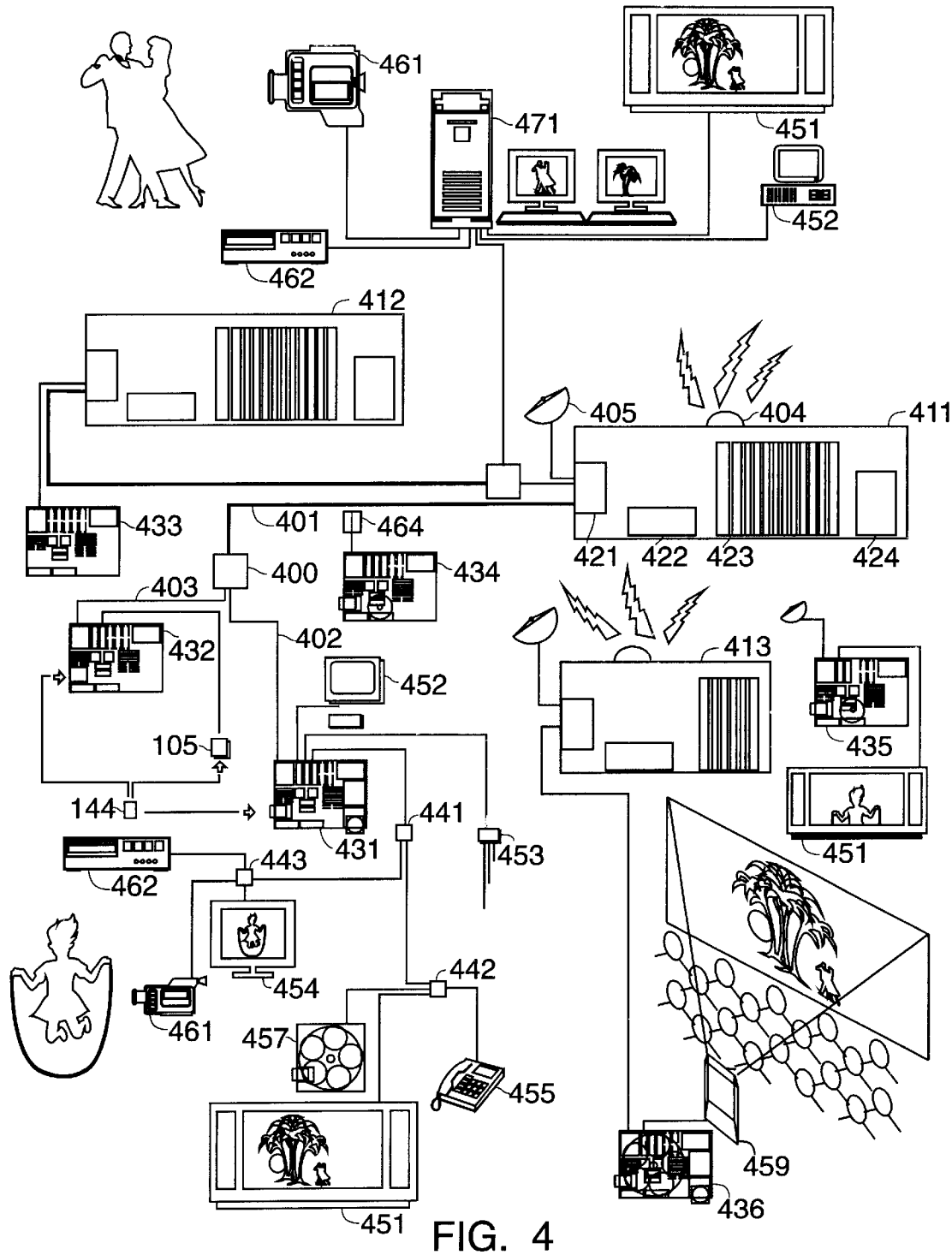
FIG. 4 is a diagram of a video and communications integrated network.

FIG. 4 is a schematic diagram of a video provider and end user network architecture in which participants in the network 400 comprise any number of video providers 411–413, and any number of end users 431–436. Participants in the network 900, however, whether classified as video providers 411–413 or end users 431–436 are both providers and end users of video services. Analogous to a communications network, each participant is able to retrieve and transmit video/data from any other participant. An example of an embodiment is the "video dialtone" model advanced by the Federal Communications Commission.

A video-on-demand system, in general, a content-on-demand system, and the delivery of variable content video services, in particular, are herein intended to be deployable by a variety of possible networks and Multimedia Player configurations. FIG. 4 suggests a plurality of network infrastructures that may be implemented. Shown are wired and non-wired video transmission infrastructures based on the use of one or a hybrid combination of the following: fiber optic 401, coaxial cable 402, twisted copper wire 403, microwave and radio 404, and satellite 405.

Each participant in the network obtains a hardware configuration consistent with their desire and objectives, and their financial resources. The video system of a participant who wishes to serve as a video provider 411–413 is functionally equivalent to the Multimedia Player device previously detailed with respect to FIG. 1, differing only in that the respective resources are appropriately scaled and modified to simultaneously access a variety of videos, and service a number of end users. Both an end user's Multimedia Player 431 and a nonlinear editing system 471 are in fact video servers. A video server of a video services provider is distinguished principally by the significantly greater video storage capacity and the number of video streams it can service.

A video provider system, for example 411, comprises: i) communications technologies 421 for establishing a plurality of video and communications streams to a plurality of Multimedia Players 431–436; ii) processing hardware and software 422 for retrieving from a Multimedia Player an end user's video preferences and content preferences, and for automatically selecting, for each of the participating end users, a variable content video responsive to the video and content preferences; iii) mass storage random access memory devices 423 for storing a video database ("videobase") comprising a plurality of any combination of conventional programs and interactive games and services, and variable content videos; and iv) processing hardware and software 424 for maintaining accounting and support services in connection with video services provided.

Simply stated, a variable content video provider system 411–413 comprises a video server, such as may be available from a variety of computer vendors, the video server software being enhanced to deliver variable content video services.

Video providers may be further categorized according to the functions served and/or the extent and character of the videobase maintained. Central video services providers 411 may be capable of providing a greater variety of video services than for example regional or local services providers 413. Regional or local services providers 413, however may be the source of local interest video services such as are currently broadcast by local television stations. Other video services providers 412 may act as "libraries" for specialized categories of videos, as for example an historical video archive of government proceedings; or services as for example electronics shopping. The internet architecture and the different classes of web sites is suggestive of the wide range of multimedia configurations that are possible.

A viewer's access to the resources of a video services provider 411–413 need not be direct. A requested video may be downloaded, in real time or non-realtime, to a services provider that may be more economically accessible to the intended viewer. Within the network, some video services provider may not directly provide any services to viewers, but act as centralized video originators or depositories for other services providers.

The video server's mass storage random access memory devices 423 for storing a plurality of variable content videos may advantageously implement the teachings herein with respect to the multiple read/write head architecture. This would also facilitate the simultaneous retrieval of several versions of a video from a single video source to satisfy simultaneously the particular viewing requirements of several end users. A multiple read head architecture reduces, for example, the number of copies of a video that the on-line video server may need to store.

In this context it is also noted that the mass storage devices may additionally implement stripping methods to store a video across several storage devices. Where cost effective, a variable content video may be entirely or partially stored in RAM.

The particular configuration of a end user's Multimedia Player's ransom Access, storage, memory, processing, and communication means and capabilities are responsive to, but are not necessarily limited by, the minimum requirements of, for example, a particular service provider. A Multimedia Player configuration, such as detailed with respect to FIG. 1, provides the required video accessing and storage, processing, and communications architecture required by a network-based remote video services provider.

As previously indicated, the Multimedia Player's multi-user and multi-services modules support separate controlled independent access by a plurality of users of the Multimedia Player's processing, video, and communications resources. In addition to the primary video display system 451 supported by a Multimedia Player 431, the multi-user module and multi-services module installed also provides services to a monitor/keyboard 452, security system 453, personal multimedia computer 454, voice and/or video/voice telephones 455. In this fashion a Multimedia Player acts an intermediate services provider.

The particular location of the Multimedia Player, subsystems, or components, whether within the immediate boundaries of a residence, automobile, or the particular location of the end user, are not limited herein to any particular arrangement. A variety of configurations are possible to meet the various needs at any particular time of an the end user. In a preferred embodiment a Multimedia Player is similar in size and weigh to a super thin portable notebook computer. This permits a user to have available all of the functions herein detailed irrespective of the user's particular location at any moment in time.

In commercial applications, such as a theater, a Multimedia Player 436 may support a high definition projector 459 such as for example Hughes/JVC Electronic HDTV projector. This particular service configuration is similar to Alcatel Network Systems and Pacific Bell's "Cinema of the Future" video delivery system which comprises an HDTV version of Pacific Bell's Advanced Broadcast Video Service and Alcatel's A1000 AX family of host, remote, and small ATM edge switches and high-definition codecs that enable the transmission of digital, studio-quality video through telecommunications networks.

For illustration purposes, connections between Multimedia Players and output devices are shown with lines. However, communications may be established by any of a variety of wired or non-wired means. Thus, a Multimedia Player 431 need not be directly or indirectly connected by wire to the devices 451–459, 461–462. Further, devices 451–459, 461–462 may be connected to a communications port 441–443 which is in communications with the Multimedia Player 431. The communications port may be of varying degrees of intelligence and capabilities, it may serve to boost or manage the signal, or have no other purpose than to serve as a convenient outlet in which to plug and unplug devices.

In an embodiment as shown if FIG. 4, analogous to an electrical wiring of a house, the house will be "wired" or "networked" with convenient ports. In this instance however, Multimedia Player may be plugged into any of the ports, self configuring the port addresses so that the devices that may be plugged into other ports automatically identify themselves and establish communications with Multimedia Player.

Additionally, Multimedia Player modules may themselves be physically distributed over the network. The plug and play of modules across a network architecture permits, for example, that the video disc module (101 FIG. 1) be physically remote from a Multimedia Player's 431 main unit and plugged on a port 442 near the television 451. In this instance, the case 457 housing the video disc module also houses a compact storage module (105 FIG. 1). Thus, a single video disc module can be easily moved from one location 442 to another location 443 when physical proximity is required to conveniently replace discs. It is noted that while the disc module case 457 is connected to a first port 442, it would be remotely accessible to a terminal 454 plugged into a second port 443.

It should be appreciated that the Multimedia Player's core components may be located anywhere inside or outside the house. Specially, where a Multimedia Player includes fans and disk drives, the top of the TV set would not be an ideal location.

As indicated previously with respect to FIG. 1, the viewer's or, more appropriately, the user's control of a Multimedia Player is either through an infrared control keypad, wired or infrared alphanumeric control keyboard, voice control, or system controls directly on the Multimedia Player. These controls may be directly incorporated in the devices accessing the Multimedia Player such as the TV 451.

The novel combination of an external fiber optic based communications module and a multiple read/write storage module, provides a Multimedia Player configuration capable of efficiently downloading significant amounts of full motion video to be viewed, played with, or processed at the end user's leisure. In such a Multimedia Player, the downloading of, for example, a feature length motion picture, an interactive video game, or a series of lectures can be achieved with unprecedented speed.

Clearly, a Multimedia Player may be configured to duplicate the functions of a nonlinear editing system as previously detailed. Both the Multimedia Player 431 and the editing system 471 are capable of receiving input from other sources such as for example a digital or analog video camera 461 and video tape player 462. As is the case with Multimedia Player 431, the editing system 471 is capable of outputting video to, for example, a TV 451 and to a PC 454.

As suggested earlier, an object of FIG. 4 is to convey the concept that a end user's Multimedia Player 431–436 and an editing system 471 can both upload and download video through the network directly to other end users 431–436, editing systems 471, and/or to the video servers of videos services providers 411–413.

As indicated previously, a Multimedia Player can accommodate a plurality compression and decompression technologies to both retrieve and decompress videos and compress and transmit videos through the network. Preferably, a specific video originating at a digital camera 461, downloaded to a nonlinear editing system 471, transmitted over the network 400 to a video server for retransmission over the network 400 to a Multimedia Player 431 will utilize a single compression technology to avoid compounding the effects of artifacts that may be introduced by a particular compression technology. Clearly, where the decompression technology resides completely in software, the video itself could provide the required decompression software.

As indicated above, variable content video services can be delivered by means of any of a number of non-wired based video delivery systems. For example, microwave technologies may provide two way video services including movies-on-demand. In such a system, TV signals are sent through the air at very high frequencies such as the 27.5 to 29.5 gigahertz microwave band. The network uses a series of transmitters 404, each of which is capable of broadcasting a digital signal within a six mile radius. End Users utilize a flat, four-square-inch antenna 464 mounted on a window to receive the signal. The antenna 464 is connected by coaxial cable to a decoder 434 connected to a TV set. In an embodiments a Multimedia Player 434 performs the processing and decoding functions required for transmission to a video display.

In a preferred embodiment of a cellular-like system, a video provider's cell site 413 comprises microwave communications, video server, and processing systems for establishing a plurality of video and communications streams to a plurality of Multimedia Players 431–436.

Unlike traditional film media that permits a program format with only a single linear sequence of frames, random access video technologies make possible a variable content video format that is characterized by a variety of possible logical nonlinear sequences of video frames. In a variable content video the artist and program producer are challenged to create greater variety in the form of expression, and utilize parallel, transitional, and overlapping segments to provide viewing of a video at that level of expression, content, detail, and length, that is consistent with a variety of viewer preferences.

In contrast to interactive motion pictures, and full motion video games, in a variable content video it is principally, although not exclusively, the form of expression that is the object of alternate frame sequences, rather than the storyline. In a variable content video, each of the significant scenes and actions can be implicitly expressed, as found for example in a "PG" rated film, explicitly expressed, as found for example in an "R" rated film, and graphically expressed, 10 as found for example in an "NC-17" rated film. As a result, unlike motion pictures which are packaged as a single linear sequence of frames, the U.S. version, the European version, the edited-for-TV version, the "NC-17" version, and the version addressing each viewer's particular tastes and preferences, reside harmoniously within a single variable content video.

Figure 5A:
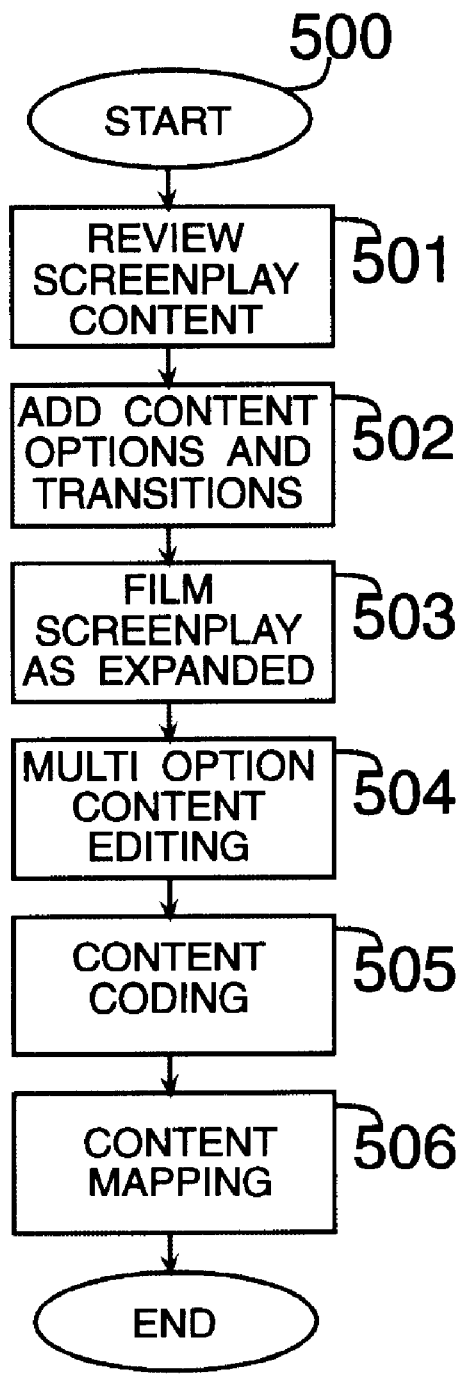
FIG. 5A is a flow chart summarizing the steps of producing a variable content video.

The steps in the production of a variable content video are summarized with respect to the flow chart 500 of FIG. 5A. Each scene, segment, or fragment of a segment on a video script is reviewed 501 according to an appropriate video descriptive structure, as for example detailed with respect to FIGS. 5B–5E. A screenwriter now has the freedom to expand the scenes 502 by producing and adding parallel, overlapping, and transitional segments, to cover a wider range of expression and story line without the concern for the limitations inherent in first generation linear programs.

A successful filming 503 of a variable content video is a function of the skill of director(s), actors, animators, programmers, etc. to provide, for example, additional parallel and transitional segments with the required transparent and seamless harmony. To a great extent this is been done in the production of conventional linear motion pictures, often in the anticipation of releasing multiple separate versions. However, by contrast to the editing of first generation motion pictures that require producing a unique linear sequence of segments, editing of this variable content video format requires a parallel non-sequential logical arrangement of segments 504.

A segment assigned a content category code may be congruent in one or more frames with a segment assigned a different category code. Where necessary, a video segment is associated with more than one audio segment, and Corresponding separate audio and video category codes are provided.

As each segment is defined, the beginning frame and end frame in each of the relevant segments are identified, and the segment is assigned a content category code and/or descriptor(s). A segment's content category code, keywords, and/or descriptor(s) are also referred to herein as a "descriptor".

Once a segment is assigned a descriptor, logical entry and exit references are assigned 505. The resulting segment definitions are mapped 506 and the required user interface produced. In a preferred embodiment, a video map comprises: i) information directly combining, providing for combinations of, and/or simply defining with or without associated descriptors, segments from within a video; ii) user interface routines particular to the video; and iii) control codes to control a Multimedia Player's playing of the video. The video map's data is provided with the video's video and audio data.

FIG. 5B illustrates an example of a segment descriptive structure utilized to review the contents of each segment of a video. Generally, a descriptive structure is a matrix of content categories and a corresponding coding scale utilized to assign a content code to a segment of a video. As is detailed below, the descriptive structures are not limited to the coding of possibly objectionable content material.

This particular segment descriptive structure 510 includes a number of content categories 511 that might apply to most films. This particular segment category descriptive structure includes, for example, a category for violence, and other categories of possibly objectionable content. The three digit category coding scheme provides for hundreds of different content categories.

The coding scale 512 mirrors the rating system utilized by the Motion Picture Association of America (General Audiences, Parental Guidance Suggested, Parents Strongly cautioned, Restricted, No Children Under 17 Admitted: G, PG, PG-13, R, and NC-17 respectively), but provides a more descriptive coding scale 512 for the structure, as shown. Each number 519 in the matrix represents a particular segment coding choice.

Referring now to FIG. 5C, the contents of a segment may be further analyzed with respect to a segment element descriptive structure 520. This structure provides for the coding of a segment with respect to the development of a number of elements 521 such as character, location, and time. This structure also provides for the coding of a segment with respect to the level of detail 522, and the level of expertise 523 that may be required by the segment. These elements are provided at a variety of levels, and a segment may be coded accordingly. The element descriptive structure 520 indicates that, for example, a segment's character development may range from none to extensive.

Referring to FIG. 5D, a separate segment inclusion descriptive structure 530 provides a coding scale to identify the degree of detail in a segment. In this structure 530, the segments may be coded according to the level of inclusion/exclusion 531 appropriate to the segment. The coding indicates if the segment is required for a highlight, summary, condensed, or detailed versions of the video. This descriptive structure is particularly directed to the coding of news videos and other programming where the length of the presentation can have great variation. In a similar manner, an individualized descriptive structure may be configured to address the specific requirements of one or a plurality of categories.

Alternatively, or additionally, a video segment descriptive structure, as shown in FIG. 5E, may be implemented that is not category specific. In this example, the segment generalized descriptive structure 540 incorporates the MPAA's movie rating system, whereby segments are assigned a code 541 (rating) from a coding scale incorporating the MPAA rating symbols. Determination of each segment's coding symbol is similar to the manner in which the MPAA rating system is applied to a motion picture. A number of other available rating systems may be implemented, including, for example, the rating system advanced by the Film Advisory Board, or any age-based (e.g. Adult) or class-based (e.g. Family) rating system.

Additionally, segment descriptive structures and content categories may be tailored to, and/or be specific to, the particular general subject matter of a video or of a class of videos. For example, a science program may require a different set of content categories, content category definitions, and/or an application of the definitions than may be required by a news program, or an adult motion picture. Content categories and the definitions may be context sensitive, e.g., applied depending on the context, or absolute, e.g., applied irrespective of the context.

As previously defined, herein the term "content preferences" ought to be understood as further comprising "technical preferences", and the term "content" ought to be understood as further comprising the technical aspects of a video. Accordingly, segment descriptive structures comprise the technical aspects of the video content and/or presentation. The technical aspects include, for example, the type and duration of transition effects utilized between segments, the incidence of edit cuts and "image changes" within a predefined time period, and the different camera angles utilized.

Music videos, for example, are characterized by a very high incidence of edit cuts and image changes. A viewer viewing a music video may prefer to define an incidence of image changes that differs in its apparent velocity from that of the tempo of the music. That is, a viewer may prefer to reduce, if not entirely eliminate the kind of rapid fire changes in images that characterize many music videos.

Similarly, the transmission of sporting events also lend themselves to automatic customization responsive to the technical preferences that are part of a viewer's content preferences. For example, the broadcasting of American football games by major networks are distinguished from less "director heavy" broadcasts by the incidence of image changes and the utilization of multiple camera angles. In the viewing of a football game, a viewer may prefer, for example, that shots of the coach pacing the sidelines, and close-ups of the quarterback immediately prior to the snap of the football, may be replaced by wider angle camera shots that permit viewing the defensive alignments, or, alternatively, replaced with close-ups of the cheerleaders. Here the issue is not to skip a segment or time-compress the game, rather to select a pace and perspective more suited to a viewer's preferences.

Establishing of technical preferences with respect to the viewing of sporting events is particularly advantageous in terms of enabling the viewer to determine whether or not the playing of a contest should include the display of scores or other information from other contests. For example, since a preferred embodiment permits a viewer to view a football game in a fraction of the actual time, a viewer may desire to exclude any information with respect to other contests, if the viewer expects that the viewing of the current contest will be followed by a viewing of another of the contests simultaneously occurring.

To serve this object, the transmission requires a separation of the information in a manner analogous to the separation of video, audio, and subpicture data in a DVD. In this particular example, the information required to create a display of the scores is transmitted as subpicture data, and the Multimedia Player selectively creates, responsive to a viewer's preference, the integrated display. For these purposes, display also relates to audio content, including, for example, a sportscasters comments about another contest.

The same methodology can also be applied to other programming that also currently display a plurality of windows, e.g. financial shops including market and news information. In these cases the video information is transmitted with the required selection data to permit a combined display of the video/data streams consistent with a viewer's preferences.

A video and data integrated display may include the overlay and/or sizing of windows as in current broadcasts, and the particular display style could also be responsive to a viewer's preferences. In sophisticated embodiments, the viewer is provide the kind of control over the display as is afforded by the multitasking of applications in a Windows environment. Further, windows from separate applications, channels, broadcasts, and/or multimedia, from a combination of real-time and/or non-realtime, remote and/or local sources, may be assembled as an integrated display responsive to a viewer's preferences.

FIGS. 5B–5E are examples of an overall framework for segment analysis, the actual segment descriptive structure and complexity utilized may be highly tailored by the producer of a video to reflect the specific content and technical aspects of a video without being limited by the structures which may be found to be commonly utilized in other works.

For example, a simplified content coding system may be based on the "flagging" of segments that may not be suitable for children. Segments not suitable may be defined, for example, as segments providing content and form of expression which, in a conventional sense, is deserving of a rating other than a MPAA "G" rating. The flag, for example, a single bit, is independent of the specific nature or content of the material which may not be suitable for a viewer. Consequently, all segments containing material which may potentially be unsuitable, receives the same flag or code. The flagging o f segments, is an example, of a simplified, efficient, although limited, method of coding segments.

Each video producer is offered the flexibility within an overall coding system to determine and include only those categories that may be relevant to a particular video, and to add categories as the producer requires. Similarly, the producer is offered some flexibility in determining the labeling of the coding scale.

Meeting the objectives of being able to provide both a standardized set of descriptive structures that will permit the automatic application of a viewer's content preferences to a variety of videos, and provide the producer of the video the flexibility described above, are accomplished by, for example, assigning unique category codes to each set of preestablished standardized content categories and by reserving a range of category codes that will be recognized by the system as requiring interactive input by the viewer. For example, category codes ending in 9, codes with a tens digit being a 9, and or codes from 900 to 999 ("producer code") are reserved as independent of the standard categories shown.

Producer codes signal to the system software to elicit the viewer content preferences. Similarly, as the coding scale is relative in structure, different descriptions for any category coding scale might be utilized without affecting the applicability of a preestablished viewer content preference for that category.

In instances where a desired coding scale is not accommodated by the standardized structure supplied, the producer need only assign a producer code, if required by the particular implementation, and build whatever scale he/she may deem desirable. A coding system may range from a simple "Yes/No" coding to a sophisticated three dimensional representation of multiple coding scales.

Additionally, commands may be issued by software associated with the video to inhibit the application of preestablished content preferences and require the viewer to address a video's specific descriptive structure regardless of the category codes utilized.

In an embodiment, each segment is alternatively, or additionally, analyzed as to subject matter and assigned the necessary keyword(s) to provide effective keyword retrieval and additional user viewing control capabilities. This will be of significant value in retrieving video segments from a videobase, such as may be constructed from a collection of news or educational videos.

Keyword indexing of the segments provides the capability for inhibiting the viewing of undesirable subject matter, or assisting in the retrieval of desirable subject matter where the descriptive structure may not adequately cover a specified category or subject matter. For example, a viewer may not desire viewing scenes of a flag burning. Key word control would inhibit that scene or scenes from being viewed by that particular viewer. Alternatively, a key word search would permit a system user to efficiently retrieve all flag burning segments that may be included in the videobase. Keywords, therefore may be utilized to exclude as well as to include segments in the playing of video content, as, for example permitted in a SQL database search.

It is noted that keywords are but one example of other descriptors that may be utilized to convey information as to the content of a video's segment.

The above are presented as examples of the great variety of content coding schemes that may be implemented alone or in combination to meet particular objectives of a video or classes of videos.

Figure 6A:
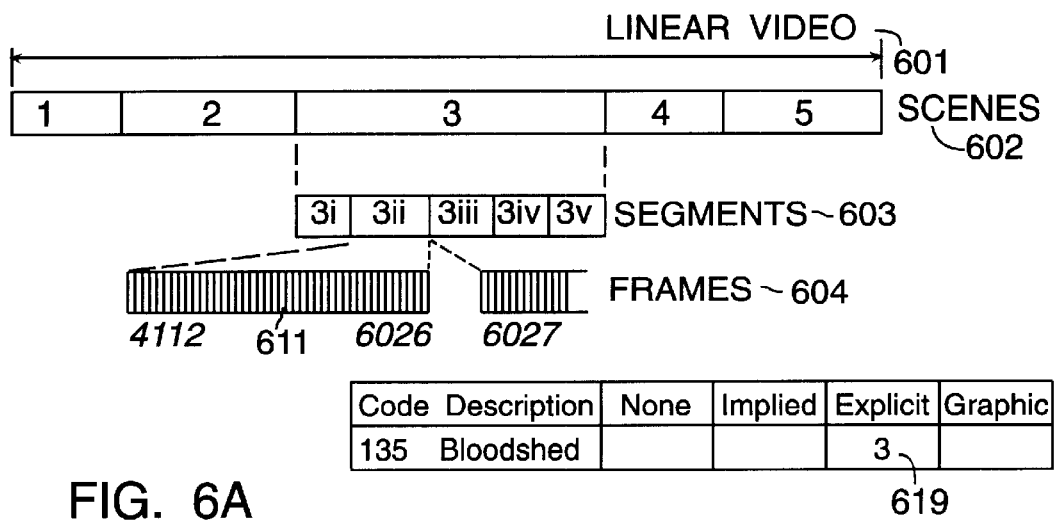
FIGS. 6A, 6B, and 6C, are diagrams of three versions of a video and corresponding content codes.

An example of the preparation of a variable content video is further detailed with respect to FIGS. 6A, 6B, 6C, and 6D. FIG. 6A illustrates an example of a conventional motion picture program 601 in which the scenes 602 of the video are arranged as a unique sequential arrangement of frames 604.

In a variable content video, the various scenes or chapters 602 of the video are divided into appropriate segments 603 according to the evaluation or coding of the contents of the scenes or chapters. Each segment 603 is defined by a beginning and ending frame and comprises any number of frames 604. In this example, scene three is divided into four segments, in which segment 3ii 611 begins at frame 4112 and ends at frame 6026. The next segment, 3iii, begins at frame 6027. Segment 3ii, which in a conventional motion picture contributes to an "R" rating for the video, includes frames depicting explicit bloodshed. The content code of segment 3ii is indicated by the numeral 3 in the cell 619 of an appropriate descriptive structure.

Figure 6B:
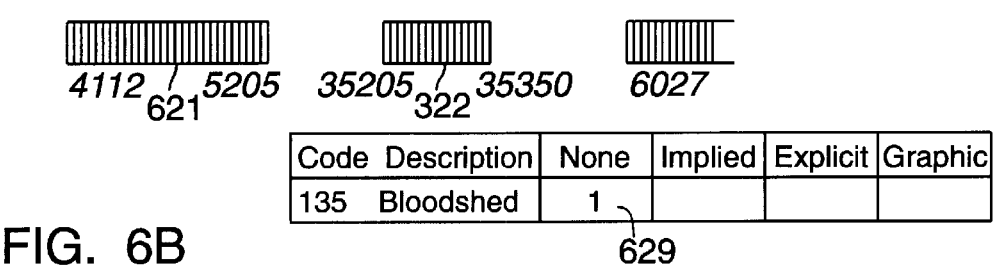

Referring now to FIG. 6B, to provide for the option of editing-out the explicit bloodshed in a variable content video, the video map includes an additional segment definition 621 beginning at frame 4112 and ending at frame 5205. The end of this segment 621 is linked to a new transitional segment 622 beginning at frame 35205 and ending at 35350, the end of which is linked to frame 6027. In this fashion, frames are omitted and added to provide a continuous transparent edited version of any segment of a scene. This frame sequence 621/622 is associated with a corresponding content code 629 to indicate the absence of bloodshed.

In all other respects the segments 621/622 are equivalent to the original segment 611. That is, it transmits essentially the same information but at a different level of explicitness.

Figure 6C:
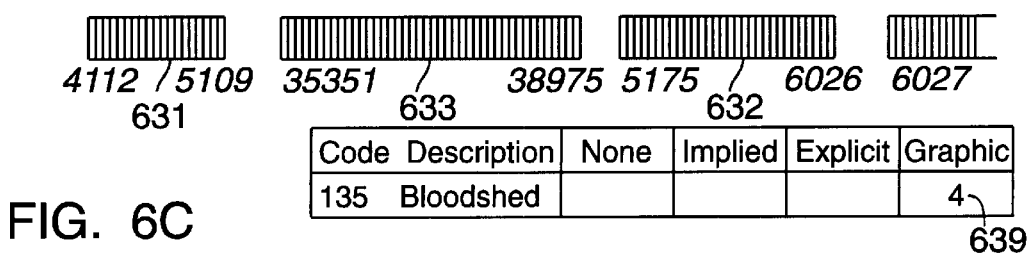

To provide for the option to include a graphic level of bloodshed, the video map includes an additional segment definition. Referring to FIG. 6C, in this case, only 66 frames of the "first" segment 611 are "ignored", and new segment definitions 631 and 632 are created. Segment definitions 631 and 632 accommodate the graphic bloodshed included in an additional segment 633 beginning at frame 35351 and ending at frame 38975. This frame sequence or segment definition 631/633/632 is associated with an appropriate content code 639 indicating the graphic content of this sequence.

In this manner, parallel and transitional segments provide a descriptive selection mix ranging from a segment combination excluding bloodshed 621/622 to a segment combination including graphic bloodshed 631/633/632, as well as the segment combination including explicit bloodshed 611. As a result, the particular scene of which these segments are a part can be viewed at any of the three content levels for that category.

A scene may include subject matter of more than one category. In such cases, overlapping segments and transitional segments are provided to permit viewing of one subject matter at one content level and viewing of another subject matter at another level.

For conventional first generation videos (e.g. linear motion pictures), the editing process operates in a like manner, except that the transitional segment 622 is not available to make the continuous transmission from frame 5205 to 6027 seamless.

In the absence of, for example, a parallel, transitional, or overlapping segment to render the skipping of the playing of a segment artistically as well as technically seamless, the video map, may identify a segment from somewhere else within that video that can be utilized, i.e. "grafted" in the place of the skipped segment to enhance the artistic seamlessness of a scene. A grafted segment need not be of the same duration as the segment it replaces.

By way of illustration, in customizing the playing of the motion picture "The Hunt For Red October", the skipping of a graphic violence segment resulted in a "jump cut", i.e. an artistically not satisfactory transition in which the principal actor went from camera left to camera right instantaneously. The method of grafting yielded to possible solutions. A first embodiment, advanced or interleaved the playing of a portion of the subsequent scene which was taking place in the story line at a more or less same time as the edited scene. The second method utilized some general nondiscriptive segment that can could also be grafted to create a cut away. In this case, one of the shots of the submarine moving underwater taken form an earlier occurring scene provided the suitable content. By these methods, the grafted content provided the sufficient time to camouflage the transition that is provided by the violent segment deleted from the playing of the scene.

To the extent that it may be necessary, advantageous, or of no particular consequence, a grafted segment may be played at both its original location and at its new location. This was the case with the utilization of the submarine segment, but not the case in the advancing of a segment of the following scene.

Figure 6D:
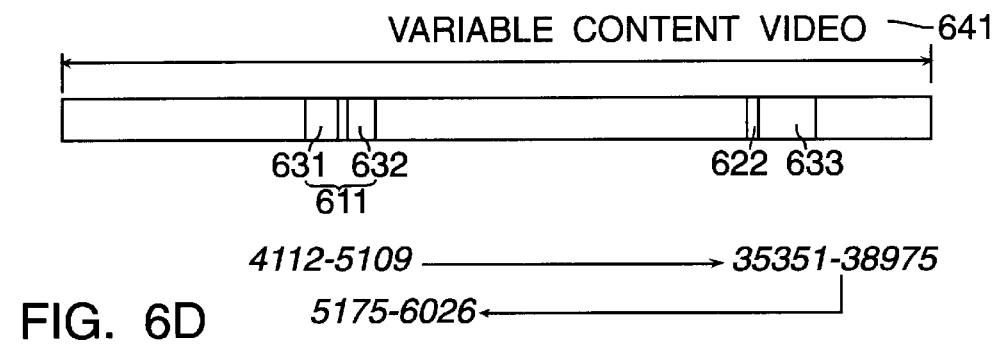
FIG. 6D is a diagram illustrating the resulting sequential and non-sequential arrangement of video segments within a variable content video.

Referring now to FIG. 6D, the location of the net additional frames that result from the additional segments cause some frames to be non-sequentially placed within a variable content video 641. FIG. 6D is illustrated to diagrammatically emphasize the resulting sequential and non-sequential random-like arrangement of video segments in a variable content video. This is shown for example, in the segment definition 631/633/632 depicting explicit bloodshed and the corresponding non-sequential frame sequence 642.

In an embodiment, a video map comprises the various segment combinations that are defined. For example, a video map would provide the following segment chains: 4112–5109|35351–38975|5175–6026,135–4,6027; 4112–6026,135–3,6027; 4112–5205|35205–35350,135–1, 6027. This map would enable, for example, to automatically retrieve the segment chain defined by frames 4112–5109, followed by segment defined by frames 353514–38975, and followed by the segment defined by frames 5175–6026 in response to a viewer's preference for a graphic level of violence (135-4) 639. It is noted that, for simplicity of presentation, in each of the segment definitions above, the next logical segment is the same, namely the segment beginning with frame 6027. As suggested earlier, this need not be the case.

A video having a video frame identified by number 5100 and a video frame identified by number 5200, need not have video frames identified by numbers 5101 to 5199. It is also noted that segment definitions need not be based on frame numbers, any timing or logging format, or physical addressing format, that defines the video material may instead or in addition be utilized. The segment definitions may be dynamic and can be automatically redefined or renumbered as a particular system or platform requires. The exact physical location of a segment may be a function of the hardware and software of the host media.

A video map need not include all the segment information, codes, and/or descriptors that are prepared in the production of a variable content video. A simple video map may comprise one or a plurality of tables of segments, linkages of segments, and/or pointers among segments, associated with a particular version. Each table, set of linkages, and/or pointers being associated with a single code, rating and/or descriptor.

It should be appreciated that as the content and technical categories that are utilized in a video increase, a video map (i.e. navigation data) as, for example, implemented in the DVD specification begins to collapse under the possible permutations. In other words, in certain embodiments, predefining program chains may not provide the most efficient utilization of data space.

Accordingly, alternatively, or additionally, a video map may comprise linkages only where required to skip over, for example, parallel segments. Such a video map, principally comprising segment definitions and associated descriptors provides more flexibility by permitting to create on-the-fly the combination and/or linked sequences of segments responsive to each of a viewer's preference in each of a plurality of content categories and/or set of keywords.

In the case of DVDs, such an embodiment may require that the video map be provided by a source other than the DVD, and may require enhancement or modifications, to the DVD play or navigation software, which are outside the DVD specification. Clearly, from a technical perspective of what can be accomplished, a Multimedia Player need not be limited to playing a DVD in the manner prescribed by widely accepted standards.

The art of editing a variable content video is intended to significantly transfer censorship, and time-constrained editing decision making from the producer and/or editor to the viewer. The editor of a variable content video is concerned with maximizing the content range of the video produced to permit the creation of a greater number of versions of a video and thus appeal to a wider audience and to multiple viewings.

The complexity of a variable content video program/game is only limited by the requirements, desires, skill, hardware/software, authoring tools, and resources available to the video editor. To that extent, it is intended that the editing functions, in particular, be assisted by integrated computerized editing resources.

A variable content video editing system is in terms of the hardware and underlying application software not significantly different from a number of nonlinear editing systems that are available, such as Avid Technology Inc.'s "Media Composer 8000" and "Film Composer", ImMIX "VideoCube", Data Translation's "Media 100"; and digital audio editing systems such as "Avid's Audio Vision" (tm). The teachings of the following U.S. patents are incorporated herein by reference: U.S. Pat. Nos. 4,449,198; 5,109,482; and 4,979,050.

The Media Composer 8000 utilizes a Quadra 950/28MB based high performance personal computer system including: audio converter and co-processor board, video RAM and co-processor board, video slave driver, enhancement board, black burst generator, effects 10 module, compression hardware, SCSI II board, deck control, high capacity magnetic drives, modem, speakers, two 20" color monitors, keyboard, mouse, manual user interface, cables and power strip.

The editing software of these systems is principally directed at facilitating the editing of video material and the creation of special effects. To that extent, the software and user interface is similar to that required in a variable content video editing system. However, a variable content video editing system is significantly and conceptually distinguished from the prior art by the methods and software routines associated with the production of a video map.

In prior art nonlinear editing systems, the editor utilizes the editing system to create a video comprising a linear sequence of frames. That is, in spite of sophisticated video effects, the end product of these advanced nonlinear editing systems is a video of quite conventional linear characteristics. Certain editing systems output an edit decision list or a negative cut list utilized to assemble the negatives of a film in a conventional manner. When the editor produces more than one linear version of a video, each version is complete in itself.

In a variable content video editing system, as for example, Sonic' Solution's DVD authoring systems, the end product of the editing process is a videobase comprising a video map that identifies the content and well as the location of segments for each of a plurality of versions. The video map is not directed towards producing a single linear version but towards the plurality of versions that, for example, the permutation of a plurality of content categories and coding levels makes possible.

It should be appreciated that in the production of a variable content video, the task of the editor is to create a videobase of logically organized video segments. The logical organization being the video map. Thus, in a variable content video editing system, conventional editing software is enhanced to facilitate the creation of the video map, which in the case of a DVD is known as navigation data.

Figure 6E:
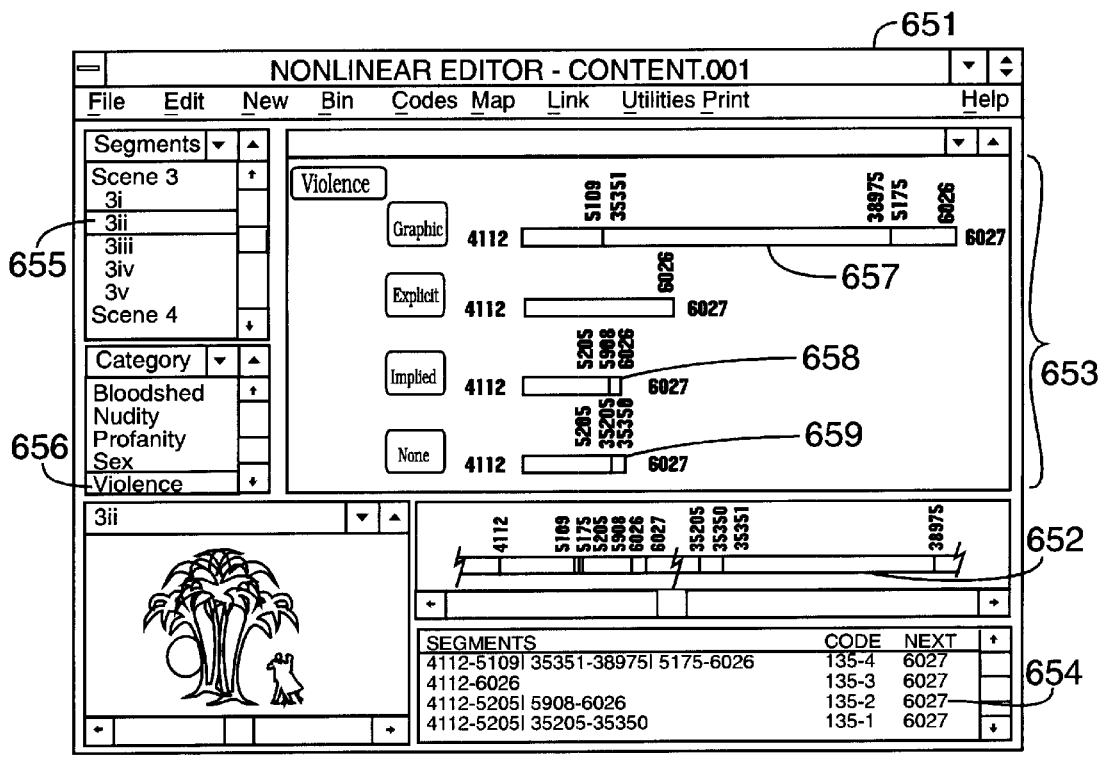
FIG. 6E is an illustration of an editing screen in a variable content video nonlinear editing system.

FIG. 6E is a representation of an editing screen 651 displayed in a variable content video nonlinear editing system. This particular screen identifies the video material 652 available to create the various versions 653 of a segment, and the resulting map 654.

An editor selects a particular scene and segment to edit 655, identifies the video and audio material corresponding to that segment 65 2, identifies the content category 656 for the segment, and proceeds to edit a segment 661. Normally the editor will begin editing a segment for the most explicit level that the editor desires to produce.

The editing of a particular segment at a given content code is executed in a manner similar to that available in other nonlinear editing systems. In this case, however, the frames are dropped in the applicable predefined or editor defined content code level. In this example, the editor is first producing a segment 661 at a graphic level of violence.

If the editor wishes to produce versions of the segment at different levels of explicitness, the editor may repeat the process above. Alternatively, the editor may copy an edited segment 662, and paste it to a different content code level 663. The editor then may edit out material inconsistent with the coding level, and add parallel and transitional material that may be required.

As the editing is being accomplished, the software composes the video map 654, which may be directly accessed and edited by the editor. When completed, the map may be automatically keyed or configured to accommodate the requirements of the particular device to which the video is to be downloaded, for example to a DVD and/or to a video server.

It is noted that an editing system usually comprises more than one monitor, and that windows may be arranged by the user as the user prefers. The screen illustrated in FIG. 6E shows some, but clearly not all of the tools that may be made available or are available.

It is intended that the variety of teachings with respect to a video map and the mapping of a variable content video be understood to comprise a variety of video mapping methodologies. The particular mapping embodiment utilized being responsive to the particular application, complexity, sophistication, and capacity for customization that may be required. Specifically, it ought to be understood that embodiments of the teachings herein are consistent with program chains and the preparation of program chains for DVD video.

It is specifically intended that the requirements resulting from the zooming and audio teachings herein be accommodated and made an integral component of the video mapping and the special effects software of a variable content video nonlinear editing system.

A Multimedia Player embodying the teachings of a variable content video architecture provides each viewer the opportunity to establish content preferences. In a preferred embodiment, providing great potential for customizing the playing of a video, content preferences for each of a plurality of a viewers are established with respect to a level of content, such as detail, in each of a plurality of content categories.

A random access device as per the present invention provides each viewer the opportunity to preestablish both any number of generalized, personalized video content preferences, and program/event specific content preferences, identifying the viewing preferences in each of a number of content categories with respect to a particular playing time and video.

Generally, the design of a viewer's content preferences eliciting routines is responsive to the particular content descriptive structure that was implemented in analyzing the content of the video. As is detailed below, the content preferences are established or captured prior to a transmission of a video to a viewer's receiver or display, or immediately in advance of the transmission of a selected video, so that during the transmission of the video, viewer intervention is not required.

Figure 7A:
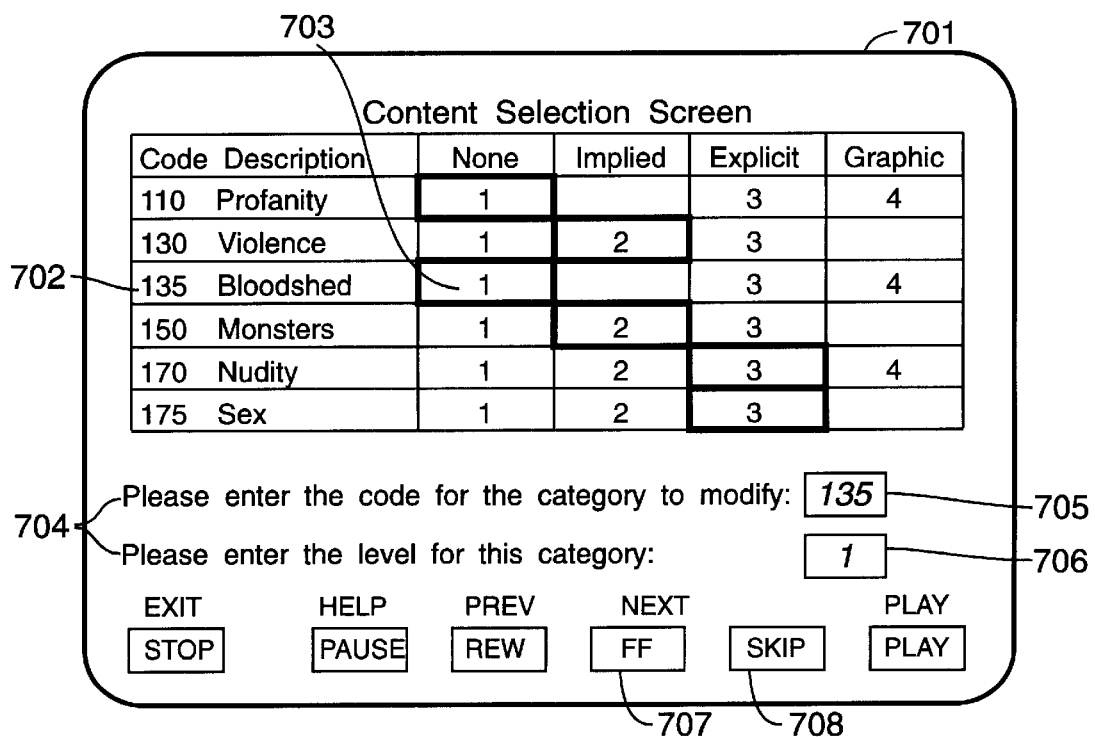
FIGS. 7A–7G are examples of content preference selection screens and screens utilized in the selection of videos.

FIG. 7A illustrates a viewer's content preferences selection screen 701 specific to the content of a selected video. In this example the viewer is provided the opportunity to establish the level of explicitness in a number of different content categories 702. Depicted by bold boxes 703 is the viewer selected level for each category. The viewer in this case has elected to omit bloodshed 703 in his/her viewing of the video.

In this particular viewer interface, viewers indicate their selections by following the entry requests 704. A variety of means, such as keys on a remote control, are provided for the viewer to indicate the category they wish to access 705 and the viewing level for the category 706.

Also illustrated in FIG. 7A is the labeling of the conventional function keys 707 of the devise in synchronization with the screen display. Once the screen is exited, the function keys provide conventional VCR type control over the playing of the video. Additionally as is suggested by the "Skip" key 708, functions are provided that utilize the video map capabilities.

Figure 7B:
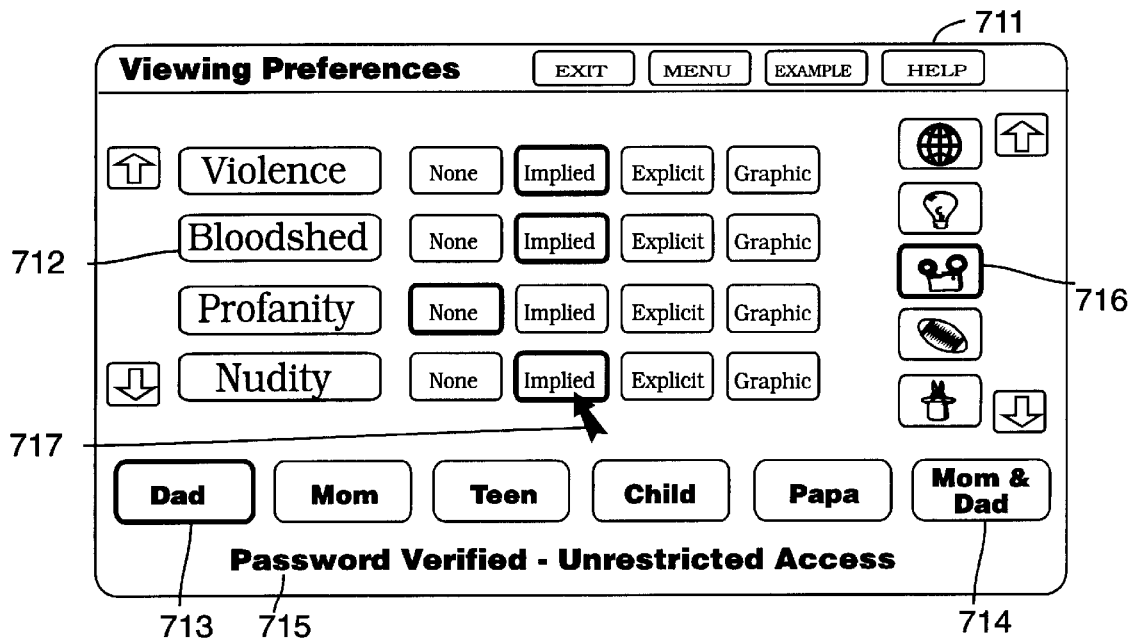

FIG. 7B illustrates an example of a screen 711 for establishing content preferences in each of a plurality of content categories 712 with respect to a plurality of programming or subject matter preferences 716 for each of a plurality of viewers 713. This particular graphical screen would be used to initially establish all the users and their content preferences. As in previous examples, a viewer is provided the opportunity to select the level of explicitness in a number of different content categories 712.

The screen also illustrates other options available to the viewer. For example, the option is provided to assign each viewer 713 or combination of viewers 714 in a household individualized content preferences. Access to the system resources and the establishment of the content preferences are access protected 715. Further, while a viewer may establish a single content preference table to serve, for example, both games and motion picture applications, a viewer may assign a different set of content preference to the selection of different categories of videos 716.

In this particular screen design, viewers indicate their selections by the use of a pointing 717 device such as an infrared mouse, or a remote control as detailed with respect to FIG. 2.

It should be noted that the teachings above are not confined to a variable content video, clearly the teachings are applicable to any linear or nonlinear video. Specifically, interactive video games utilizing full motion video segments can also benefit from providing the viewer/player of the game the option to preestablish video content preferences in addition to the gaming options which may be included in the video game software. As in a variable content film, in a interactive variable content video game, the video segments shown are consistent with the player's video content preferences.

Figure 7C:
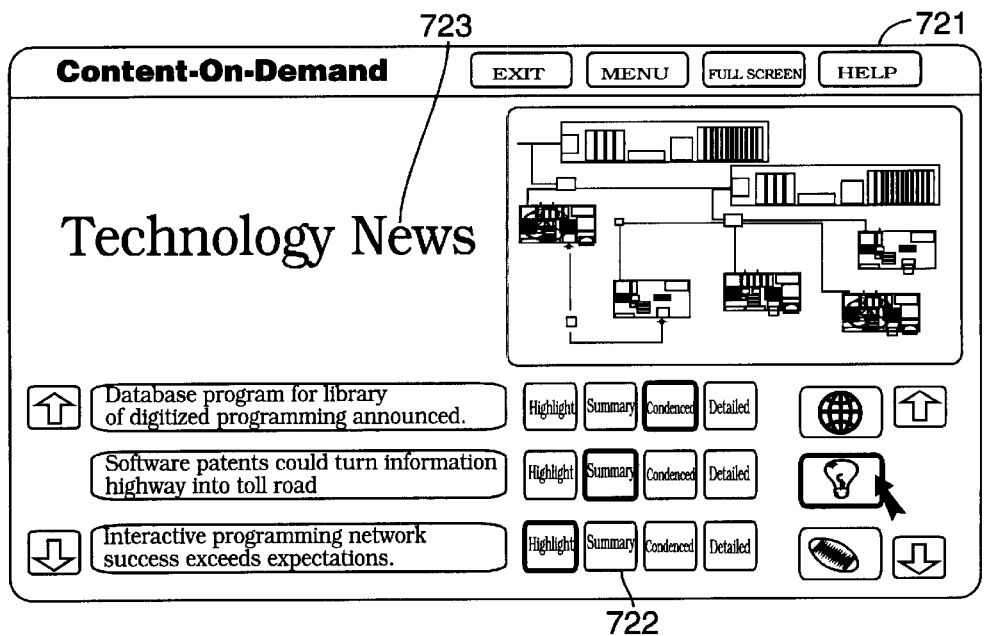

FIG. 7C illustrates one of a plurality of video specific selection screens. This particular screen 721 is tailored for the retrieval of news programming. The requirements specified by this screen may be set by the viewer to be responsive to the viewer's content preferences and programming preferences as defined with the use of, for example, the screen of FIG. 7B. Additionally, the stories themselves may be automatically selected in response to the viewer's preestablished specific news category preferences. In this example the viewer had previously indicated a preference for technology related news 723, and is additionally provided the opportunity to select the level of detail 722 that the viewer desires in each of a number of news stories relating to the selected news category.

FIGS. 7D, 7E, 7F and 7G, are examples of a set of screens utilized in the retrieval of a video. The set of screens are drawn with an aspect ratio of 1.33 rather than the HDTV aspect ratio of some of the other previously illustrated screens. The screen set is intentionally designed to have a simple and consistent "look and feel".

The functions of the system are accessed by three commands and ten single digit numerals. This permits viewer access by means of current voice recognition technology or the keys available in most remote control devices.

The description that follows with respect to FIGS. 7D–7G are in terms of the three function keys and a numeric key pad available in an ordinary remote control devices. In this particular embodiment, the Chan+(channel change up), Chan−(channel change down), SEL (select key), and the numeric keys are utilized.

The screens inform the user which key is required for a particular function. The Chan+731 and Chan−732 keys are utilized to scroll through the available selections 733. When a particular highlighted selection is desired, the SEL key 734 is utilized. The available selection are retrieved from a dynamic relational database.

Numeric keys are assigned various functions. For example, the 0 key 735 is utilized to access a help screen, and the 9 key 736 is utilized to return to a previous screen if available or to exit.

Figure 7D:
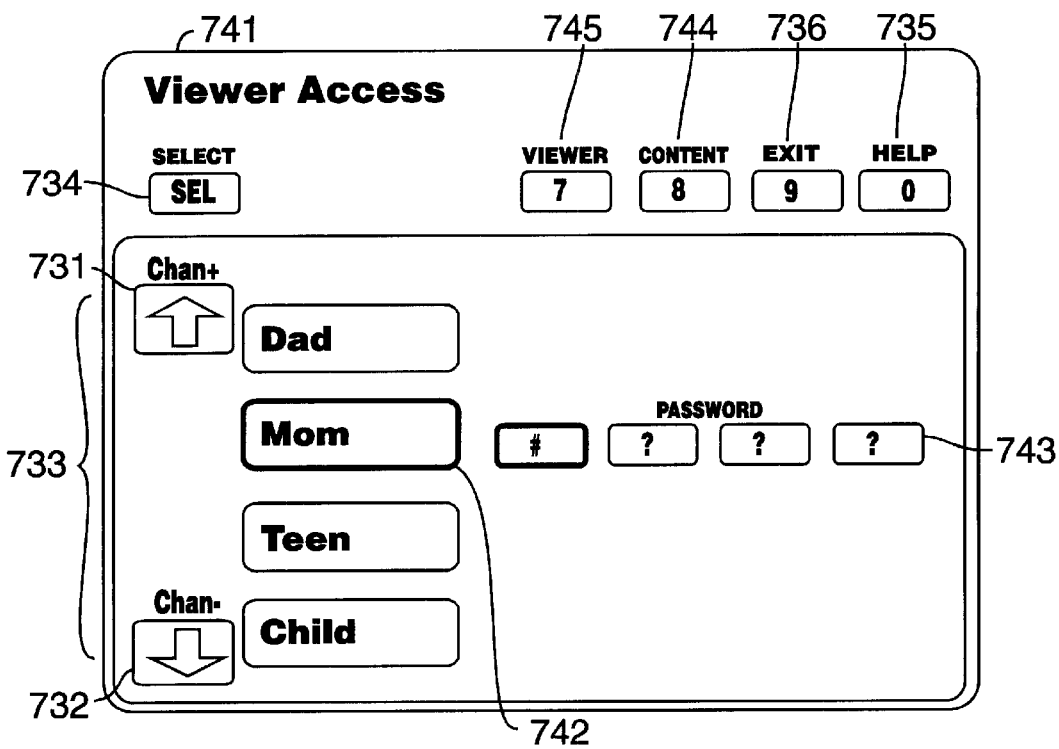

Referring now to FIG. 7D, in instances: were viewer control is enabled, that is at least one viewer has controlled access to the video services, the viewer access screen 741 is presented to the viewer. In the viewer access screen 741 as in the other screens, the Chan+731 and Chan−732 keys are utilized to scroll through the available selections 733. In this screen, the selections 733 identify each of the various viewers in a household. If Mom is the viewer, she would cause the highlighting of the Mom label 742 and depress the SEL key 734.

In this example access to the video service s associated with Mom is password protected. Therefore, a password entry routine is displayed 743 upon the pressing of the SEL key 734.

While a viewer label is highlighted, the content preference screen may be retrieved by pressing the 8 key 744. If access to that viewer's content preference screen is password protected than the password entry routine 743 is also displayed.

A parent wishing to modify a child's content preferences, would highlight the child label, press the 8 key, upon which the system requires the entry of the parent's password. A child wishing to use the system would highlight the child label and press the SEL key. A password need not be required to access the video services that have been preestablished by the parent for the child.

To add or modify viewer's, the 7 key 745 provides access to the viewer maintenance screen. To personalize the viewer labels, the numeric key pad may be utilized as is practiced in the art to create an alpha character string. Alternatively, a selection listing provides the letters of the alphabet and/or a list of common first names and labels.

Figure 7E:
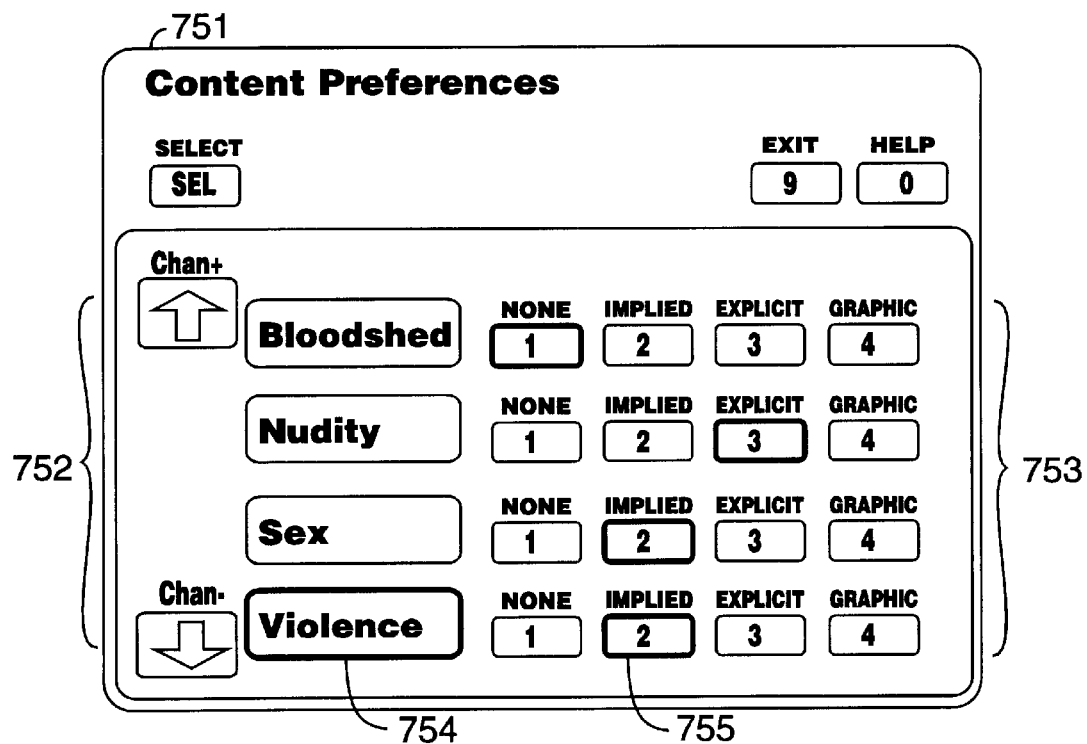

FIG. 7E illustrates a viewer's content preferences selection screen 751. In a manner similar to that detailed with respect to FIG. 7D, the viewer is provided the opportunity to select the level of explicitness in a number of different content categories 752.

To select the level of explicitness, the viewer highlights the desired content category 752, and presses the numeric key corresponding to the desired level of explicitness or detail. For example, highlighting the violence label 754 and pressing the 2 key prevents the display of explicit or graphic violence. Depicted by bold boxes 755 is the viewer selected level of explicitness or detail for each category.

Figure 7F:
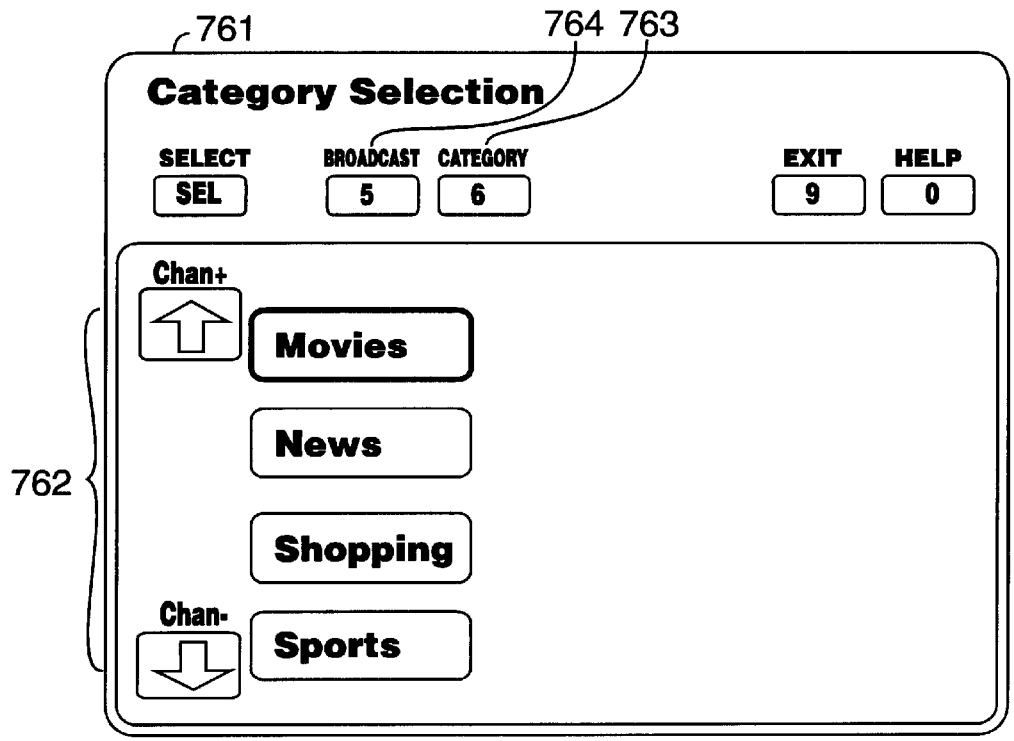

FIG. 7F illustrates a category selection screen 761. The listed categories 762 are responsive to the viewer being served. The category selections 762 may be modified by pressing the 6 key 763, which provides access to the category inclusion screen. The category inclusion screen is similar to the category selection screen but list all the available categories indicating which are included and which are excluded. The numeric key pad is utilized to change the category status. Access to the category inclusion screen is also password protected.

It is intended that the teachings herein are integrated with broadcasts video services available to the viewer. This is represented by the 5 key 764 that causes the system to provide broadcast services.

Figure 7G:
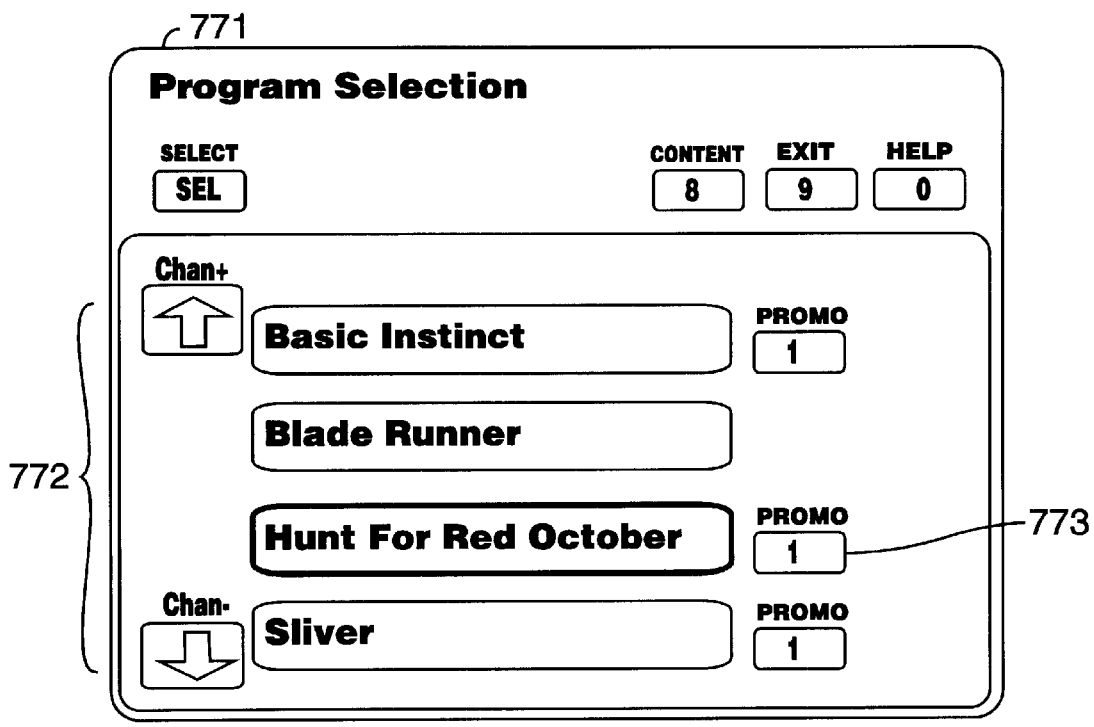

FIG. 7G illustrates a program selection screen 771. The programs selection 772 is responsive to the category previously selected. Where available, the viewer may obtain a promotional clip or summary by highlighting the desired program and pressing the one key 773. This screen also provides access to the content preferences screen. In this case, the screen is preceded by a password request if not already established, and a request to the viewer to indicate if the content preference changes are program specific or not.

Alternatively, or additionally, to preestablishing content preferences in advance of playing a video, the content preferences are established during the viewing of a video. For example, pressing the SFWD (skip forward) key or the appropriate editing keys (FIG. 2, 281/271) during the playing of a segment coded as containing an explicit level of bloodshed, would cause all segments of bloodshed with an explicit or graphic level to be skipped. Responsive to, for example, system default or interactive query, the viewer's content preferences could be updated.

Interactive setting of content preferences is particularly advantageous in those instances where the subject matter of a segment does not lend itself to a preestablished standardized set of content categories. For example, in the viewing of a debate, a viewer could elect to exclude the viewing of a particular participant.

Generally, with the respect to the functions or capabilities which are enabled by the use of a password, or other access control means, after some period of inactivity with respect to the particular function, e.g., the playing of a DVD, the access permission level is restored to a level prior to the entry of a password, i.e., the access protected capabilities are no longer available to a viewer without the entry of an appropriate pass word. For example, after a fifteen minute period of inactivity following the access controlled and permitted playing of an "R" rated motion picture, the playing of the same motion picture is no longer permitted. These and other access functions may be responsive to system defaults and/or user requirements. Herein, the terms "password" and "access control" or "control codes", are any means, e.g. a key or voice signature, which may serve to verify permitted usage.

Referring to FIG. 1, a Multimedia Player's disc module 101 implementation may incorporate a variety of, for example, technologies, configurations, formats, compressions, and methodologies. The teachings of U.S. Pat. Nos. 4,872,151 and 4,873,585 are incorporated herein by reference.

Generally, in, for example, a laser readable disc implementation, the entire variable content video (video/audio and video map) is provided in a format similar to that required by the video images contained in the disc. Specifically in a DVD implementation, the video map or navigation data is included in a digital format and the video content is included in a digital compressed format in one or more spiral tracks. Alternatively, the data is provided in the video/data disc in a different format from the particular video format implemented. For example, where the video utilizes analog/optical technologies, the video map utilizes digital photomagnetic or magnetic technologies.

In a second alternative, the video map and other data is separately provided by a removable memory media 104, an user access media 144, or downloaded by means of the communications interface 102. For example, a Multimedia Player simply configured and comprising, a DVD drive 101 and a micro floppy disk drive 104 or modem 102 provides editing out benefits for DVDs storing a conventional linear video. In this configuration, the micro floppy disk provides the video map, user interface and other control programs particular to the motion picture. Additionally, the disk may serve to store a viewer's generalized or video specific video content preferences.

The customization of a conventional linear program, while suffering, as does edited-for-television programs, from the lack of transitional, parallel, and overlapping segments, provides a library of full motion pictures to which the teachings herein may be applied. In those instances where the authoring of the video did not include the production of a video map, the video map is likely to be retrieved from a source, e.g., a web site, other than the source of the video, e.g. a DVD. If the video does not directly provide identifying information, the Multimedia Player's software extracts from a previously designated location of the video, e.g. 5 minutes into the video, a sufficient amount of data, e.g. a plurality of bits, expected to provide a unique signature which when compared to a database of previously stored signatures, would serve to identify the video being played. If the database of signatures and video maps are not locally accessible or available in the Multimedia Player, the Multimedia Player automatically establishes a communication with a remote source, provide the signature information, and download the video map. If the initially obtained data is insufficient to establish the identity of the video, the remote source instructs the Multimedia Player to obtain data from a location identified by the remote source. If the remote source has access to the content of the video, the remote source need not maintain a database of signatures, extracting the information in parallel with the Multimedia Players's retrieval of data from the video.

Upon a playing of a video, the control program causes the reading of the video's identifier from the video source 101, searches the mass memory fixed storage device 103 for a corresponding viewer content preferences, or applicable generic preferences, and upon viewer confirmation applies the stored viewer preferences to the video map.

With respect to control programs, scheduling routines, viewer preferences, video map, and other principally software elements, it is noted that these may be separately or jointly stored in any one of a Multimedia Player's various firmware/hardware memory devices. For example, the viewer's content preferences are stored in nonvolatile resident memory 115, in the memory of the fixed or removable memory subsystem 103/104, a user's optical read/write access card or electronic memory card 144, or from the respective read/write video/data disc 101. In an interactive video game application, data in general, and game software in particular, for example, may be downloaded to the hard disk, reserving subsequent access of the laser disc for video/audio retrieval.

Generally, a Multimedia Player's control programs 121 generate a segment table (i.e., in the case of a DVD, extracts a program chain) reflecting the application of a viewer's content preferences to the video map. The program chain provides the control program's segment scheduling routines the information to cause the automated logical selection of sequential and non-sequential segments of the video responsive to the video map, the viewer's content preferences, and the logic of the gaming software where applicable. The processing of the control programs is principally a function of the system CPU 111 and system RAM 112.

A Multimedia Player's video random access retrieval architecture principally comprising the video/data disc module 101, video CPU 113, video buffers 114 and processing capabilities, provides for the retrieval and transmission of selected sequential and non-sequential video segments stored in the video disc, and utilizing, for example, constant angular velocity, constant linear velocity, analog, digital, and/or any combination of these and other laser technologies.

A Multimedia Player's disc module 101 comprises laser disc technology distinguished principally in the cooperative operation, responsive to the instructions of the segment scheduler, of one or more read/write laser units and/or video buffers to produce a continuous transmission of non-sequential video segments. In a laser-based random access multiple read/write architecture, each read/write unit assembly and operation is principally equivalent to corresponding laser-based assemblies found in the prior art, in which a laser beam reads and reproduces memory signals from a disc. U.S. Pat. Nos. 5,280,462; 4,972,396; 4,871,903; and 4,701,896, are incorporated herein by reference.

Figure 8A:
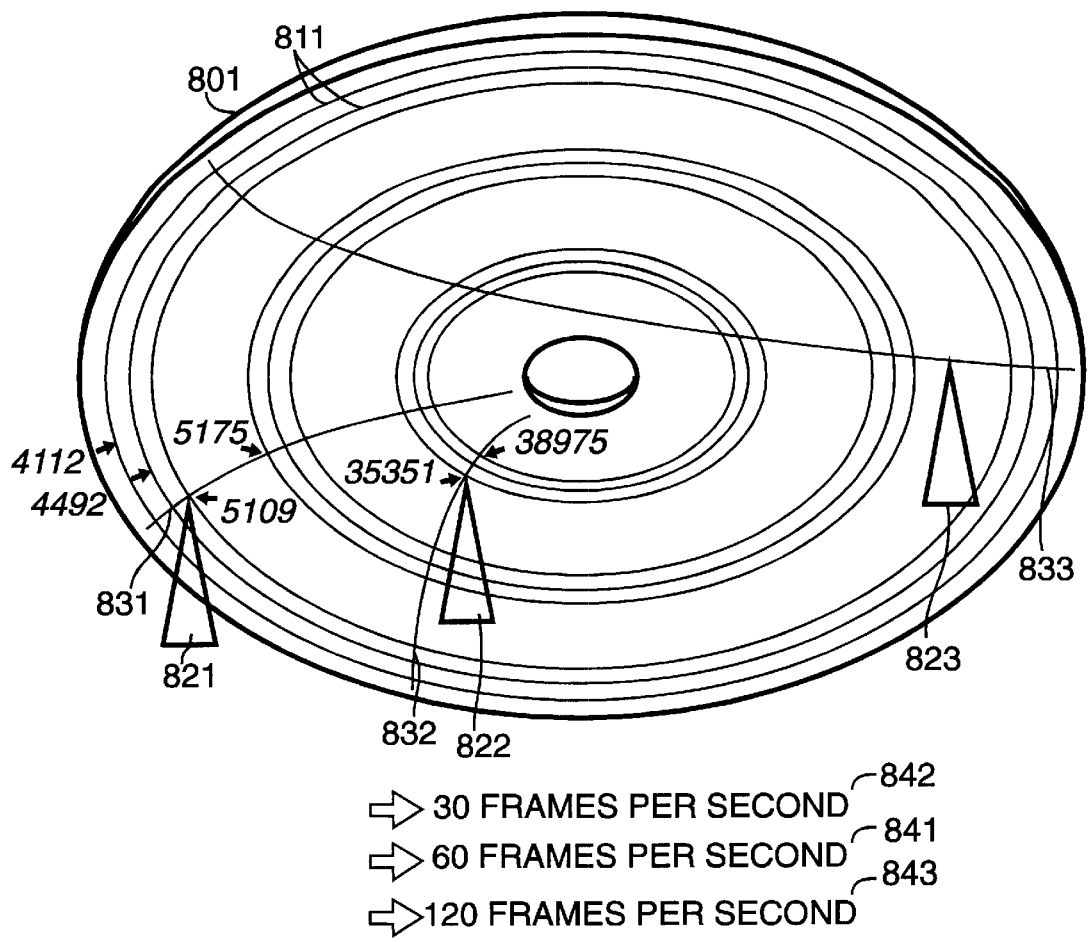
FIG. 8A is a schematic of a video disc player's multiple reading units architecture.

FIG. 8A shows a video disc 801 having therein, in a laser readable format, sufficient recording area 811 to store a variable content video. The recording area 811 of the video disc 801 is shown as substantially concentric tracks lying in a single plane. Alternatively, the recording area comprises a multitude of quasi-concentric tracks forming one or multiple spiral tracks. Additionally, as is implemented in the higher capacity DVDs, single tracks can be provided in one or more planes on each side of the disc, as well as on both sides of the disc.

In a preferred embodiment of reading non-sequential video segments from a single video source, a first reading unit 821 is directed by the segment scheduler to retrieve video information corresponding to the desired frames 4112–5109 of a first, or current, video segment from the video source. Concurrently with the first reading unit 821 reading the information from the first segment, a second reading unit 822 is positioned, according to the video map and the segment scheduler, to read within one revolution of the disc beginning frame information of a next non-sequential segment from the same video source.

In this example, the next non-sequential segment begins at frame 35351. Concurrently with the first reading unit 821 reading the current segment, the second reading unit 822 is caused to read into a video buffer (114 FIG. 1) that portion of the next non-sequential segment beginning at frame 35351 necessary to provider a seamless transition from the first reading unit reading of the current segment ending at frame 5109 to the second reading unit reading of the next non-sequential segment beginning at frame 35351. The video buffer, thus containing the segment information necessary to provide a synchronized, seamless transition from the first segment to the second segment without any gaps in the transmission of the retrieved video segments as a continuous video.

Concurrently with the second reading unit 822 reading the next non-sequential segment, now a current segment, the first reading unit 821 is repositioned to begin reading of a next non-sequential segment beginning at frame 5175. By the time the second reading unit 822 completes reading the current segment at frame 38975, the first reading unit 821 has read frame 5175. The process, analogous to a relay race, rep eats itself until the last desired segment has been read.

A video source herein is not defined by physical characteristics. Any number of components, devices, or systems; integrated or acting in coordination or combination comprises a video source. For example, an array of drives storing a video comprise a single video source. In such an architecture, the first reading unit may read information from a first drive and the second reading unit may read information from a second drive. A drive may have one or a plurality of reading units.

In an interactive video game application, a multiple reading unit architecture is advantageously utilized to additionally provide faster video responses to the user/player's actions. Briefly, while a first reading unit 821 is reading a first video segment, frames 4112–5109, a second reading unit 822 is positioned to read a second segment beginning at frame 35351. The positioning of the second unit 822, is responsive to the option being presented to the player during the reading of the first segment, which may require reading the second segment rather than continuing reading the first segment or reading the next sequential segment. Alternatively, the second reading unit provides overlay images in synchronization with the images retrieved by the first reading unit.

Each reading unit's movement over the disc surface is over a designated radial segment such that the movement of each reading unit over the recorded radius of the disc is not impaired by the movement of a different reading unit. In this fashion, the movement of the first reading unit 821 over its radial segment 831 does not intersect the movement of the second reading unit 822 over its radial segment 832.

It is noted that the reading unit's travel need not be limited to the radial segments. A positioning system providing for the positioning of the reading unit at any point over the recording media, provides the reading unit the potential to precisely intercept the beginning of a segment/frame at a precisely defined moment, which is represented in FIG. 8A as the juncture of a radial segment 831 and the beginning of frame 5175. In this fashion, the requirement of reading into a video buffer can be reduced if not eliminated.

FIG. 8A also shows a third reading unit 823. While a simple variable content motion picture application does not require more than two reading units, the third reading unit 823 is illustrated principally to emphasize that a multiple-read architecture is not limited to two reading units 821–822, and is available for more demanding interactive variable content game applications. Further, as illustrated, a reading unit's movements over the recorded surface need not be confined to a particular quadrant, side of the surface, or radius of the surface. In the illustration, the third reading unit's 823 movement over the recorded surface is permitted over the recorded diameter 833 of the surface.

Alternatively, or additionally, the information is recorded on the laser disc in a manner that, either through placement or duplication of frames, anticipates the desired and possible position of a reading unit. In this case, even if the movement of the reading units are confined to radial segments, the requirement of a video buffer is for this purpose eliminated. This is represented in FIG. 8A as the various junctures of the radial segments and the beginning of the frames.

Specifically, in this architecture, concurrently with a first reading unit 821 reading a current segment from a single video source, a second reading unit 822 is positioned to be able to intercept and read the beginning of a next non-sequential segment, in this example frame 35351, at that instant that the first reading unit 822 completes reading the current segment at the end of frame 5109. When the first reading unit 821 completes reading frame 5109, the second reading unit begins reading frame 35351, thereby in combination with the first reading unit causing a seamless transition from the reading of the current segment to reading of the next non-sequential segment.

In the next stage, concurrently with the second reading unit 822 reading the beginning of the next non-sequential segment at frame 35351, now a current segment, the first reading unit 821 is repositioned to be able to intercept and read the beginning of a next non-sequential segment, frame 5175 at that instant that the second reading unit completes reading the current segment at frame 38975. The process continues until all the required segments are read.

Still alternatively, or additionally, the rotational speed of the disc platter is set sufficiently high to permit the reading unit to read into buffers sufficient video information to provide the same reading unit sufficient time to reposition and begin reading the next non-sequential segment before the video information in the buffer is exhausted. This would, in certain applications, eliminate the need for multiple reading units.

Specifically, when non-sequential video segments are read from a single video source, a single video source 801 is caused to rotate at a sufficiently high rate 841, in this example 60 frames per second or 3,600 rpm 841, i.e. twice the rate of 30 frame per second 642, to permit a reading unit 821 to both read an amount of a current segment (frames 4412–5109) into a video buffer and sufficient for the reading unit 821 to be repositioned to read the beginning of a next non-sequential segment, frame 35351, before the amount of information in the video buffer is exhausted.

Reading frames 4498–5109 provides the reading unit 821 sufficient time to be repositioned to read a next non-sequential segment, frames 35351–38975. Concurrently with the repositioning of the reading unit, the video buffer provides the last read frames 4498–5109 to cause a seamless transition from the reading of the current segment, frames 4112–5109, to the reading of the next non-sequential segment, frames 35351–38975. This process continues until all the required segments are read.

In this architecture, the reading unit reads into the buffer only in advance of a next non-sequential segment, or continually reads into the video buffer as the video information in the buffer is depleted.

Figure 8B:
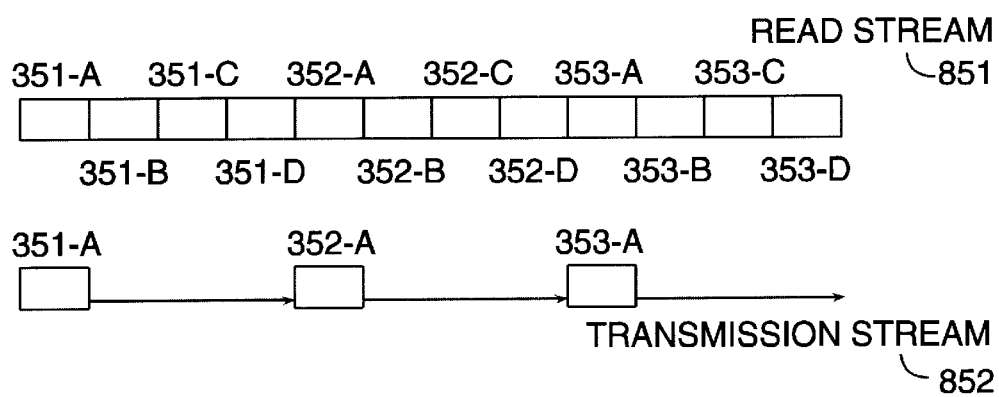
FIG. 8B is a diagram representation of a video reading stream and transmission stream.

A variation of this technique particularly applicable to interactive video game applications is detailed with respect to FIG. 8B. In this example, a read stream comprises alternating frames from a number of different video segments. The number of different video segments results from the attainable effective transfer rates of the system. For example, if the video application requires a transfer rate of 30 frames per second, and video compression techniques, rotational speed, and/or reading capability of the system can achieve an effective transfer rate of 120 frames per second 843 (FIG. 8A), than four different video segments can be read "concurrently" by a single reading unit. In such an architecture, the frame arrangement comprises a reading stream 851 of alternating frames from four separate segments A–D and is read at an effective rate of 120 frames per second. The processing architecture selects the desired segment A, B, C, or D from the read stream 851 to generate a transmission stream 852, at a rate of 30 frames per second, of the desired frames 351A–353A, 351B–353B, 351C–353C, or 351D–353D.

In this fashion a single reading unit can provide instantaneous shifting among a number of different segments. In an interactive video game application, shifting among a number of different video segments can be instantaneously achieved in response to a players interaction with the game's software logic.

Further, to enhance the simulation of each video stream, a windowing technique, such as shown in the previously cited patent to Blanton et al., in which only a portion of each frame is displayed, is applied to each frame in one or more of the video streams to enhance the simulation of movement within a multidimensional space and to provide composite images of greater complexity.

These and other variations in the particular number and arrangement of the reading units, video buffer, and frame arrangement configuration that is implemented in a Multimedia Player and/or in a video is a function of the complexity of the video/data, compression/decompression requirements, and cost/performance constraints. It is also intended that the teachings of the various configurations shown herein and in the cited art may be combined responsive to the particular application (e.g. DVD).

Clearly, with technology continuously achieving greater storage capacity in smaller, faster, and more cost effective storage devices, there is no apparent limitation to the complexity of a variable content video that can be commercially executed.

The description above has for simplicity been detailed with respect to a reading unit. It is to be understood that a reading unit herein comprises both reading and writing capabilities operationally independent of the operation of another read/write unit in the system's architecture. Additionally, a read/write unit need not be limited to a particular current technology. Enhancements to the construction of the reading unit itself, such as for example multiple tracking mirrors/beam splitters, are contemplated to produce faster access times and transfer rates. Further, the multiple read/write architecture detailed need not be limited to a laser readable disc system. In an alternate embodiment, a hard disk drive is modified as per the teachings above detailed to significantly increase transfer rates and lower average access times. Clearly, at present, in a hard disk embodiment the read/write units are magnetic read/write heads.

A random access device's read/buffer architecture, modified as per the teachings herein, is intended to be implemented in a variety of mass memory devices. Embodiments of the read/buffer architecture detailed herein is not intended to be limited to any particular available recording medium and recording formats. The teachings herein are applicable to a number of random access technologies such as, and not limited to, fixed and removable magnetic, optical, or photomagnetic media, and digital or analog recording formats. Any combination of existing or forthcoming media, format, and compression memory technologies may advantageously incorporate the teachings herein detailed.

Figure 9A:
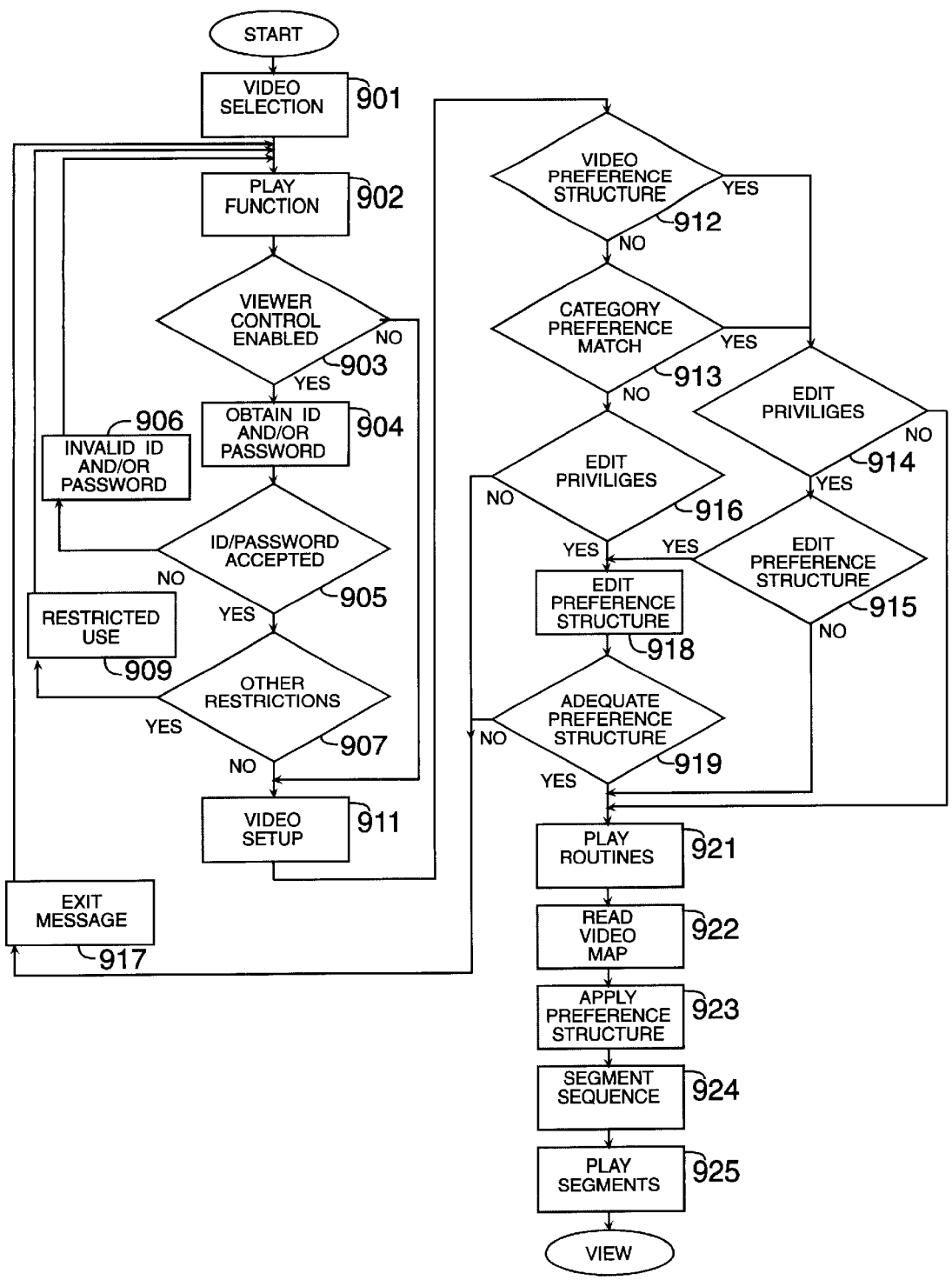
FIG. 9A is a flow chart detailing the steps of playing a variable content video.

The steps comprising the method of playing a variable content video disc on a Multimedia Player are principally detailed with respect to the flow chart of FIG. 9A. Beginning at step 901, the viewer selects the desired video disc, e.g., a DVD. Upon selection of the play function 902, a Multimedia Player's software, firmware, and hardware processing capabilities ("processor") issue a command to read the viewer control setup to ascertain if viewer control is enabled 903. If enabled, the Multimedia Player's handshaking routines request viewer identification and, if required, a corresponding password 904. If the viewer identification and password are not found acceptable 905, the appropriate error message is transmitted to the television or similar viewing device 906, and the Multimedia Player is returned to a state prior to the viewer play request 902.

If viewer identification and password are found acceptable 905, the processor checks for other restrictions to a user access 907. These additional restrictions include: time of day restrictions for the user, and/or accumulated usage during specified time frames. If restrictions are enabled that prevent usage 907, an appropriate error message 909 is transmitted to the television, and the Multimedia Player is returned to a state prior to the viewer play request 902. The user-permission capability enables a parent to have complete control over the use of the Multimedia Player, and provides for multiple individualized preferences. U.S. Pat. No. 5,231,661, incorporated herein by reference, titled "Television Viewing Control Device and Method" details "A device and method for controlling television usage by children and other users."

If viewer control is not enabled 903, or if enabled and verification of the user 905 and verification of restrictions permit usage 907, program setup routines are initiated.

Program setup routines 911 include reading, from the video source, video identification information. Based on the video identification information, which in addition to including a unique identification code also contains qualitative and classification video information, setup routines search to see if a corresponding viewer content preference for the identified video is available 912. Otherwise, the video's content category structures 913 are obtained from the video source to determine if a viewer content preference is established for each of the video's content categories.

Once the viewer's content preferences are established, the processor verifies set up status for editing privileges 914, to determine if the viewer has editing privileges for the class of videos to which the present video belongs and the categories included therein. The processor at this point transmits to the television a request for the viewer to indicate if the existing preferences are to be edited 915. If at step 914 edit privileges are not available for the viewer, the processor initiates normal play routines. If the viewer indicates that no editing privileges are to be exercised 915, normal play routines are initiated as well; otherwise, editing of the viewer content preferences occurs at step 918.

The edited viewer's content preferences are interactively verified 919 until an adequate category preference match, as required by the video and the user is established, or the viewer selects to exit. Exiting at 919 returns Multimedia Player to a state prior to the viewer play request 902.

If a viewer's content preferences for the video are not available 912, or at least one of the categories of the video is not contained in the viewer content preferences 913, then the processor verifies if edit privileges are available for the viewer for the class of videos and the categories 916. If no edit privileges are available, an exit message 917 is transmitted to the television, and Multimedia Player is returned to a state prior to the viewer play request 902. If edit privileges are available 716, then editing of the viewer preferences 918 is initiated.

Editing the viewer preferences 918 is supervised to insure that viewer modifications are consistent with the permissions established for that viewer. Individual viewer permissions are established broadly for any one or more classes of videos or categories, or specifically for any category. Once editing of the preferences is found complete 919, as required by the video category listing, play routines are initiated.

Following the enabling of the play routines 921, the video map is read 922 from the video map storage media or memory. As previously detailed, the video map defines the sequential and non-sequential segments of the selected video. At this point, the processing capabilities retrieve and apply the viewer's content preferences to the video map 923.

In a preferred embodiment, the application of the viewer's content preferences to the video map results in the automated logical selection of sequential and non-sequential segments of the selected video 924 consistent with the viewer's video content preferences and the video map. In other words, any segments with a content coding higher (abstract) than the viewer-selected content preference for the corresponding category would not be included in the video produced for the viewer. The segment selected for viewing having a coding level equal to or lower than the viewer specified content preference for that category is selected and provides, where necessary, the next segment beginning frame information. This will skip over parallel segments of a lower coding than the viewed segment.

Once the segments to be played and their sequence are determined 924, the random access retrieval and transmission capabilities automatically retrieve the selected sequential and non-sequential video segments stored in the video storage device, and transmit the video segments as a seamless, continuous video 925.

In a interactive video game, the start and setup routines detailed with respect to FIG. 9A are integrated with a game's setup routines.

While many interactive capabilities are possible, it should be clearly understood that the playing of a variable content video does not require that the viewer preview the contents of segments of the video, and does not require viewer intervention or interaction during the viewing of the video.

It is emphasized that following the initial setup of a Multimedia Player with a viewer's content preferences, a subsequent viewing of a variable content video conforming to a standard descriptive structure only requires the pressing of a play key. After the pressing of the play key, the Multimedia Player automatically initiates playing of the video without the necessity of any further viewer interaction or instructions. In other words, in a standardized content descriptive architecture, once a Multimedia Player initially learns the viewer's content preferences, it does not require any more of the viewer than, for example, a conventional laser disc player.

Similarly, in the playing of an interactive content-on-demand game, once the Multimedia Player initially learns the viewer/player content preferences, the gaming interaction proceeds transparently of the video editing functions.

With the object of promoting multiple plays or viewings of a video by the same viewer, the video and video map are authored and the Multimedia Player's software is enhanced to accommodate methods were a playing of, for example, one or a set of segments is played in one instance of a playing of a video and not in another instance of the playing of a video by the viewer.

In one method, a playing of one segment may be responsive to whether it is a viewer's first or subsequent playing of the motion picture. In other words, in addition to establishing explicit or implicit linkages among segments, a video map includes segment definitions that are coded in such a manner as to enable playing certain segments on a first playing of a video and playing of other segments on a subsequent playing of the video, e.g., a second playing, or any playing following a second playing. For this purpose, a video map may assign each multiplay segment to one or more of a plurality of specific playings, e.g., 1–10.

The Multimedia Player's software may be configured to track multiple playing for each viewer in, for example, a household, and for all videos, classes of videos, and/or specific videos.

Alternatively, or additionally, a multiple playing tracking may be set in such a manner as to ensure that all of the segments that may be played are played within a viewer selected number of playings. For example, a viewer may determine based on the general subject matter of a motion picture that the viewer is likely to play the motion picture three times. Accordingly, the Multimedia Player's tracking software would cause the playing, for that viewer, of multiplay segments to be spread over the projected three playings. The software would then merge the multiple play codes into the plurality of desired playing, e.g. segments coded 1–3, would be played in a first playing, segments coded 4–6 would be played in a second playing, and segments coded 7–10 would be played in the a third playing.

Still alternatively, or additionally, the tracking software may itself code the various segments for the number of projected playings. The video map in this case need only flag segments which may be suitable for a multiplay.

Certain motion pictures may permit the viewer, at any point prior to or after initiating applying of the video, to force the playing of all the possible segments and non-mutually exclusive segments. Further, a viewer may decide, after initiating playing the video, to change the number of projected playings. In both cases the tracking software would adjust the playing of the multiplay segments.

Still alternatively, or additionally, segments may be coded with or associated with a random function to enable playing responsive to, for example, a number/bit code, assigned to a segment, that is compared for a match with a software extracted or randomly generated number/bit. The randomness of the playing of multiplay segments may be established with respect to any number of different probabilities. In the playing of motion pictures, at least a 33% probability or preferably a 66% probability that a segment is played has been found to give satisfactory results.

Additionally, different probabilities may be established for different playings. For example, a playing of a segment may be responsive to a 33% probability in a first playing, a 66% probability in a second playing, and 100% probability in any playing after the second playing. Further, different random settings can be set for, for example, each viewer in a household. For example, a parent may find it advantageous to establish for small children a low probability preference, and/or set a multiplaying preference that causes the segments to be spread over a greater number of playings.

Thus, independently or in addition to other coding (e.g. violence and/or MPAA rating), segments may be coded for i) a specific playing of the video (e.g. the first, second, and/or any subsequent playing after, for example, the first playing); ii) completely random for each segment; iii) completely random for a set of segments; iv) a combination of random and specific playings; and/or v) other methods, e.g., method specific to a video.

Further, the method, behavior and/or inclusion of multiplay segments need not be the same within any given playing of a video, or any subsequent playing. Segments produced for a subsequent playing need not require, when played, the exclusion of the playing of other segments. A subsequent playing may in fact reward the viewer with the longer version of a motion picture. As may be required by a specific methodology, the tracking software would cause a retention of the information that may be required for a subsequent playing.

The objects of multiple playing challenges the filmmaker to accomplish much more than providing multiple camera angles. Further, while it may also be incorporated, the objects are not, necessarily, to change the storyline, ending, or the levels of explicitness. Segments may be produced with the principal purpose, consistent with the artistic presentation, of introducing freshness to a subsequent playing of the video. Examples, are segments that bring an unexpected perspective or twist to a scene or to the development of a character, and segments that take the viewer through a detour from, and later rejoin, the primary storyline.

Multiplay methods may be advantageously incorporated in the playing of, for example, "whodunits". In such instances, for example, more clues or explanations may be presented to the viewer by multiplay segments that emphasize clues or link the importance of events. Often the ending of the story requires that an event had taken place, which could not have been shown during the initial playing. Multiplay segments may provide an opportunity to show the event taking place (the viewer already knows who did it) or the possibility of the event taking place. This would, for example, serve to establish a viewer's credibility for the internal logic of the story.

By contrast to the selection of camera angles in the playing of a multiangle DVD, segments produced for multiple playing purposes may be coded in such a manner as to inhibit the kind of viewer content controls that would otherwise permit the viewer to control the playing of multiplay segments. Additionally, a playing of one of a set of multiplay segments, e.g., segments relating to the same scene or event, may be mutually exclusive with a playing of another one of the segments of the set. That is, for example, whether the contents of the set of segments are duplicative or inconsistent, the playing of one segment of a set precludes or inhibits the playing of another segment in the set.

Multiplay segments need not be provided with the original release of the video. A video-on-demand environment facilitates supplementing the originally released content at such time and under the conditions which the producer may find most advantageous. For example, visitors to the producer's web site may be permitted to download segments that augment the enjoyment of a subsequent playing of a video which might have been provided in a DVD. In those instances where the multiplay segments are included within the video, the segments may be coded in such a manner as to not be playable until, for example, a specified data beyond the initial release of the video, and/or beyond, for example, a first playing of the video.

The steps in the playing of multiplay segments of a variable content video expand upon the steps previously detailed with respect to FIG. 9A, and, depending on the particular embodiment, are incorporated with, and/or added to, the methods of applying a viewer's content preferences to a video map. Alternatively, or additionally, as shown, in FIG. 9B, the steps in the playing of multiplay segments of a video may be independent from any other of the capabilities that may be supported by a video map.

Figure 9B:
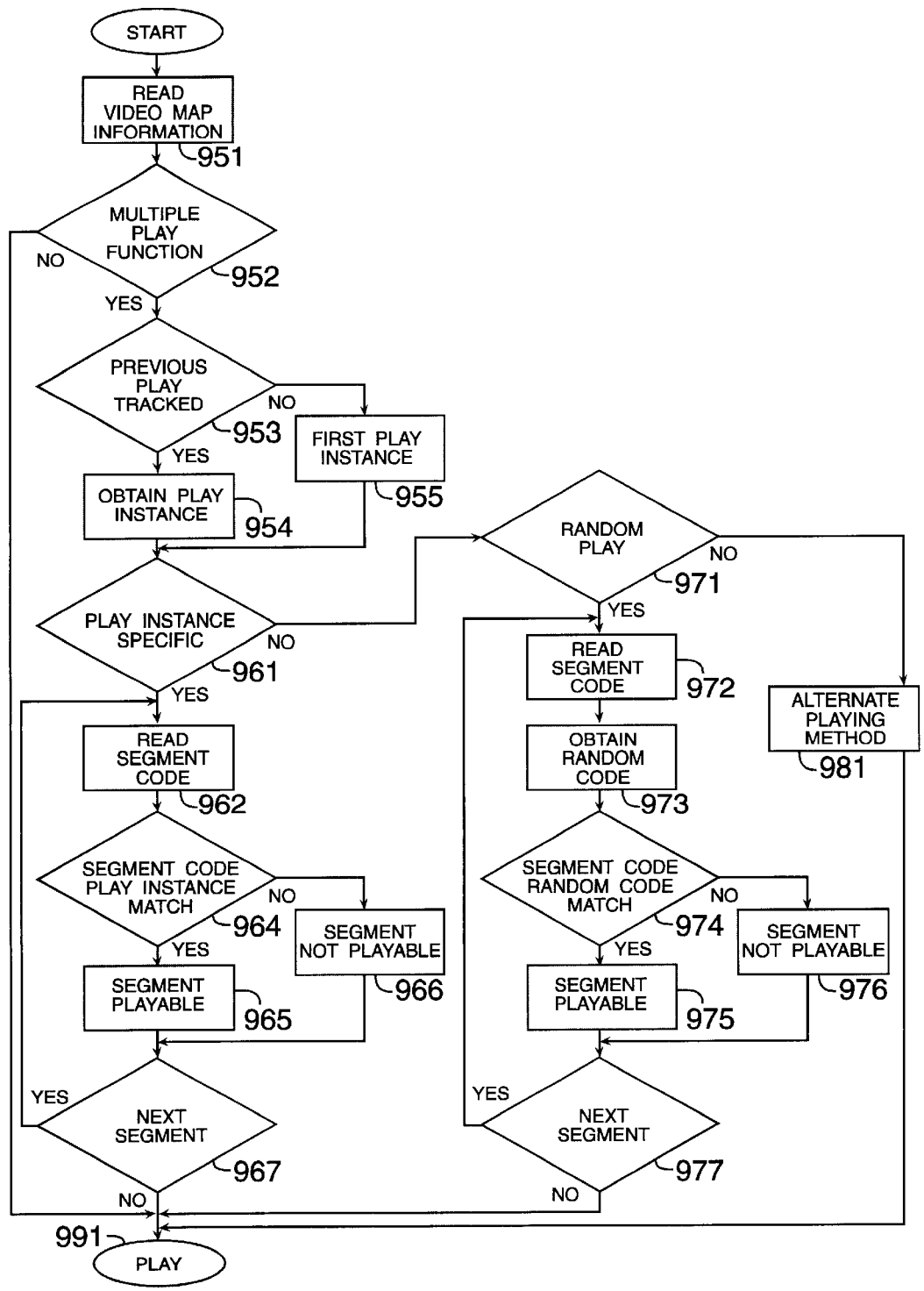
FIG. 9B is a flow chart detailing the steps in the playing of multiple play segments of a variable content video.

Accordingly, with respect to the flow chart of FIG. 9B, in the playing of a video, a video map is read 951 that directly or indirectly, e.g. camera angles or flagged segments, identifies video segments suitable for the activation of the multiplay function. If multiplay segments are available, a multiplay function is activated 952, and an inquiry of a tracking of a previous play is made 953. If multiplay segments are not available 952, the playing of the video proceeds without the activation of the multiplay function 991.

If the multiplay function is activated 952, and a previous playing of the video has been tracked 953, the retrieval of previous play information is performed 954. If the video has not been previously played by that viewer, i.e., tracking information is not available, the multiplay function operates on the basis of it being a first playing instance of the video 955.

Alternatively to the presumption of a first play 955, and/or as a verification of the accuracy of the tracking, the multiplay function could cause a direct inquiry of the viewer to ascertain the correct or desired playing instance 955. For example, the multiplay function could accommodate a viewer that may have come to expect that the content of the second playing would be preferable to the content of the first playing, and would prefer to initially play the video as if it was a second playing.

The multiplay function then determines if the playing of the video is to be responsive to the specific play instance 961. In other words, the multiplay function ascertains if, for example, the Multimedia Player has been configured to play the video according to the specific play instance methodology, a viewer has selected the specific play instance methodology, or the video itself requires a playing according to the specific play instance methodology. If the playing of the video is to be responsive to the specific play instance 961, if not already available, the appropriate segment information or code is obtained from the video map 962.

In order to determine if a segment or group of segments is to be played, the segment instance code, previously obtained 962, is compared for a match 964 to the play instance information previously obtained 954/955. Based on the comparison 964, the segment or segments are determined to be playable 965 in this instance or not playable 966.

If a next segment or group of multiplay segments 967 require a similar determination of playability, the process is repeated with the reading of the segment code or codes 962 as previously detailed. Otherwise, the playing of the video begins or other functions required in advance of the playing are activated 991. Alternatively, the segment or set of segments are played as each play determination 964 is made.

If the playing of the video is not to be responsive to the specific play instance 961, the multiplay function then determines if the playing of the video is to be responsive to the random play methodology 971, and if so proceed by obtaining a segment code and/or other video map information 972 which may affect the random functions with respect to, for example, the generation of a random code 973, or the availability of random codes, or the particular matching methodology utilized.

In order to determine if the segment or group of segments is to be played, the segment code, previously obtained 972, is compared for a match 974 to the random code generated and/or obtained 973. Based on the comparison 974, the segment or segments are determined to be playable 975 in this instance or not playable 976,.

The playing of multiplay segments based on a random play need not require matching a random code with a segment code, the random play function could generate a random code and if such code matched some predetermined value the segment would be playable. For example, program routine implemented would simulate a coin flip, i.e. a On bit or an Off bit, and would determine the segment as playable on the occurrence of the On bit. Thus, any suitable method which may provide a random playing may be instead be implemented for the matching step 974 previously detailed.

If a next segment or group of multiplay segments require a similar determination of playability 977, the process is repeated, if required with the reading of a segment code 972, as previously detailed, and, if required, with the obtaining or generating of a random code 973, as previously detailed. Otherwise, the playing of the video begins, or other functions required in advance of the playing are activated 991. Alternatively, the segment or set of segments are played as each play determination 974 is made.

It is emphasized that the interplay between play tracking information, a segment random code, other video map information, and an obtain ed, otherwise extracted, or generated, random code, offers a plurality of possible combinations and methods of determining a playing of a segment or group of segments. For example, alternatively, or additionally, to the specific play instance methodology 961/964 and the random play methodology 971/974, an alternate playing method 981 may be implemented that, for example, is a combination of both of these methodologies, and/or implements, for example, a method particular to, or specifically prepared with the authoring of the video. An example of a combination methodology would be in a first playing, segments relating to the storyline would be played based on a segment code play instance match 964, and segments relating to the action or violent scenes would be played based on a random determination 974.

The simplified flow chart of FIG. 9B only shows some of the configurations that the permutations and/or various combinations of the specific methods and elements make possible. The particular arrangement of steps and/or labeling utilized in the flow chart are to be understood as suggestive of the detailed disclosure herein.

Further, while the playing of multiplay segments of a video has been detailed with respect to methods which are independent of the playing of another video, an alternative method makes the playing of multiplay segments of a video dependent on how, and/or which of, the multiplay segments of another video were played. This particular embodiment offers creative possibilities in the playing of a video which, for example, is related to, or is a sequel of, a first played video. For example, the playing of a segment in a subsequent video which further expands on the development of a scene would be conditioned on the playing of a multiplay segment of a first video which introduced the development of that particular scene.

As suggested previously, the capabilities of a Multimedia Player are particularly well suited for providing a supervisor (i.e. parent) complete control as to the video material to which a viewer/player (i.e. child) is exposed. As indicated above, a Multimedia Player provides: viewer, time of day, amount of viewing controls; and individual preferences for each viewer/player or class of viewers/players. The teachings of U.S. Pat. No. 5,550,575, titled "Viewer Discretion Television Program Control System", is incorporated herein by reference.

Additionally, supplementary or alternative routines are provided for those instances where: i) segments cannot be rated according to standardized descriptive structures; ii) the utilization of a descriptive structure system is not desired; or iii) a simpler routine provides the desired functionality. Specifically, routines permits a supervisor to automatically select segments of a video previously identified in a video map as providing material which may not be suitable for a viewer (e.g. flagged segments or PG-13 segments); viewing the selected segments and determining their suitability for viewing by the viewer; automatically generating a segment table responsive to the segment suitability determination and the video map; automatically retrieving segments responsive to said segment table; and automatically transmitting the retrieved segments as a continuous video for said viewer.

Figure 10:
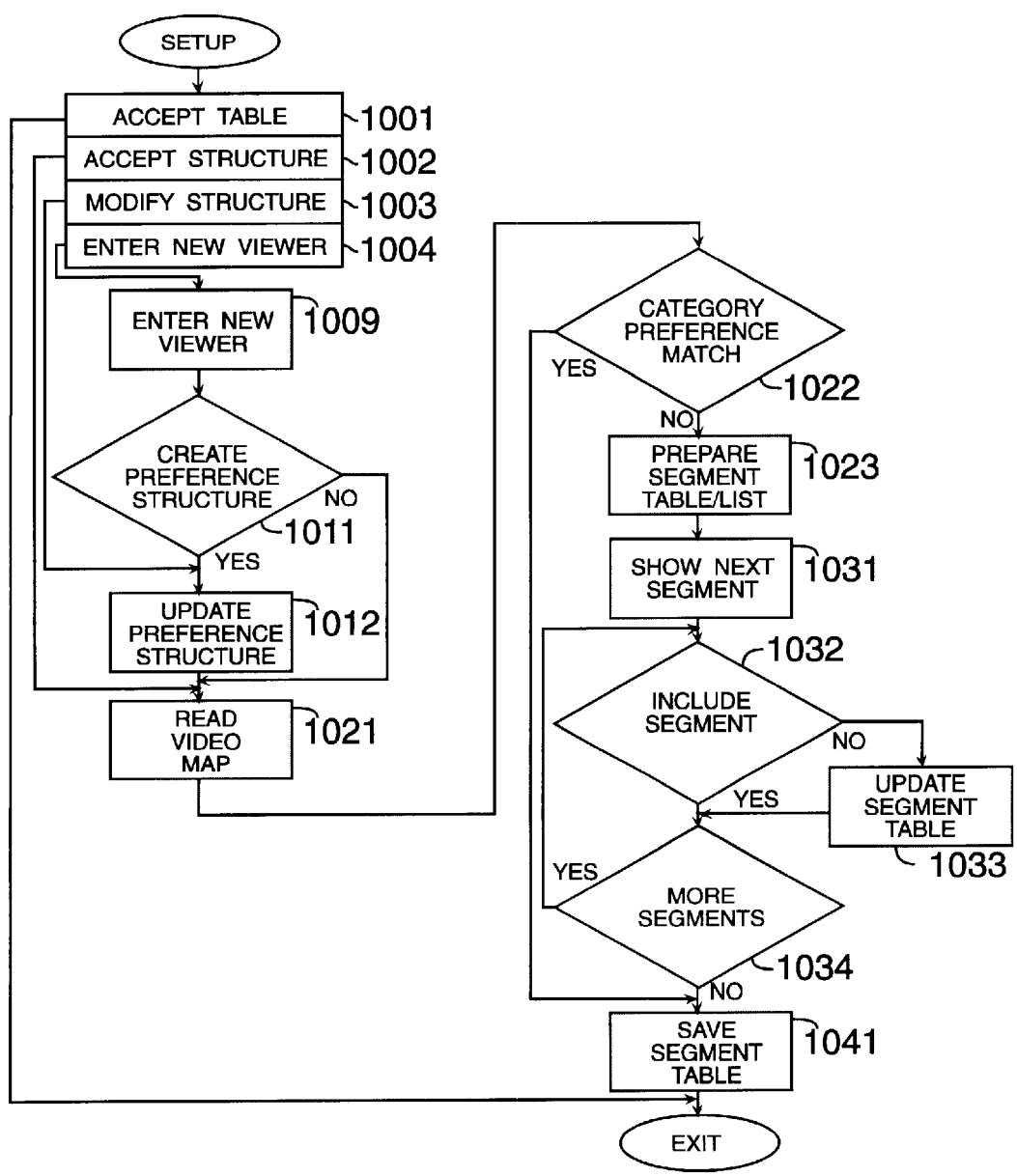
FIG. 10 is a flow chart detailing the steps of previewing flagged segments.

An example of the editing routines that provide for the efficient previewing of flagged segments are summarized with respect to FIG. 10. One of a number of setup routines present a listing of viewers over which the supervisor has supervisory control. With respect to each viewer and the selected video, the listing indicates if a segment table is already available 1001, and if viewer preferences are available 1002 or not 1003. Additionally, the option to designate a new viewer 1004 is made available to the supervisor.

If a corresponding table for the desired viewer is available 1001 and the supervisor does not wish to make any changes, selecting this option exits the routine, and the operation of the Multimedia Player is then permitted as detailed previously. If a corresponding table for the selected viewer is not available, and the supervisor does not wish to create or update the viewer's preferences 1002, the routine proceeds by reading the video map 1021. If the supervisor wishes to modify or create viewer preferences 1003, the routine proceeds with the appropriate routines 1012. If the supervisor indicates the entry of a new viewer 1004, the appropriate viewer entry routines are enabled 1009, and the opportunity to create viewer preferences for the new viewer is provided 1011.

The routines to update/create new preferences 1012 permit both a video specific or permanent updating of the selected viewer's preferences. Once viewer preferences are indicated, if any, the selected video's video map is read 1021 and compared to the preferences 1022 to the extent that they are available.

If all the flagged segments are effectively excluded by the viewer preferences 1022, the resulting video segment table is saved 1041 and the routine is exited. Otherwise, in addition to an initial segment table, a list is prepared 1023 consisting of any flagged segments that have a descriptive level inconsistent with the corresponding level in the preferences, and flagged segments for which there is no corresponding preferences. In the absence of a viewer's content preferences every flagged segment is included in the segment list.

In a manner similar to the retrieval of non-sequential segments outlined previously, only the segments in the segment list are shown one after the other 1031 as a continuous stream to the supervisor, pausing only if an include/exclude decision is not indicated 1032. The process continuing automatically 1034 until a decision on each of the flagged segments in the list is made 1032. As each decision is made the segment table is updated 1033. Alternatively, the segment table is updated and saved following the transmission of the last segment 1041.

Each segment need not be viewed in its entirety 1031. As soon as an include decision is made 1032, the showing of the next segment begins instantaneously.

A showing of a flagged segment is not limited to the actual transmission of the flagged segment's video/audio. Appreciating that certain adults may not be interested in viewing the flagged segments, a character description of the contents of the segment may be provided instead or in advance of the option to view the corresponding segment.

The above is presented to emphasize control features and capabilities, and that particular routines shown can be enhanced in a number of ways. Configuration routines are contemplated that further facilitate and automate viewer/player controls. For example, a configuration can be selected that automatically creates for selected or new viewers/players a segment table excluding all flagged segments. In this case, at system setup, a viewer is simply associated with the exclusion of all flagged segments.

Similarly, alternatively, or additionally, at:system setup, a viewer record and/or Multimedia Player is associated with an appropriate descriptor, e.g., rating code, thereafter, the viewing/playing of a video is consistent with the established preference. The simplicity of this method in combination with the teachings of the variable content video permits, for example, by means of a single code associated with each viewer, a parent to view an "R" version of a film, and permits a child to view a "G" version of the same film. It is noted that this architecture provides more tailored control than the simpler exclude all flagged segments architecture, but significantly less customized control than a category specific video content preferences.

In a preferred embodiment, the various coding and descriptive schemes and structures detailed above are correlated to permit the application of a variety of content control options without requiring duplicating coding definitions. For example, assigning a segment a code other than a "G" code is equivalent to flagging the segment.

As detailed herein, it should be recognized that content preferences in general, and preferences for a content level in each of a plurality of content categories, in particular, are utilizable both in the selection of a video and/or in the selection of a version or customization of a selected video. The teachings of U.S. Pat. No. 5,410,344, titled "Apparatus and Method of Selecting Video Programs Based on Viewer's Preferences, and of U.S. Pat. No. 5,678,012, titled "Method and System for Selecting a Video Piece From a Database", are incorporated herein by reference.

A Multimedia Player's capability to obtain videos from a remote video provider permits an end user to efficiently obtain, from an extensive videobase, a video(s), segment(s) of a video, and/or segment(s) from each of a plurality of videos, to be viewed at the time of the user's choosing, over which the user exercises complete control as to the subject matter, form of expression, and other elements comprising the video. Further, the resulting video need not comprise or result from a single videobase. A video may result from the automated selection of a variety of segments/videos from one or a plurality of videobases.

Accordingly, for example, a user wishing to retrieve a summary, analysis, and background regarding a particular news event, will enter his/her request, and a keyword analysis of the request will then result in an on-line linkage through the service center to a database containing information on the videobases for the subject matter desired. In this example, a news source remotely located, will download a listing of the various sources of summary, analysis, background information, the corresponding video maps where available and necessary, and the overall lengths and costs, if any, of each segment. Based on this listing, the user may at his/her leisure produce a request for a video for his/her own viewing. In this example, a video comprising a 10 min. summary from a news source, a 5 min. analysis from another service, a 10 min. analysis from a private source, a 30 minute lecture from a university, and copies of a relevant data from the Library of Congress are requested.

Once the user finalizes the video segment choices, the request is transmitted to the service center, wherein the various providers (libraries) which may be located anywhere in the world are electronically requested to transmit the respective segments/programs, video maps, and any user routines. These are logically assembled and merged by the service center and retransmitted to the user together with any billing information. The transmission and retransmission of the videos might be on a non-realtime compressed digitized format.

The event duration in this example may be 15 minutes of connect time, 2 minutes of transmission time (for the 55 minute "video"). The costs for the service may be less than a conventional movie, and may include a partial rebate for the user selection to activate the five minutes of targeted "advertisements" that are included. The particular billing methods and apparatus required are currently implemented in other on-line data retrieval services.

Since a Multimedia Player may be both a retriever and a transmitter, the above "video" might be condensed by the user into a 10 minute summary and a 2 minute personal message and transmitted to another user, incurring where applicable connect time and redistribution charges.

In another example, a user may construct, a content preference structure of any desired detail, further including, for example, a variety of keywords to describe the video's subject matter, content preferences, the story line, possible endings, and approximate video playing time. The user will transmit this information to a video provider. The user will further indicate the video's delivery by requirement (minutes, overnight, days), and whether the request is for a single video or a series of videos, and their frequency.

The video provider will analyze the user request, and search the videobase for a video matching the user's requirements. If the video is found, then video information, and billing, if any, are transmitted to the user for approval and subsequent video transmission to the user. The video information transmitted to the viewer may include, for example, a list of the videos that are responsive to the viewer's content preferences and subject matter and/or programming preferences, as well as detailed descriptions including the amount, percentages, times, and other quantitative and qualitative information regarding the content of each of a plurality of content categories. The information provided the viewer may also include, for example, the theatrical trailers, as well as linkages to web sites/pages that may provide additional information.

If the video is not found, the user's request is forwarded to an appropriate video producer for possible production. The "custom" videos generally follow a preestablished per transmitted viewable minute fee structure based on the subject matter and nature of the video.

Conversely, a producer, rather than following conventional practices for raising funding for the productions of a video, may elect instead to the place a video project's synopsis and other information, (e.g., directors, actors,) normally made available to prospective purchasers and/or investors, directly before a potential audience. When sufficient pay-per-view or other viewer commitments have been accumulated, and to the extent necessary, verified at the appropriate time, then the project can be directly financed by the viewer's or indirectly financed by a lending institution that would advance the necessary funds.

As in the case of conventional investors, the funding public may also be given an opportunity to participate in any profits that may be generated. Further, since a significant amount of time is required from funding to delivery of the video, the viewer's interest may be maintained and enhanced by periodic appraisals and delivery of "filming of" vignettes, actor appearances, etc. that would serve to bond the public's interest to the production.

Although other schemes are possible, production inevitably depends on an expected or actual critical mass of viewers and any sponsorship, both public and private, that may be associated with a video project. The various network systems herein suggested facilitate the communication and marketing required to obtain the necessary viewers and sponsorship for the production of a video.

Examples of the variety of uses of such video production services include: i) science fiction enthusiasts sponsoring a production of a particular story, i.e., a 21st century version of "Romeo and Juliet"; ii) viewer consensus selecting the character and theme for a sequel to a video that they have viewed; iii) updating of news stories no longer deemed "current"; iv) continued appraisal of developments in a specified field or subject area, i.e. significant events which might affect the price of a specified commodity; v) review of a political candidates positions; and vi) product purchasing and utilization information.

In a video-on-demand environment, typically, viewer's will request the delivery of specific pre-produced variable content videos. In addition to the other method disclosed herein a video may be obtained by, for example,: i) specifying the video's title or code obtained from a reference guide; ii) making a selection from a listing in alphabetical order by title, subject matter, actors, etc.; iii) tree structure of video classifications, for example advertisements, automobiles, 4WD; iv) keyword searching and retrieval (similar to the Automated Patent Search implementation); v) specifying preferences for a content level in each of a plurality of content categories; and vi) any combination of these. It is noted that a reference guide may be available in a printed format or, preferable, a real-time format compatible with a Multimedia Player, e.g. retrieved from a Web site.

In the event that a match between a viewer's content requirements is not exactly satisfied by the available videos, the search software may, at the viewer's option or by default, reduce or eliminate content criteria to provide a listing or selection of videos that approximate as close as possible the viewer's requirements. For example , assuming that a viewer's request comprises, among other content requirements that a motion picture include graphic sexuality and a high level of suspense and humor, and that no such motion picture is found. Than the video provider's videobase search software could lower the level of sexuality to explicit, and search on that basis. The search could alternatively, or in addition, lower the level of suspense to a medium level. On this basis the viewer is than presented with a listing of the available motion pictures at each of the adjusted combination of requirements.

A listing of available videos could be in form similar to that provided by an Altavista web search, with links to home pages and/or links that would play, for example, the theatrical trailer (773 FIG. 7E).

Once a video is selected, the entire variable content video, including all the parallel and transitional segments and the video map, may be transmitted to the user's Multimedia Player. When the video map is not downloaded, a video is transmitted that results from the application of the viewer's video content preferences to the video map of the requested video. That is, only a logical seamless sequence of only those segments that are consistent with a viewer's content preferences are transmitted in a real-time or a non real-time format over the network to a Multimedia Player for display on a TV. For example, when the video provider utilized a DVD having two versions, and the viewer has selected one of the versions, only the segments consistent with the selected version are transmitted to the Multimedia Player.

In those instances where the entirety of a variable content video is downloaded, the Multimedia Player need not store all of the segments, and if all of the segments are stored, they need not all be stored for more than a transitory time, i.e., the time for a user to desire the erasure of undesired content. A video map provides the information to omit the initial storage or to erase, the storage of content of the video. This would be of particular benefit for, for example, a parent downloading an "R" motion picture, and after viewing it, causing the erasure of those segments which are inconsistent with a "PG" version. Or for example, a viewer causing only a selected story or segment from a news program or video magazine to be saved.

A significant advantage of the partial erasure of content is that storage capacity is freed for a subsequent use. With the further advantage of a random access medium, such as DVD-RW, new content can be added to the unused sectors or areas, without necessarily rewriting saved content. The operation being similar to the storage of data in the magnetic drive of a PC. In such instances, the original video maps may be retained and/or incorporated within a master index of the contents of the storage device.

To ensure the usefulness of a video map and any service associated with the delivery of a video map, the video map may be, for example, encrypted, and other security methods may be implemented to verify the origin, authoring, and/or integrity of the video map. Additionally, the operation of the Multimedia Player's software may be dependent on the validation of the video map. In other words, in those instances where the source and/or integrity of the video map cannot be verified by the Player's software, the video is not played. In such instances, the player may create a failure record accessible, under password control, by the Player's administrator, e. g., a parent. Similar methods may be applied to a viewer's content preferences.

Utilization of the video need not await the completion of the downloading. The viewer can begin viewing the video in real-time while the video is being downloaded in real-time or non-realtime (burst downloading). Further, the downloading of the video need not be accomplished in one session. Short burst downloading will provide a portion of the video. As that portion is utilized control software will relink the Multimedia Player with the video provider, request and receive a next portion, and disconnect the active linkage. During this operation, automatic and transparent to the user, a constant transmission of the video is maintained. In instances where a particularly popular video in continually available on the network, the Multimedia Player may "catch" segments as required.

Short burst downloading is advantageous where the storage capacity of Multimedia Player is insufficient for the storage of the complete video. Short burst downloading is also, for example, advantageous where a video provider s resources are challenged by a plurality of end users. By utilizing short burst downloading and overlaps, a single video stream is able to serve a plurality of end users simultaneously. The control logic of this architecture is analogous to that utilized by single waiter serving a plurality of parties (tables) in a restaurant.

Alternative to a Multimedia Player initiating the re-linkage with the video services provider, the control logic of the video server periodically checks on the progress of the end users, downloading and scheduling subsequent transmissions responsive to each end users needs and the overall demand on the available resources.

Alternatively to the downloading a video, the end user remains on-line with the video provider during the transmission of the video and utilizes the hardware resources of the video provider. In an on-line architecture, a Multimedia Player comprising principally communications capabilities without significant local storage, processing, or memory, is adequate. In such an architecture, a viewer's content preferences, if not stored in the Multimedia Player, may be retained by the video provider.

The off-site video server will respond to the user's commands in a manner similar to that detailed previously for the video disc player implementation. The viewer's control over the video, such as for example pause and skip functions, are the same, whether a Multimedia Player retrieves a video from a remote or a local source, e.g. a DVD.

Figure 11:
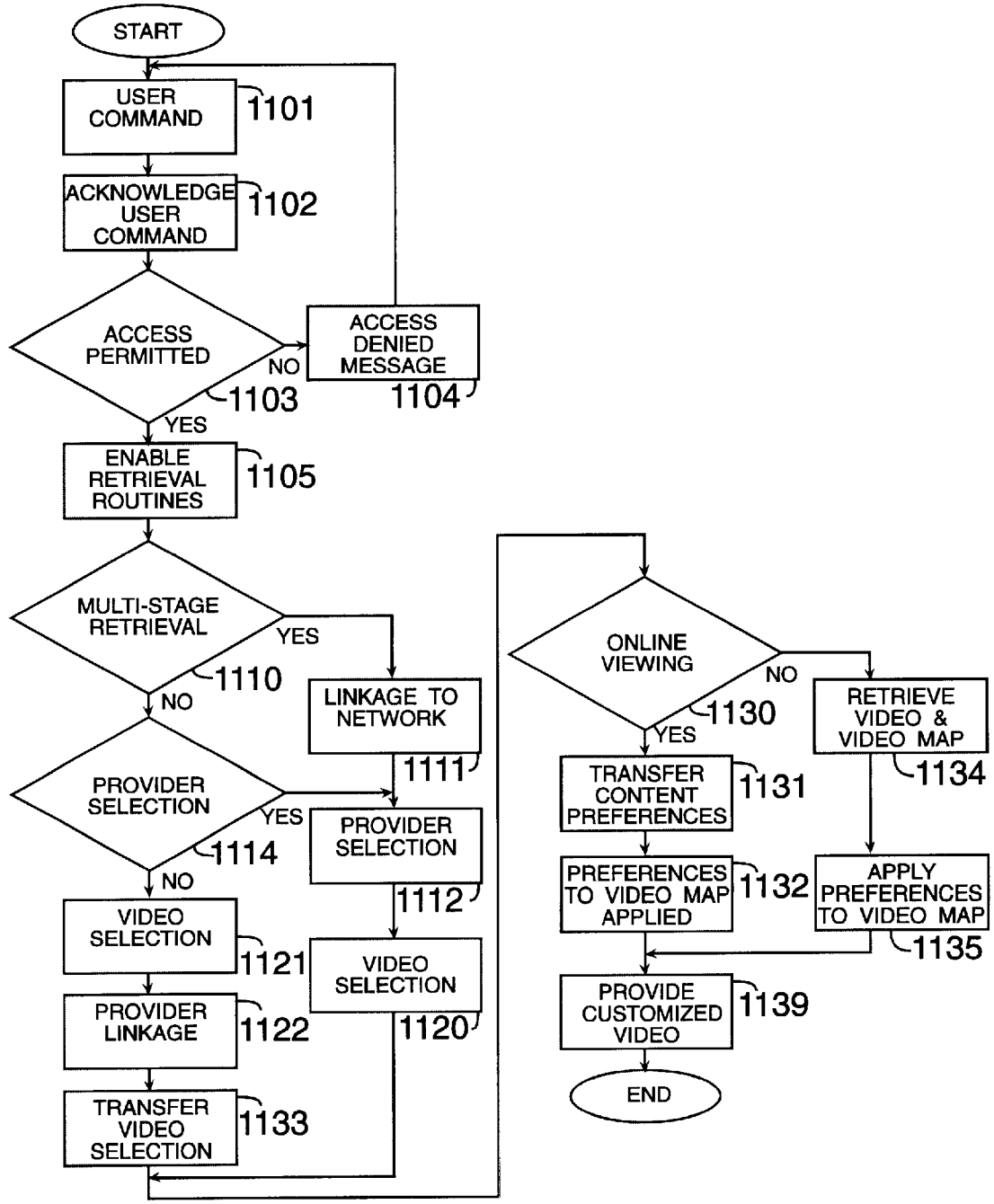
FIG. 11 is a flow chart detailing the steps of retrieving a variable content video from a video services provider.

FIG. 11 is a flow chart further detailing the steps of retrieving a variable content video from a video services provider. It is noted that handshaking and other routines are flexible and user configurable and a number of permutations and variations of what is detailed are possible.

In operation, Multimedia Player normally provides a variety of communication and background services (e.g. videophone, video fax, security, appliance management) to the user and therefore is ready to respond to an user command 1101. Upon receipt of an user command, a Multimedia Player provides power to a display unit (TV) if necessary, and transmits an appropriate acknowledgment 1102.

Access routines previously detailed with respect to FIG. 9A steps 903–909 are here shown in FIG. 11 as block 1103. In a preferred embodiment, these routines reside within a Multimedia Player and are executed prior to establishing a communications linkage with either a network administrator or directly with a video services provider.

If access is denied 1103, an error message 1104 is provided to the display and the Multimedia Player is returned to the state prior to the user active request. Delay routines may be implemented to provide the user the opportunity to attempt to obtain access without a Multimedia Player going to "sleep".

If access is permitted 1103, retrieval routines are enabled 1105 to permit the remote retrieval of a video. It is noted that in the case of the video dialtone model, there may be a multistage retrieval routine 1110 when the viewer first establishes communications with the network administrator 1111, for example a cable or telephone company, then selects a particular video services provider 1112, and then request the desired video 1120. Alternatively, retrieval routines 1114 permit a direct selection of a video services provider 1112. Video selection 1120 then proceeds on-line with the selected video provider. A video services provider can be preestablished as in the selection of a long distance communications carrier. In that case, the viewer would skip having to select a services provider immediately prior to a video request. Further, a viewer may establish relationships with specific video providers for specified services.

Still further, a video selection process 1121 itself may determine with which provider a communications linkage is automatically established 1122. The result of the video selection process is automatically transferred 1123 to the appropriate provider upon the establishment of a communications linkage. Clearly, the selection of a video services provider is not required in those instances where a viewer obtains all the services from a single provider, and no escape mechanism (e.g., selection of alternate long distance telephone carrier) is provided.

It is noted that other combinations are possible and that retrieval routines may reside within a Multimedia Player to further minimize the on-line time, or be provided on-line at different points in the communications than shown here. The video selection process may implement any one or more routines that are suggested by the examples herein provided.

Once a video is selected, if the viewer remains on-line during the viewing of the video 1130, the viewer's content preferences are communicated to the video provider 1131. The video provider server then applies the viewer's content preferences to the map of the selected video 1132 and provides the resulting seamless and continuous version of the video that is consistent with the viewer's content preferences 1139. In this case the viewer remains on-line during the viewing of the customized video 1139, but has access to video viewing control functions as if the video was directly available to the Multimedia Player.

Alternatively, the entire variable content video, including all the parallel, overlapping, and transitional segments, and the video map, are retrieved from the video provider 1134.

Utilization of the video downloaded to the Multimedia Player is then the same as previously detailed with respect to FIGS. 9, and FIG. 10. Principally, the viewer's Multimedia Player applies the viewer's content preferences to the map of the selected video 1135 and provides a seamless and continuous version of the video that is consistent with the viewer's content preferences 1139. In this case the viewer has direct access to the Multimedia Player's video viewing control functions. Whether only the resulting version of the video is downloaded, or the entire video, including the video map, the viewer may interact with the video to the degree that the viewer desires.

If Multimedia Player is off-line and the interaction requires additional video from the video services provider, the Multimedia Player automatically reestablishes communications with the appropriate video services provider and brings the video server up to speed. That is, the Multimedia Player automatically provides the required information to enable the video server to comply with the viewer's requirements.

It is intended that interactive capabilities that are taught by interactive and multimedia systems are provided the user of a Multimedia Player. A number of other interactive capabilities are made possible by the random access capabilities of a Multimedia Player in combination with the content-on-demand architecture.

With the proliferation of large size high definition display means, a viewer may desire to retrieve and/or play a video that converts, for example, a wall mounted display unit into a "window" to a remote location. For example, a DVD or broadcast could provide an hour of a seaside view, recorded by, for example, a fixed and/or slowly panning camera, that provides a viewer with the desired looking out of a window experience. Where multiple display are available, within a room, or in separate rooms, the display set could present a coordinated set of multiple virtual windows creating a surround visual field.

The motion in the video here is characterized by the natural movements within the scene, and distinguished from the content of, for example, nature programming, by the lack of shifts in cameras and an explicit storyline. Further, the primary object as in the case of "mood" soundtracks is to create a natural visual/audio mood, field, and or virtual window. Particularly, in the case of a non-realtime video, the video and video map may be authored to provide an endlessly and seamlessly looping presentation. The video map could also provide the information required to time compress or expand the length of a scene.

Other example of different mood, window, or setting videos include: moonlight, falling snow, tempest, sunset, marina, skyline, fireplace, sidewalk cafe. Particularly with the later example, the viewer could select among a plurality of locations, e.g. Paris, times of day, activity level and so on. Virtual windows need not be limited to natural settings or be non-moving. For example, a video may provide a fictionalized computer generated window view from that of an exploring space vehicle.

Responsive to a viewer's content preferences, the natural sounds of a scene may be enhanced; supplemented by, for example, music; and/or filtered to exclude, for example, excessive traffic sounds.

The previously shown capacity to read/write the viewer preferences from and to an user access media provides a viewer the means to automatically configure a Multimedia Player that had not previously learned the viewer's video content preferences (dumb Multimedia Player).

Referring once more to FIG. 4, in anticipation of the desire to efficiently utilize a dumb Multimedia Player 432, a viewer instructs the smart Multimedia Player 431 to download to the viewer's user access media 144 the desired content preferences and video request routines. To automatically configure the dumb Multimedia Player 432 and retrieve a video consistent with the content preferences and video request routines, the viewer provides the prepared use access media 144 to the dumb Multimedia Player 432, or to an accessory device housing a compact portable storage subsystem 105 and in communication with the dumb Multimedia Player 432. The user access media 144 automatically configures the dumb Multimedia Player 432 without necessarily downloading the viewer's content preferences other than to volatile memory. This operation is similar to moving a game cartridge from a first game player to a second game player.

Transporting the video request routines facilitates the process of automating the retrieval of desired video from a video provider 411 by the use of any Multimedia Player 432 that may be available to a viewer. In this fashion, for example, a traveling executive can automatically configure a Multimedia Player in a hotel room to retrieve videophone messages, the day's news in a format and for topics preestablished by the executive, followed by a menu of recently released films that the executive has not seen. The operation being analogous to inserting an access card in a hotel room door.

It should be appreciated that a viewer establishes an unparalleled detailed profile of the viewer's video preferences and content preferences. Accordingly, to address the privacy concerns, the autoconfiguring means permit a plurality of users to efficiently autoconfigure a single Multimedia Player without leaving behind the video content preferences.

Similarly, a parent may provide a child a user access media containing the child's content preferences to ensure that while the child is at a second location or household, the child is not exposed to video material that is not deemed suitable by the child's parent. The Multimedia Player at the second location may compare the content preferences in the user access media with resident applicable content preferences and report any conflicts or automatically resolve the conflicts. For example, a visiting child's content preferences may provide for more explicit material than the second parent would find suitable for their child. In such an instance, the Multimedia Player would adopt among the conflicting preferences the less explicit content preference in each category.

A similar automated configuration may be performed by means of the networks communications capabilities that may be available to both the dumb Multimedia Player 432 and the smart Multimedia Player 431. This particular embodiment may or may not include the utilization of an user's access card.

In an RCA RC5200P DVD player, the infrared remote control comprises the following keys/buttons: ANGLE, AUDIO, SUBTITLE, ON-OFF (subtitle on/off), SKIP REV, REV, and PLAY. In a situation where the viewer did not understand the dialogue of a segment of a motion picture, the viewer would have to, for example: ii) press the subtitle ON-OFF button to turn on the subtitle; ii) press the SKIP REV button to skip backwards to the beginning of the current chapter; and iii) following the replaying of the segment, press the subtitle ON-OFF button to turn off the subtitle display. Alternatively, the viewer could: i) press the subtitle ON-OFF button to turn on the subtitle; ii) press the REV button to rewind the video to the appropriate point; iii) press the PLAY button to stop the rewinding of the video and cause the video to play the segment; and iv) following the replaying of the segment, press the subtitle ON-OFF button to turn off the subtitle display.

The common problems with both of these methods are: i) the number of steps that are required; ii) the video is likely to be rewinded substantially past the amount usually desired in a significant percentage of the cases; and iii) the loss of attention to the playing of the video required to turn off the subtitle display. In the case of utilizing the SKIP REV button, the excessive rewinding problem results from the fact that the SKIP REV function is controlled by segment definitions (chapters) averaging three to four minutes in duration. In the case of utilizing the REV button, the excessive rewinding problem results from the velocity of the rewinding function in a DVD player.

In view of the foregoing and other shortcomings of the prior art, it is an object to enhance the viewing of a video by providing an elegant means and method for replaying for a viewer a non-understood segment of the video. Accordingly, a Multimedia Player's software is enhanced to serve those situations in which a viewer has failed to understand the dialogue, i.e. "What was said?".

A remote control capable of activating a replay function comprises a WHAT? button, key, or other replay function key or means, to enable a viewer by activating the replay function to automatically cause the system to: i) rewind or skip backwards the playing of the video a system default or a viewer specific previously defined amount, e.g. 20 seconds; ii) turn on the subtitle to a system default or a viewer specific previously selected subtitle language, e.g. English; iii) turn off the subtitle at either the point the WHAT? button was pressed or at some viewer specific previously defined point with respect to the time at which the WHAT? button was pressed, e.g. five seconds prior to, or after, the point the WHAT? button was pressed; and iv) increase the audio/dialog volume during the segment replayed.

Thus, advantageously, by, for example, the pressing of a single WHAT? button or issuing, a single word command, a viewer accomplishes a function which cannot be accomplished, as efficiently and elegantly, with the pressing of at least three buttons in, for example, the operation of the RCA RC5200P DVD player.

A viewer may activate the replay function in a Multimedia Player (100 FIG. 1) by, for example, pressing the WHAT? key (289 FIG. 2) on a remote control (200 FIG. 2), a WHAT? function key in a personal computer keyboard, a mouse click on a WHAT? button on a monitor display (311 FIG. 3), or a voice command comprising the verbalization, speaking, or pronouncement of, for example, the word "What". Various skipping back capabilities and functions may be activated by the WHAT? key, other dedicated keys, e.g., RFP (Replay) key, or by keys, e.g., the SKIP REV key, which may serve a plurality of functions depending on the particular player activity. The replay capabilities may, at the option of the viewer, supplement or replace the conventional functions of, for example, the REV key.

Figure 12:
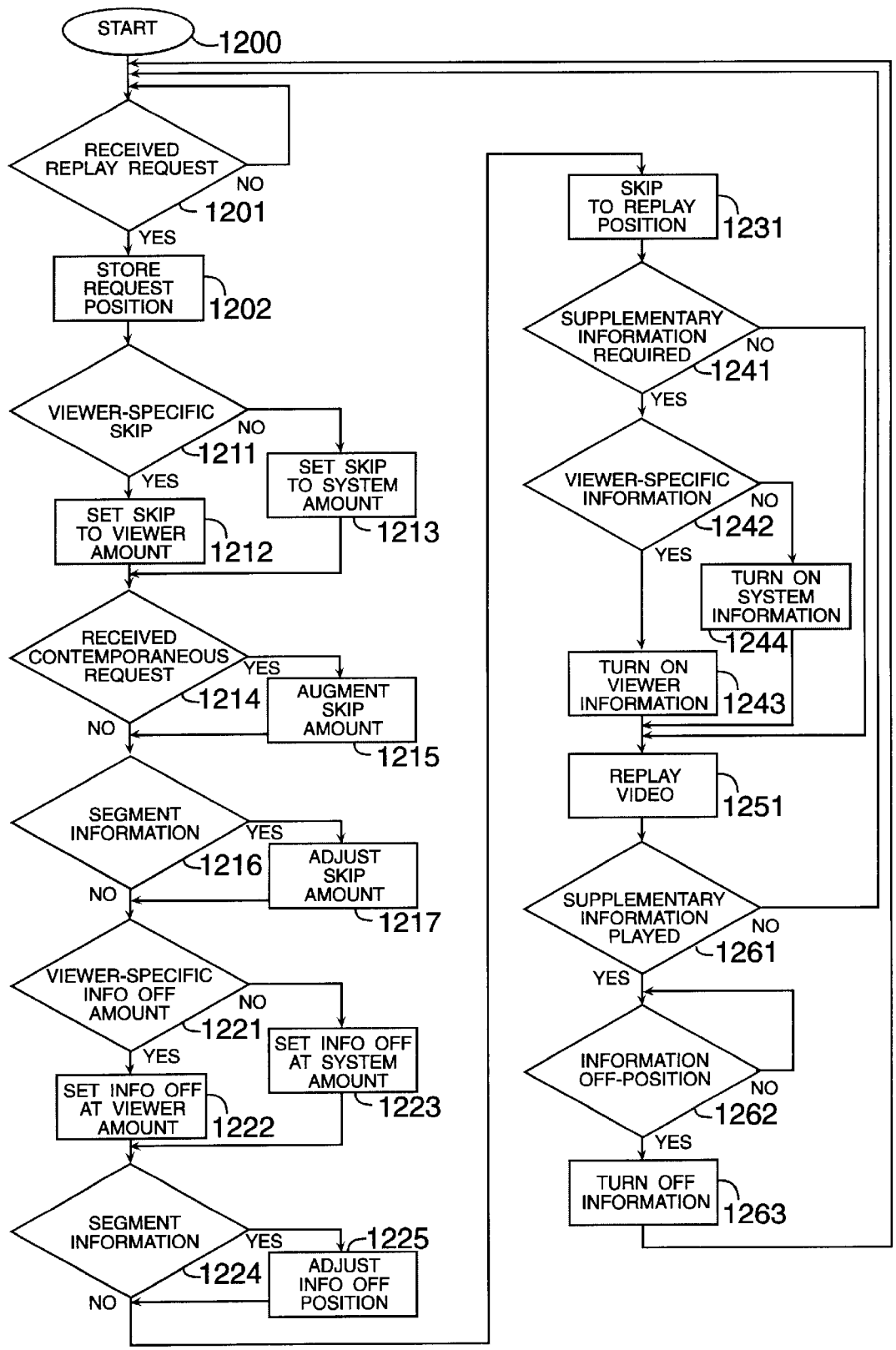
FIG. 12 is a flow chart of a method of replaying a segment of a video with supplementary information.

FIG. 12 is a flow chart of a method of replaying a segment of a video with supplementary information. When, during a playing of a video 1200, the Multimedia Player's processing software receives, by means of a user interface means, e.g., a remote control or voice response system and associated Multimedia Player components and software, a request to replay a part of the video 1201, a replay function, e.g., the What? function, is activated. The activation of the replay function causes the Multimedia Player's processing to store 1202 the time, frame position, or some other indicator of the place, location, or position ("request position") of the video in which the replay request was received in a memory means, e.g., RAM, or other electronic, magnetic, or optical means suitable for storing request position data (see detailed description with respect to FIG. 1).

If a viewer's preestablished replay preference, such as, a viewer's specific previously defined amount, e.g. 30 seconds has been established 1211, the Multimedia Player sets the rewinding or skipping backwards ("skipping back" or "skipping") of the playing of the video by the viewer preestablished amount 1212 . Otherwise, the Multimedia Player sets the skipping of the playing of the video to a system preestablished replay preference 1213, e.g., a default amount such as 35 seconds. Herein, whether a viewer's replay preference or a system's replay preference, preestablished means that the amount replayed is not dependent on a viewer's action at the time of the replay request. Preestablished does not necessarily mean that the replay preference is not responsive to the particular segment played.

In those instance that the playing of the video is voice controlled, separate default values may be established to reflect the fact that viewer's may be more likely to say What? faster than to be able to press the What? button.

A skipping back is responsive to the particular capability of the hardware's and/or a system's Random Accessing means, and/or a viewer previously defined preference. In certain embodiments, e.g., electronic memory, a "skipping back" comprises randomly accessing a physical position which may be, for example, forwards, sideways, and/or below from the present position. Further, while a Multimedia Player's random accessing means may be capable of instantaneously skipping backwards to a previous position in the video, a viewer may, nonetheless, prefer that the replay comprise a rewinding of the video at a viewer specified rate. Herein, the term "skipping" ought to be understood in the broadest sense, and as comprising rewinding and skipping backwards capabilities and functions, e.g., time and/or segment information based, the selection of which, and operation, being responsive to a system's and/or a viewer's defined preference.

The rewinding of the video is cumulative responsive to multiple successive activation of the What? function, e.g., a contemporaneous subsequent replay request 1214. For example, if the viewer has pressed the What? button in the remote control twice within a substantially simultaneous time, e.g., two seconds, the Multimedia Player would cause the skip back position or amount to be augmented 1215 to 60 seconds, i.e. twice the viewer specific previously defined amount of 30 seconds. In other words, the distance or time that is replayed is increased by the addition 1215 of the amount required for a single replay request for each contemporaneously received successive replay request 1214.

In the event that during an active replay function, but after a substantially simultaneous time, a new replay request is received, then the initial replay request is terminated, and the new replay request is executed responsive to the new request's request position.

A request position and/or a replay position may advantageously be responsive to a previously defined amount in the context of, or adjusted by, a video map or other available segment information 1216 identifying a logical or appropriate location in the video, e.g., chapter stops, scene definitions, and/or beginning segment information. For example, if the viewer specific previously defined amount of time for a replay position is 25 seconds, but the beginning of the segment, as defined by the video map or chapter definitions, is at 24 seconds in one instance and 28 seconds in a second instance, the skipping back takes in consideration this information and adjusts 1217 the skipping back to the 24 seconds or 28 seconds points respectively (beginning of segment or chapter) instead of the 25 seconds point.

Further the adjustment of the request position and/or the replay position according to segment information may advantageously be responsive to, or be subject to, a previously override range. e.g. two seconds. For example, in the case of the previous example, and with the two second override range, the replay position would be adjusted to the 24 second point in the first instance, but would not be adjusted to the 28 second point in the second instance (remains at 25 seconds). The override range need not be equal in both directions. In other words, subject to a viewer's preference and/or system default, the segment information may increase the amount replayed, but not decrease it.

In a preferred embodiment, rather than a viewer configuring the system at the time of installation or a first playing, a Multimedia Player's autoactive software routines would learn the viewer's preferences from the viewer's actions, and adjust the various settings accordingly. For example, with respect to the replay functions, if the logging of the viewer's actions indicate a disproportionate number of contemporaneous subsequent replay requests, the systems replay point is increased, depending on the amount presently defined, by, for example, fifty percent.

It should be appreciated that, in particular, time-based skipping back controls are responsive to the actual playing time of the particular version being played. For example, a skipping back of 20 seconds may actually skip the video stream three minutes, i.e., two minutes and 40 seconds is content which is not being played at this time for this viewer, such as non-selected interleaved camera angles.

Alternatively, or additionally, the skipping back control is directly responsive to the video map's segment definitions. In order to address the requirements of the various objects herein identified, the segment definitions are likely to be, in many instances, of a shorter duration than the chapter definitions. Further, the video map's segments definitions may be specifically augmented to address the replay function requirements.

Since a video map's control of the skipping back is dependent on the particular level of the authoring of a video map, it is advantageous that the map communicate the fact that it is authored in a manner responsive to the replay function. That information would enable the Multimedia Player's processing software to either apply the viewer's preference for this type of skipping back control, or default to, for example, the time-based types of controls.

The position at which the supplementary information is discontinued, e.g., turned off, may be responsive to, for example,: i) the point the replay function was activated, e. g., the replay request was received; ii) the point the replay function was activated adjusted by a viewer specific previously defined amount with respect to, for example, the point of the replay request; iii) the point the replay function was activated adjusted by a viewer specific previously defined amount, and further adjusted by segment information; iv) the point the replay function was activated adjusted by a system defined amount; v) the point the replay function was activated adjusted by a system defined amount, and further adjusted by segment information; or vi) the point the replay function was activated adjusted by segment information.

With respect to FIG. 12, if a viewer has specified an amount with respect to, for example, the point of the replay request at which the supplementary information should be discontinued 1221, the position at which the supplementary information is turned off is adjusted accordingly 1222. A viewer may specify a time required for the viewer to activate the replay function and desire that this time be taken into account so that the point at which the supplementary information is turned off occurs at a point in the video prior to the time the replay request occurred. Alternatively, if the viewer has not specified an adjustment amount for turning off the playing of supplementary information 1221, the position at which the supplementary information is discontinued may be adjusted by system specified amount 1223. In both cases, responsive to segment information and a viewer's preferences 1224, the position at which the supplementary information is turned off may be further adjusted responsive to segment information 1225.

Alternatively, or additionally, the replay position and the position at which the supplementary information is discontinued, e.g., termination position, may be responsive to the subtitle information and the display duration that it requires. That is, the subtitle track is analyzed for logical beginning points to the dialogue within the various scenes, and appropriate points are identified if not previously defined. Further, for example, in a playing of data having a navigation data structure similar to that of a DVD, the data search information, the presentation control information, and/or, for example, the subtitle information, could provide non-interfering information delineating sentences, and/or the equivalent of paragraphs, e.g., portions of a scene. Thus, to the extent that the video map can provide segment information useful in the establishing of an appropriate replay position and a termination position adjusted to the beginning and end of a scene or complete portions within a scene, the replay will be more natural, elegant, and/or pleasing.

Herein, the enabling and/or playing of "supplementary information" ought to be understood as the enabling and/or playing, by a hardware, firmware, and/or software processing, of a display, presentation, and/or playing of subtitles, closed captioning, text, or other textual, video, and/or audio information that may supplement, complement, the information being played, and/or substitute, the audio dialogue and/or segment of a video. Further, supplementary information is any information, e.g. subtitles, data, and/or bits which may be utilized to elucidate, illuminate, illustrate, clarify, and/or explain, during a replay, a portion of a video, and/or may be advantageously utilized in a replay of a segment of a video. Wherever the term "subtitles" appears herein, it ought to be understood to mean, and be an example of, supplementary information. Alternatively, or additionally, responsive to a viewer's preference, a playing of supplementary information consists of, or comprises, increasing the audio volume, and/or, for example, increasing the dialog audio absolutely and/or relatively to the background audio during a replaying of a segment. Still alternatively, or additionally, responsive to a viewer's preference, in those instances where the segment to be replayed is one of a set of presentations segments, as further detailed herein, a playing of supplementary information consists of, or comprises, substituting the segment that would have been replayed with a playing of an appropriate fragment or segment from the same set of presentation segments.

Once a skipping back replay position has been established 1216/1217, the playing of the video is skipped back, by means of, for example, a random accessing, to the replay position 1231.

Responsive to a viewer's preference 1241, the replay function need not cause a playing of supplementary information. In other words, the teachings herein may be implemented in the absence of a playing of supplementary information, such as a display of the subtitle. For example, responsive to a preestablished preference or the authoring of the video, the activation of the replay function does not replay the video with the subtitles turned on. The replay function may simply replay the segment without enabling and/or playing any supplementary information 1243, e.g., turning on the subtitles. Herein, "enabling" is any action or actions, including enabling, turning on, and/or playing, which may serve the object of presenting supplementary information in a replay of at least a portion of a video.

If supplementary information is required and available 1241, the replay functions will ascertain if a preference for the type and manner of display of the supplementary information has been established for or by the viewer 1242. If this is the case, then the playing of the supplementary information is configured to be responsive to the viewer's preferences 1243. For example, for a viewer that has previously specified a preferred subtitle language 1242, e.g. English as opposed to Spanish, the Multimedia Player would turn on the playing of the viewer's preferred subtitle 1243.

It does not necessarily follow that the language that a viewer may prefer to have the subtitles displayed in will be the same as the audio language that the viewer has selected for the playing of the video. For example, while a viewer may be proficient enough and desire to play a motion picture in English, there may be those occasions when the dialogue was heard but the meaning of a word or phrase was not known. Such a viewer may prefer that the replay provide the subtitles in a different language, e.g., Spanish, than the language of the audio. Additionally, the viewer may prefer that the audio language be substituted with the Spanish language audio during the replay. Alternatively, the replay function may replay the segment with only changing the audio language. For example, a viewer who customarily views a motion picture in one language may desire to replay certain key scenes in a second language.

These and other options may result from a broad range of preferences for each of a plurality of viewers, as well as the particular requirements, functions, and/or system controls that may be implemented in a video. The use of a voice response control system enables a viewer to specify the replay options at the time of the replay request. For example, a viewer may for example, command: "Replay", "Replay 30 seconds", "Replay 50 in Spanish", or any other command combining functions and options to suit a particular situation. Further, advantageously, the voice response system would enable issuing commands for other of the functions herein detailed alone or in combination with a replay request, e.g., "Replay 2 minutes close-up French and loop".

In the absence of a viewer preference for the playing of supplementary information 1241, the Multimedia Player turns on a playing of the supplementary information responsive to, for example, a system default subtitle language or responsive to a subtitle language corresponding to the language of the version of the video being played 1244.

The turning on and display of the subtitles is one example of supplementary information which may be played to supplement and/or replace elements in a replay of a segment. Another example of supplementary information which may be utilized is a director's running commentary or explanation of the scenes in a video which is included in alternate audio tracks in some DVDs. Accordingly, in those instance where the video includes a commentary, the activation of the What? function, or similar function, may be enabled that will play the commentary track during the replaying of the scene. For example, during the playing of a DVD, a viewer may wish to have the director explain a particular scene, in such case, the activation of the replay function, or, for example, a separate "Explain" function, by either pressing a dedicated button or double pressing the What? button will cause the appropriate replay sequence to additionally or alternatively include the director's commentary. Under certain viewer preferences, both the subtitle and commentaries are activated during the replay of a segment/scene.

Alternatively, or additionally, the authoring of a video may include, a separate audio track having the express and dedicated purpose of explaining the various scenes of a video. This would be advantageous in, for example, technical or educational videos as well as in mysteries. The method of an "Explain" function and/or the embodiment of an Explain methodology is similar to that detailed herein with respect to the What? function. However, note is made that, given the nature of a commentary, the amount replayed may be responsive to a greater degree to the segment information provided by a video map than to some predefined amount. Thus, the replaying produced by a more encompassing What? function, e.g., "Explain", is likely to, although not necessarily, be of a longer duration than that produced by a replay function that only requires the display of subtitles.

The supplementary information may be provided by a source other than the source of the video, and the supplementary information need not be time synchronized with the video. For example, a supplementary information provided by a remote source may be utilized with a plurality of different video segments of a DVD video and/or a plurality of videos.

Still further, supplementary information may be displayed in a separate window within a display or output means, e.g., one of the speakers; or in a display or output means different from that playing the video, e.g., a separate monitor.

Still further, in an embodiment, the supplementary information completely substitutes, with, for example, a different camera angle, or presentation of the scene, the segment which would have been replayed. For example, in a video that teaches magic tricks, the What? function may be utilized to obtain different angles and/or explanations for the magic trick performed. The discussion herein with respect to the playing of camera angles suggest other embodiments.

Whether the playing of supplementary information is activated responsive to a viewer's preferences 1243, system default settings 1244, or the authoring of the video, the activation of the replay function will not cause the display of extraneous system messages such as "subtitle on".

With the appropriate playing of the supplementary information enabled 1243/1244, e.g., subtitles are turned on and the audio language is temporarily switched, the Multimedia Player's hardware, firmware, and/or software processing means replay the video 1251 from the replay position. If supplementary information was not played 1261, i.e., was not required 1241, than once the replay of the video commences 1251, the particular instance of the replay routines are terminated.

At the supplementary information off position 1262, the Multimedia Player's processing routines terminate the playing of supplementary information 1263, e.g., turn off the subtitle, and/or reverses any audio languages changes made. Clearly, the turning off of the supplementary information does not occur if the particular configuration of the supplementary information was turned on prior to the activation of the replay function. Whatever supplementary information was being played prior to the activation of the replay function would be continued after the supplementary information off position. In the absence of a playing of supplementary information during a replay, the activation of the replay function would still provide other services consistent with the viewer's objects of replaying a segment of the video.

Thus, the functionality of a Multimedia Player, such as a DVD player, is enhanced, by providing a method, of replaying a segment of a video, for the viewer who has not, for example, understood the dialogue. The method being elegantly simple (e.g. single button action or voice command), responsive to viewer language preferences (e.g. preselected subtitle language) and skip backward preferences and controls (e.g. predefined amount of time and/or video map).

With respect to a playing of audio, conventionally, when a video is paused, the last image of the video may be continued to be displayed on the television but the audio is stopped. When video and audio are synchronized, there are no provisions for the continuation of audio transmission when the video segment is paused or frozen. Similarly, when the speed of the video is altered from its normal transmission speed, if the audio is continued to be transmitted, its transmission is also altered or stopped. The alteration of the audio from a normal speed is seldom of value to the viewer.

In the transmission of variable content videos, whether primarily non-interactive as for example a motion picture, or primarily interactive as for example an advertisement, whether retrieved from, for example, a video server or from a DVD, the viewer is provided complete control over the transmission of the video. That control comprises pausing the video or altering the transmission speed. In such instances, operating routines provide for the continuation of the transmission of an audio element at normal speed.

For purposes of the present disclosure, the audio component of a video is defined to consist of an active element and a passive element. The active or foreground element is that portion of an audio that is frame sensitive, as for example speech or the sound emitted by an explosion. The passive or background element is that portion of an audio that is not frame sensitive, as for example background music or traffic sounds.

The background element of an audio provides the audio than can be continued over a certain period of time and still match the video component. For example, where the video is of birds singing, the viewer may elect to freeze the image, the song of that particular bird and the background sounds are continued. When the video transmission is restored, the video and audio components are re-synchronized and transmitted in a conventional manner. Alternatively, the audio component eventually catches up to the video at a normal transition point where both the video and audio components are re-synchronized and transmitted in a conventional manner.

In instances where the pause of the video is longer than the forward audio stream that applies to the paused video image, the audio retrieval loops back to the audio stream at the beginning or other point of the segment in which the pause occurred, or to the point in which the pause occurred. In a preferred embodiment, the audio editing will provide for the seamless looping of the audio. That is, at some point in the particular audio segment, a seamless linkage is provided to a previous point in the audio segment. The linkage produces a continuous audio loop. To the listener, the audio, while repeating itself, will appear as a continuous stream.

It is noted that the teachings herein apply as well to slow motion video. In that case, the background audio stream is played at normal speed, while the video stream is slowed down. The buffering and multiple read architecture detailed herein provide, for example, the required hardware capability.

Alternatively, or additionally, to the retrieval of the audio directly associated with the video, a separately stored plurality of audio segments may be provided. These separate audio segments are specifically intended to provide the audio required by a video segment when paused or the transmission speed is altered.

An active audio element may be provided that is responsive to the specific place where the video was paused. For example, during the viewing of an advertisement for an automobile, the viewer may pause the video when the dashboard instrumentation is shown. At that moment the passive audio element (music) continues to be transmitted, the active audio element (general voice comments) is replaced by a frame specific active audio element (instrumentation voice comments).

In instances where the transmission of the foreground audio element is discontinued, the volume of the background audio element may be augmented to the level that had been provided by the foreground audio element.

The audio requirements herein may be satisfied by a plurality of architectures. The audio elements may be implemented as separate channels, tracks, or audio streams. A video's audio is provided in a manner that permits extracting the various audio elements. The audio elements are further coded to permit satisfying the stereo or surround sound requirements. Different elements from the various audio streams or tracks are combined in real-time to create the desired audio effects. What is suggested here, is that the audio elements that are present, for example, in a performance of a fifty member orchestra, are individually controllable and any of the elements may be combined interactively or non-interactively.

A video map in combination with selectively retrievable musical elements of the audio of a video permit playing the video as if it were a music video. That is only the segments having a musical content, e.g. songs, are played and within those segments, the audio elements inconsistent with this purpose, i.e., special effects sounds, are dropped. In other words, the video map provides the information required to extract from within a motion picture a music video. The musical elements may be provided by, for example, tracks, channels, or data that is separate from the data providing other of the audio elements.

The teachings disclosed herein with respect to the seamless transmission of video are applied here to provide a seamless audio transmission of non-sequential audio elements.

Advantageously, the nonlinear editing system detailed herein, optionally provides, as per the teachings herein, the audio associated with the video being edited, while the video is being edited. In this fashion the editor, has the benefit of the tempo of the background music or audio while editing a scene. This will provide for greater integration of audio and video material.

This method is particularly useful in the editing of a music video, where the edited audio stream is the constant to which the video segments are applied.

Figure 13:
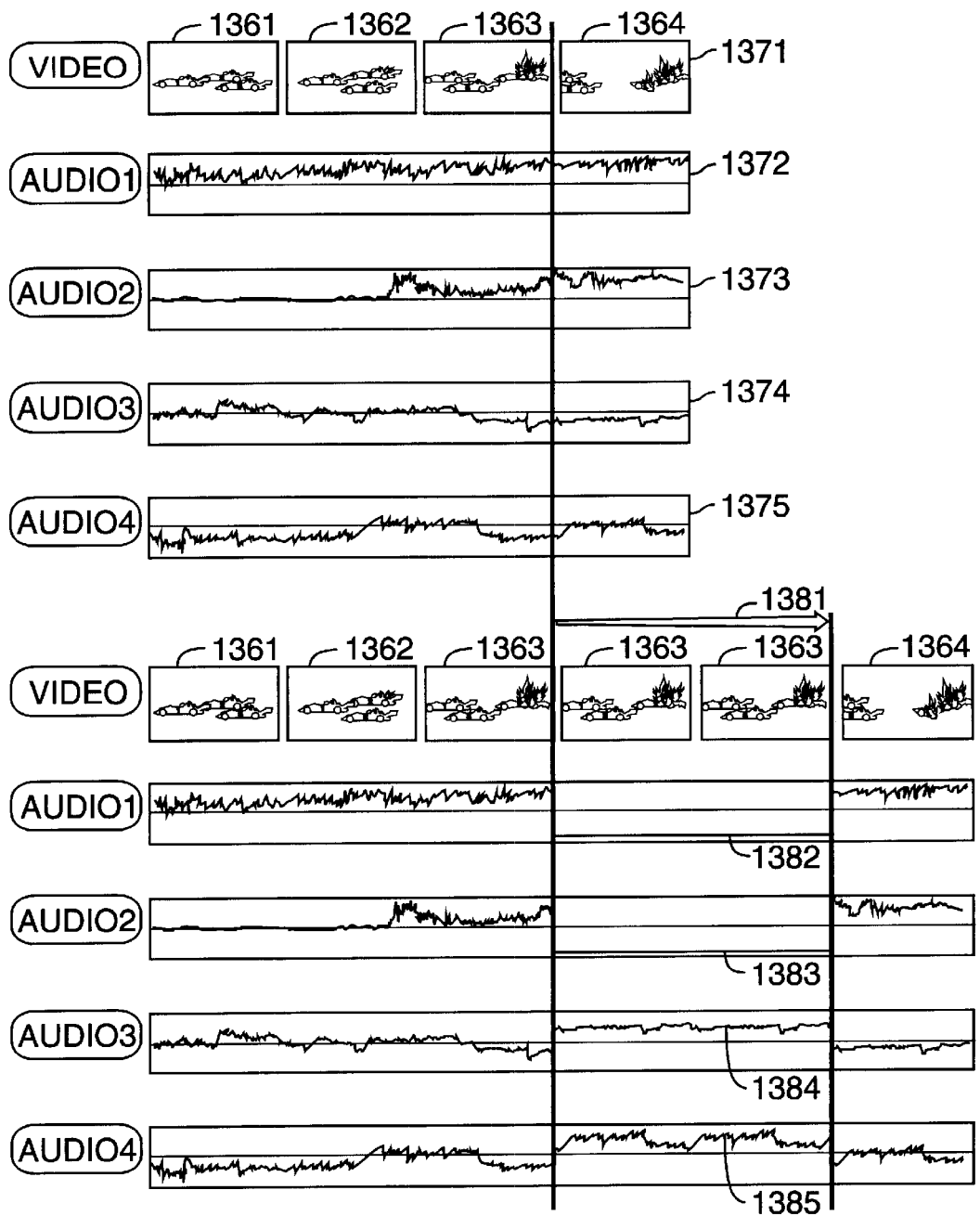
FIG. 13 is an illustration of the utilization of foreground and background audio to provide audio during a video pause.

FIG. 13 is an illustration of the utilization of foreground and background audio to provide audio during a video pause. The top half of FIG. 13 is a representation of a full motion video stream 1371, and four audio streams 1372–1375 played without interruption. The bottom half of FIG. 13 is a representation of the same full motion video stream and audio stream played with a video pause.

In this example, the video is that of an automobile race. Four frames, representing segments 1361–1364 of video stream 1371 are shown. AUDIO1 1372 is sound from the voice of the commentators. AUDIO2 1373 transports frame specific sounds or foreground audio. AUDIO3 1374 represents a first background audio stream, in this case the sound from the automobiles engines. AUDIO4 1375 represents a second background audio stream, in this case the sound from the audience.

In the second segment 1362 of the video stream 1371, the engine of one of the automobiles explodes. This is illustrated in the representations of both the AUDIO2 1373 and AUDIO4 1375 streams.

In the third segment 1363, the explosion becomes visually more evident. In the fourth segment 1364, the affected automobile is shown breaking apart.

In this example, the viewer elects during the transmission of the third segment 1363 to pause or freeze 1381 the video stream 1371. During the duration of the pause 1381 of the video segment, audio is not provided by either the AUDIO1 1382 or the AUDIO2 1383 streams. During the pause, AUDIO1 and AUDIO2 are dropped off.

Audio during this pause 1381 is provided by the AUDIO3 1384 and AUDIO4 1385 streams of the fourth segment 1364. As is illustrated, the background audio segments 1384–1385 are looped to provide sufficient audio during the video pause 1381. The volume of the background audio 1384–1385, now in the foreground is automatically increased to an appropriate level.

Upon the viewer causing the video transmission to resume, the fourth segment 1364 is transmitted together with the audio from the re-synchronized audio streams 1372–1375.

It is noted that the SPEED keys provide control over the transmission rates of, for example, the fast forward, rewind, frame advance, and play functions. Other keys may be used in combination, for example, while the video is being fast forwarded, the skip key may be utilized to further accelerate the transmission rate.

At certain fast forward speeds, the video image displayed begins to lose functionality. Accordingly, it is advantageous that a functional video image be transmitted at various play speeds. For example, as the transmission speed increases, frames and/or parts of segments are dropped to still provide a visually understandable content, and as detailed herein, real-time audio.

The frame and segment drop rates may be at a player's default rate, at a viewer specified rate, and/or some combination based on system efficiencies. For example, in an Mpeg-2 compression stream, decompression may be facilitated by dropping B-frames and P-frames before dropping the I-frames. As the transmission rate (e.g. >13X) increases to approximate the I-frame rate, about one I-frame every ½ second, (e.g. an average of 15X), the decompression of B and P frames may be suspended, relying entirely on the available I-frames, irrespective of their actual frequency. In this fashion a viewer selection of, for example, 13X–17X may default to a 15X rate.

Figure 14A:
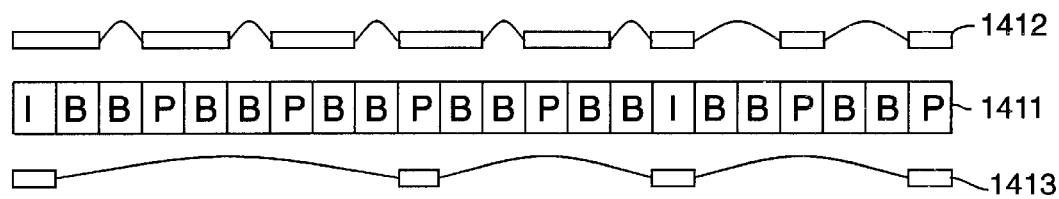
FIGS. 14A, 14B, and 14C, illustrate a plurality of fast-forward variable intermittent skipping methods.
Figure 14B:
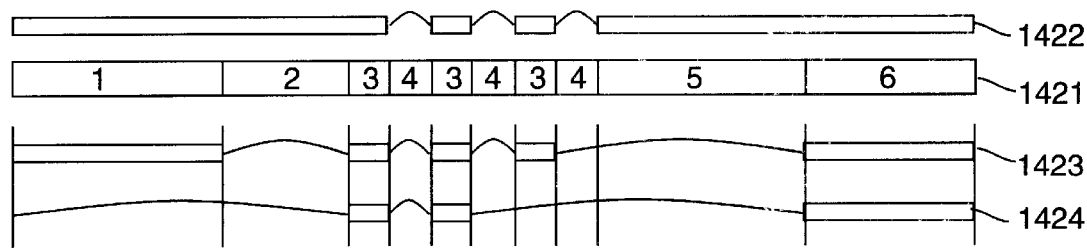
Figure 14C:
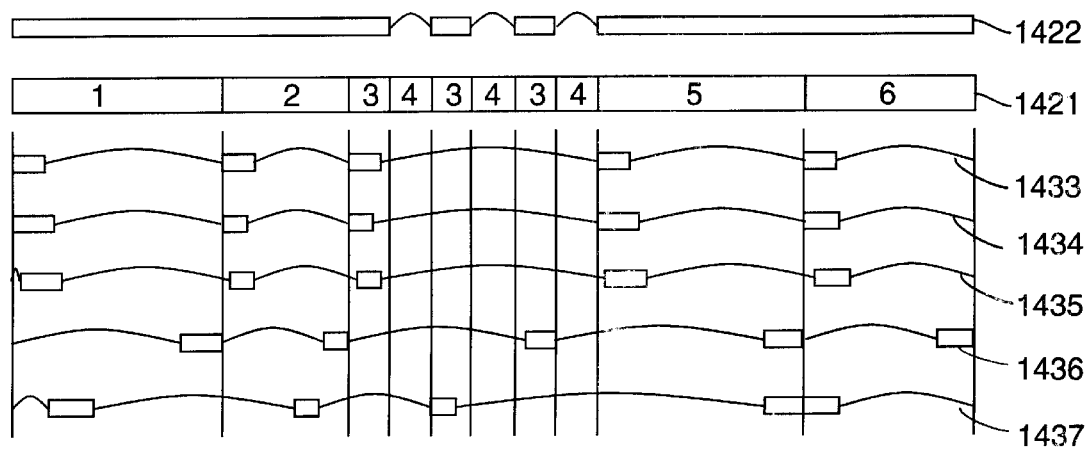

FIGS. 14A, 14B, and 14C, illustrate a plurality of fast-forward variable intermittent skipping methods that may be implemented. In the FIG. 5 the block indicate the display of the frame or segment, horizontal thin lines illustrate the seamless skipping of a frame or segment, and vertical thin lines are utilized to show relative positions of played segments.

Specifically, in FIG. 14A, a portion of an MPEG2 video stream is illustrated showing a normal play rate and display of I, P, and B frames 1411. As the fast forward rate is increased, the proportion of B frames displayed is decreased 1412. When a certain fast forward rate is caused, the display of B frames is eliminated entirely, and only I and P frames are displayed 1413. A further increase in the fast forward rate results in only I frames being displayed.

Alternatively, or additionally, to intermittently dropping frames, at, for example, a 10X search (forward and/or backwards) rate a viewer may prefer instead to view a 6 second segment in real-time for every 60 seconds of video, seamlessly skipping an average of 54 seconds. The six seconds shown need not be taken from the same time interval of every 60 seconds segment. Alternatively, or additionally, a video map may identify the most appropriate segments for the various search rates that may be selected. For example, a video map may identify the most relevant group of frames within a segment, and/or identify segments for a given search rate. Thus, based on a selected search rate, then the video map provides the information required to play the appropriate group of frames and/or segments.

FIG. 14B illustrates a video 1421 comprising a plurality of segments identified by the single digit numerals. Segments 3 and 4, which may be parallel segments such as different camera angles, are shown interleaved as per the DVD specifications. Accordingly, in a playing of the video, a segment or segments that are excluded from the version being played would be skipped over 1422.

When the search rate reaches a certain speed, which, directly or indirectly, may be user specified, the playing of segments which would have been played are selectively skipped in response to the video map information 1423. As the search rate increases, more segments and/or fragments of a segment are seamlessly skipped 1424. These and other methods that follow can be utilized to play condensed versions of a video, which in the extreme may amount to playing segments comprising a theatrical trailer of the video. For example, setting a search forward rate at ten times normal speed at the beginning of the video would result in playing, in real-time, a 10 minute version of a 100 minutes motion picture.

To provide intelligence to the dropping of segments, a video map could, for example, additionally provide information which may be utilized to assess the relative importance of segments, e.g., a segment may be assigned a relevance rating code ranging from 1–10, with 10 being the most relevant.

Alternatively, or additionally, as illustrated in FIG. 14C, a search variable intermittent skipping method may be based on the playing of a fragment of a segment from a point identified by the video map as the beginning of a segment and/or a chapter. The fragment of a segment that is played resulting from, for example, the number of the identified segments/chapters, the transmission rate, and the duration of the motion picture. For example, if a normal rate playing of a version of a motion picture 1422 would last 100 minutes, the video map identifies five playable segments in the version, and the selected search rate is 5X, then up to the first four minutes of each segment would be played for a total playing time of not greater than twenty minutes. FIG. 14C illustrates a first instance 1433 in which, by this method, a portion of the 100 minute video 1421 is shown by playing, subject to the duration of each segment, the first four minutes of each of the five playable segments. Alternatively, or additionally, a playing time for each fragment of a segment may be specified.

Alternatively, or additionally, a viewer may achieve desired results by specifying in addition to, or instead of the search rate, the percentage of the video and/or each segment, and/or the amount of time as a minimum or maximum given the length of the segment. For example, twenty percent of each segment but not more than two minutes nor less than 30 seconds from each segment. FIG. 14C illustrates a second instance 1434 in which, by this method, a proportional amount from each segment is played subject to the minimum and maximum specified amount for each segment. A proportional amount played may also be subject to, e.g., factor in, the relevance rating code previously detailed.

Additionally, or alternatively, while with respect to motion pictures it may not be as useful, in certain situations it may be advantageous, and/or preferred by the viewer to directly specify an amount to be applied to each of the segments, and/or a specific amount for each or some of the individual segments.

Additionally, given that the actual beginning of a chapter may be less significant than other fragments of a segment, an offset from the beginning may be implemented 1435, e.g., 10 seconds, two minutes, or some proportional percentage and/or amount. Alternatively, the played fragments may be with respect to a time prior to the end of a chapter 1436. The end of the segment being identified directly or indirectly. In this instance, a proportional amount from each segment is played from the appropriate point calculated from the end of the segment, or from the beginning of the segment, if the duration of the segment is known. Additionally, or alternatively, the playing of a fragment of a segment is with respect to some general internal point within segments and/or a point specific to each segment 1437. A video map could provide the necessary raw information and/or provide variable skipping specific information.

A number of other combinations are possible to satisfy particular applications and preferences. For example, the skipping of segments, and the playing of fragments may be implemented in combination with the dropping of frames to produce the most optimum visual display.

Where a segment or fragment viewed is sufficiently long, e.g. a 30 second segment, full audio corresponding to the segment may be provided. Alternatively, whether the segment is of sufficient duration or not, the methods previously detailed with respect to FIG. 13 may be implemented. For example, in a twenty minute summary, only the lines deemed most memorable, and identified by the video map, need be played, the rest of the dialog would be skipped, playing only the musical soundtrack, sound effects, and background audio.

A system, e.g., a Multimedia Player, capable of selectively playing a fragment or fragments of each of a plurality of segments comprises preferencing, processing, random accessing, and buffering for: seamlessly playing, responsive to a search rate preference and segment information, a fragment of each of a plurality of segments of a video. In alternate embodiments, in a fragmented playing method, as the search rate increases a smaller fragment of each of the plurality of segments is played; the segment information is utilized to assess the relative relevance of segments, to enable for, example, as the search rate increases, to skip playing fragments of segments with a low relative relevance code; a length of a fragment played is responsive to a number of segments, a search rate preference, and a length of the video that would otherwise be played; a length of a fragment played is proportional to a length of a segment, and subject to a minimum and maximum specified length; a length of a fragment played is responsive to specified fragment length preference; a fragment of each segment played is offset from a beginning of a corresponding segment; a fragment of each segment played is responsive to an end of a corresponding segment; a length of a fragment played is responsive to the content of a corresponding segment; seamless playing, responsive to a search rate preference, is activated during a playing of the video; and/or the seamless playing, responsive to a search rate preference, is utilized to search either backwards and/or forwards through the video.

The understanding of visual perception to detail has resulted in great compression of images with a minimal loss in the perceived distortion of an image or moving picture. Similarly, one could expect that the study of the human capability to perceive different rates of visual and audio content can maximize effective transfer rates without loss in the acquisition of the information being transmitted. Just as individuals can read, with comprehension, at a faster rate than others, it ought to be expected that some individual may prefer to view and/or listen to certain video materials at a higher rate.

Further, not all content of a video need be viewed at the same "normal" or real time rate. That is, the viewing of a video could be according to a content responsive variable rate. For example, a viewer may prefer that segments coded as containing a graphic level of sexuality be displayed at slower than normal rate, segments of explicit violence and segments that are fillers be displayed at a higher rate than normal, and that segments with a graphic level of violence be seamlessly skipped as herein detailed. This would be particularly advantageous not only a second viewing of a motion picture, but also in a review of an instructional lesson, where the segments with material to which a student responded with facilitate would be presented at a faster rate and in summary form, than the material with which initially the student had difficulty.

A Multimedia Player could, both through direct query and analysis of a viewer's viewing patterns and interactions, create an individualized profile in order to automatically customize the playing of a video in a range of visual and audio elements, including, for example, levels of content in each of plurality of content categories, camera angles, zooming, perspectives, and transmission rates.

In instances where it may be preferred by a viewer or advantageous, to zoom in on an image, a video image transmitted to the video display device is a portion of the available image. In other words, a zoomed image or "window" transmitted to the display device is a subset of the available image ("image").

Software controlled zooming functions may be implemented that zoom towards the center of the image. In these instance the centers of the window and of the image are the same. The viewer could access this function with, for example, the A–B buttons (242 FIG. 2) of the gaming controls in the remote device (200 FIG. 2). Pressing the A-button would cause software to zoom in on the center of the image. With each pressing of the A-button a smaller portion of the image is enlarged to fill the display. The B-button would have the opposite effect. Pressing the B-button would enlarge the field of view of the window. Eventually restoring the window to the available image.

A viewer may, for example, utilize the control pad (251 FIG. 2) of the gaming controls to place the zooming center point on any point on the image. This will permit the off-center magnification of the image and the creating of a window whose center is not the center of the image. As the video is transmitted the viewer could shift the center of magnification or track the target as it moves within the window and zoom in or out as desired.

What is detailed herein, however, is a method of automatically maintaining the viewer defined target within the viewer defined window as the target moves within the image. Under control of an application software the target is maintained within the magnification of the image defined by the viewer. As is detailed with respect to FIG. 15, once the viewer determines the target and desired zoom level, the window continues to display the target as the target moves relative to the host image. In instances where the zooming center point is placed close to the image's edge, the effective center point is automatically shifted to provide a full window.

Figure 15:
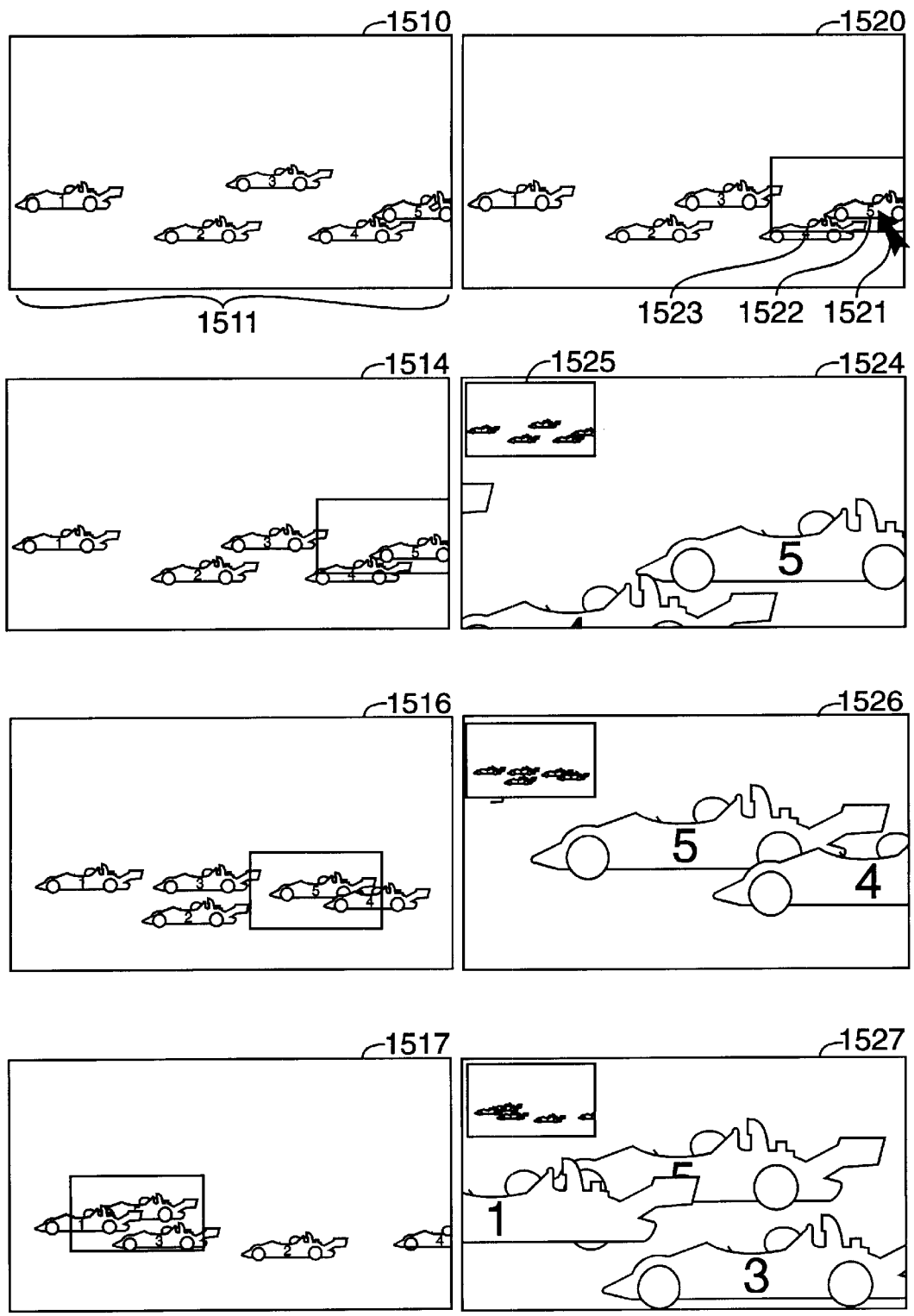
FIG. 15 illustrates the automatic display of a viewer defined target as the target moves relative to the host image.

FIG. 15 comprises two sets of illustrations. The left side of FIG. 15 represents the set of available images resulting from "frames" of a video digitally stored video. The right side of FIG. 15 represents the set of images actually transmitted to the display device. This particular example is that of an automobile race.

A "first" image 1510 comprises five racing automobiles. This same image 1510 is transmitted to the display device. Pressing of the X-button of the game controls enables the target selection functions, causing the displayed image 1520 to include a target pointer 1521. Utilizing the game control pad, the viewer moves the targeting pointer 1521 to the desired target. In this instance the selected target is the race automobile numbered five 1522. Pressing the X-button defines as the target the area or point identified by the pointer.

Depending of the configuration selected, a window frame 1523 is transmitted that is automatically sized to display the target at the center of the window frame.

In instances where the target is moving, it may be desirable that the window look ahead of the target. In such cases the target may be automatically displayed off center in the window. Additionally, the viewer is provided the option to define the target's relationship to the center of the window. For example, in the viewing of a football game, the viewer may target a wide receiver, define a window of ten yards and a window center three yards ahead of the target. The window frame 1523 may be moved by the viewer with respect to the target by means of the game control pad, establishing a look ahead/behind reference with respect to the target 1522. Additionally, the frame may be rotated and/or inverted.

The viewer may utilize the A-button to zoom in on the defined target. The resulting window of the image defined by the window frame is then transmitted to the display device. Pressing the A-button once more will further zoom in utilizing the target or the center of the window frame as the center of the magnification.

As is illustrated, the displayed window 1524 includes, at the option of the viewer, a smaller representation 1525 of the available image 1524. By utilizing the Y button of the game controls, the viewer is able to command the application software to switch back and forth between the image 1525 and the window 1524.

A subsequent image 1516 depicts the race as it progresses. The target race automobile number five is shown passing race automobile numbered four. As is illustrated, the application software has maintained the targeted automobile centered in the displayed window 1526 while the target has shifted relative to the image. The application software has also maintained the magnification.

A later subsequent image 1517 depicts the further progress of the race. Again the software automatically maintains both the magnification and the targeted race automobile in the displayed window 1527.

To convey the target's movement, the tracking of the target may be "imperfect". The application software may pursue but not necessarily always display the target in the center of the image. For example, the change in the velocity of the window relative to the change in the velocity of the target includes a variable response algorithm.

The software program may depend on a variety of methods of identifying, recognizing, or separating the targeted object with respect to the available image. A first method relies on the producer of the video to identify likely targets of magnification. In such a method, each of the race automobiles is pre-identified and the required data is included as part of the video map or data associated with the video. Assisted by software a video editor will essentially have to create the information necessary to be able to maintain the target within the viewer defined window. To target a race automobile, a viewer will enter the corresponding identification number. Magnification suitable for each target can also be preset by the video producer.

A second and preferred method utilizes the fact that objects in an image are differentiated from each other by, for example, shape and/or colors. Thus, for example, upon the viewer placing a cursor on the numeral five of the target race automobile, the software creates an identification for the target that will permit the automatic recognition of the target as the target moves about the image.

The identification or signature of the target may comprise mathematical equations, spatial representations, color differentiations, pixel signatures, and any combination of these and other image elements. This process is facilitated by the fact that the image is already digitally stored and that compression techniques such as fractal and wavelet utilize mathematical techniques. Thus, if the image is being delivered in wavelet compressed form it already includes the required different spatial relationships.

The identification of the target need not be static. For example having distinguished the numeral five from the background and created one or a plurality of mathematical equations of the outline of the numeral five, the software is not only able to anticipate the likely location of the identification in the image, but it is also able to recognize and/or anticipate different perspectives or distortions of the identification as the host object moves.

There are instances where the identification of the object is absent in one or a plurality of frames. In the automobile race, this would occur when, for example, the target automobile is passing a competitor on the "outside". Several methods are available to cause that the viewer desired magnification and window are maintained. In a first method, the video map provides information to the application software when the character of the image changes. If such information is not provided, the window is maintained. The application software projects the movement of the target in the image, and reacquires the target as the identification is again recognized.

In a second method, the application software creates one or more secondary identifications associated with the target. For example, a logo, bar-code, or other identification on the target automobile or an associated object such as the helmet's signature of the driver of the target automobile. As the primary identification is lost, the software proceeds on the basis of the availability of the secondary identifications. When all are unavailable, the window is abandoned and the full image is transmitted.

If the magnification request remains active, when the image provides the required identification, the target is reacquired and the window is restored.

It is noted that teachings herein are utilizable in a broad range of applications. For example, in the viewing of a football game the viewer may elect to isolate on any of the players, as well as other persons and objects normally included in a wide angle image of a stadium. In a second example, the target acquisition method may be utilized to enable a fire and forget missile to lock on a target and direct itself to the target. The image lock acts as an active homing system once effective video acquisition is achieved.

Figure 16:
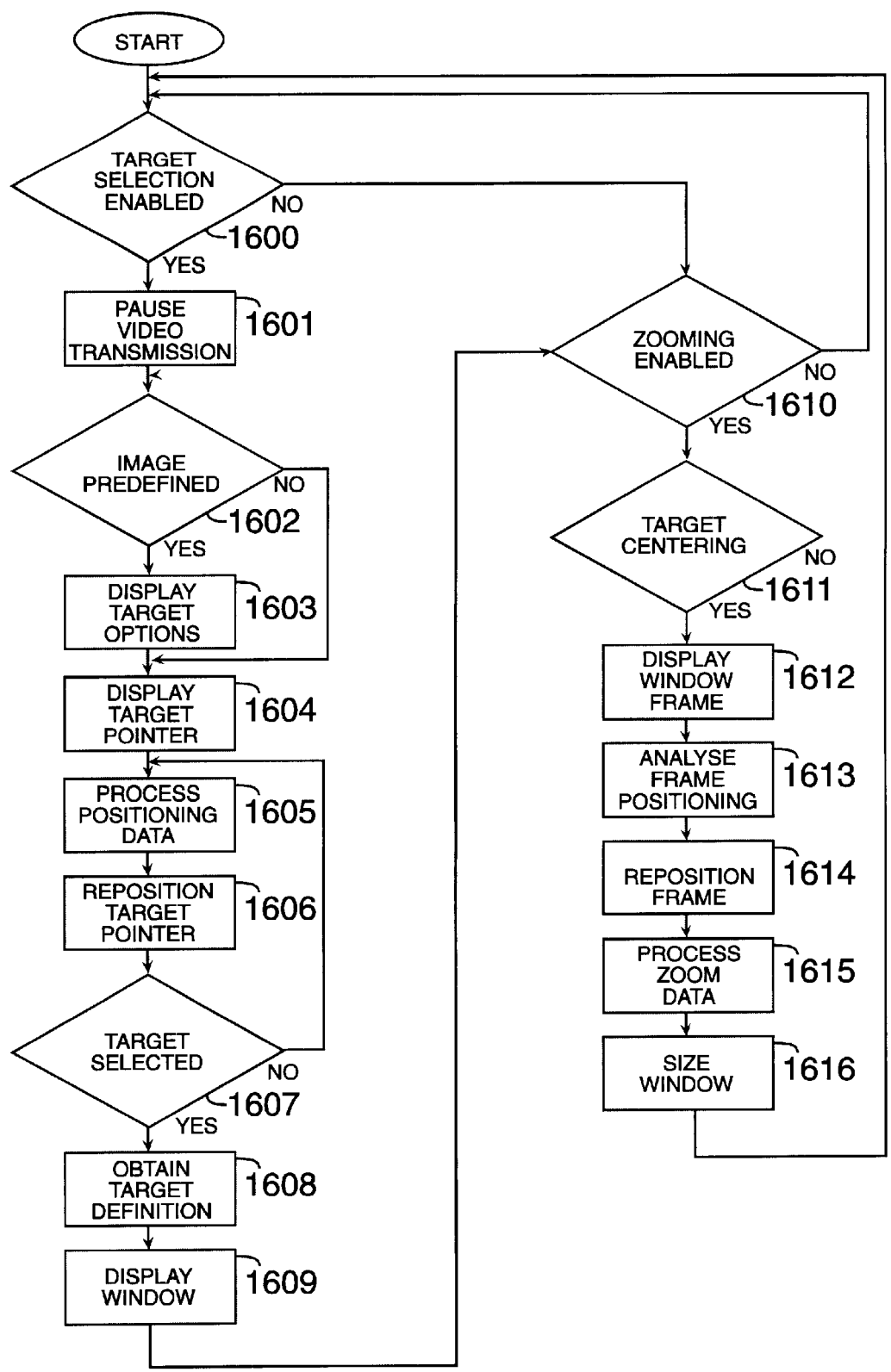
FIG. 16 is a flow chart detailing the steps of creating a viewer defined window.

FIG. 16 is a flow chart further detailing the steps of creating a window responsive to the viewer defined target and magnification. It is noted that the zooming and targeting functions are continually available to the viewer during the viewing of a video. This is represented by the looping character of the flow chart. As previously indicated and as is shown in the flow chart the zooming and targeting functions while integrated may be enabled independently of each other.

Upon receipt of a target selection signal, for example, the pressing of the X-button of the game controls, target selection functions are enabled 1600. The target selection functions automatically pause the transmission of the video 1601.

In instances where the targets in the image have been predefined 1602, the target selection functions display the target options 1603. The displayed image provides a target pointer 1604. Utilizing the game control pad, the viewer moves the targeting pointer to the desired target option. The application software processes the positioning data 1605 and repositions the target pointer on the display 1606.

A second target selection signal indicates the selection 1607 of one of the predefined targets. Alternatively to the game control pad a viewer may select a target by means of, for example, the alphanumeric control pad.

Alternatively, in instances where the target are not predefined, the target selection functions display a target pointer 1604 as before. As the user controls the target pointer, the application software processes the positioning data 1605 and repositions the target pointer on the display 1606. The second instance of a target selection signal indicates the selection 1607. In this case the selection is responsive to the pointer location.

Following the selection of a target, a target definition if available is obtained 1608, and a window is displayed 1609 that is automatically sized to display the target at the center of the window.

Zooming functions are enabled 1610 upon the receipt of a zooming signal, for example, an A-button or B-button signal. Where the viewer is provided the option to define the target's relationship to the center of the window 1611, a window frame is displayed 1612 and the viewer can relocate the window frame with respect to the target by means of the game control pad. The analysis of the frame repositioning data 1613 causes the appropriate re-display of the frame 1614. Other options may at this time be provided the viewer including for example target tracking options.

The processing of zoom data 1615 causes the automatic sizing of the window 1616 responsive to the increase in magnification or decrease in magnification request. Zooming capabilities are enhanced by video compression technologies that lend themselves to resolution independence, enabling high quality zooms to higher resolutions.

While the detailed disclosure with respect to FIGS. 15 and 16 are in terms of a target of magnification, in an alternate embodiment a viewer may select within a single image a plurality of targets of magnification. The presentation of multiple zoomed tracked windows could be executed as a split screen of equally sized windows for each of the selected targets. Alternatively, as FIGS. 17F and 17G serve to illustrate, a viewer may designate primary target to occupy a larger window, and other of the zoomed images to occupy secondary smaller windows.

With respect to the audio that is associated with the video, it is intended that the audio be responsive to the window generated or camera angle selected. In the automobile race example, as the magnification is increased the volume of the engines are increased. Clearly separate audio tracks may be pre-associated with possible targets and the volume of each tract may be spatially linked to the volume of the other tracks. The audio associated with a window results from the combination of the sounds of each of the elements of the image responsive to the spatial links. The volume of the audio being a factor of the apparent distance to the camera eye. Thus if the image covers the entire race track, the sound of all the automobile engines are combined. However, the volume of the combination is responsive to the apparent distance to the camera.

Where the viewer targets a specific automobile and zooms in. The audio volume of the target is increased. The audio volume of the other tracks are adjusted responsive to the spatial links as they relate to the magnification factor. For example, while the window would exclude a number of other automobiles included in the image the corresponding audio tracks are included, the volume of which is adjusted to reflect their relative distance to the target.

It is noted that the identification of a target may include the audio data as well. Thus when the visual identification is lost, the audio data confirms the presence or absence of the target and its relationship to the window and the image.

When audio data is separately available for each of a plurality of elements in a scene (e.g. different actors/actresses in a room), the spatial relationship between the audio elements is responsive to the camera angle selected and the apparent position of the camera (e.g. viewed window) relative to the various elements in the scene. In other words, in a surround sound environment the viewer may perceive audio elements to originate from different locations within the sound field in response to the camera angle and zoom position selected. For example, when a camera is selected that places an actor in back of the camera (i.e. not viewable by the viewer), the voice of that actor would appear to originate from the rear of the sound field, e.g. the rear speakers in a multiple speaker system.

It is emphasized that an object is not to predetermine the allocation, position, and/or levels of audio elements, but to associate information with the various audio elements to enable the on-the-fly mixing of the audio elements responsive to a particular viewer's interaction with the video elements of a video or content preferences.

Just as the teachings with respect to the video content of a variable content video redefine the relationship between an editor/producer's video editing and a viewer's content preferences, similarly the teachings herein intend to render the mixing of audio responsive to the viewer's content preferences.

Figure 17A:
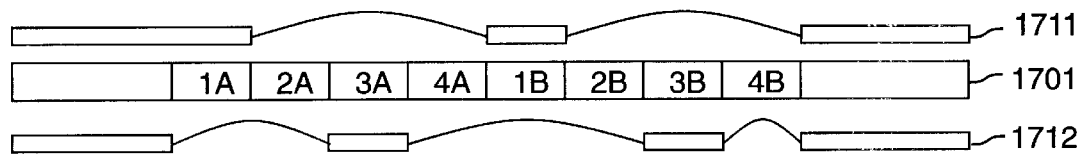

The DVD specifications provides for the:playing of one or more scenes or sections of a video from the perspective of a selected one of a plurality of camera angles. In the DVD specification, in order to seamlessly switch between camera angle presentations, the video of each of the camera angle segments in a set of camera angle presentation segments is separated into units and interleaved ("interleaved units"). FIG. 17A illustrates the interleaved units 1701.

Generally, in FIGS. 17A–17E, and 17H, a numeral identifies interleaved units belonging to the same segment (e.g., a Cell); the capital letters identify a set of interleaved units sharing the same intended order of play; the thick lines represent the video played; and the thin lines represent a seamless skipping. The direction of progression being from left to right.

In those embodiments where a set of presentation segments are not interleaved, the numerals are to be understood as identifying segments sharing the same perspective, e.g., camera angle; and the capital letters are to be understood as identifying a set of presentation segments, i.e., a scene. In non-interleaved embodiments, the FIGS. show two sets of presentation segments, the term "interleaved" appearing herein should be ignored, and the disclosure is to be understood accordingly.

Herein a camera angle segment, segment perspective and/or segment presentation ("presentation segment") consists of all of the content corresponding to one of a set of presentations of one scene of one section. A "perspective", "presentation", and/or "presentation perspective" is, for example, content that is parallel to, and/or duplicative of, other content in a scene, content shot from one camera angle, content from the viewpoint of one of the characters, and/or one of a plurality of explanations of a lesson. A scene defines the duration of a presentation segment. A section of a video may include one or more scenes, and a chapter may include one or more sections. To the extent required, a set of presentation segments may or may not be interleaved.

Thus, a section could include a plurality of scenes each comprising a set of presentation segments. For example, a presentation of an inning (section) of a baseball game may include a scene (e.g., a set of interleaved presentation segments) including a presentation of: a pitcher from the perspective of a first camera angle; a pitcher from the perspective of a second camera angle; a batter; a runner on first; the pitcher and the batter; and the pitcher, the batter, and the runner; wherein the scene is defined by, for example, as the complete at bat of the batter, or a single pitch. If the scene is defined by a complete at bat, than all of the batter's swings from a single perspective make up a single presentation segment. Alternatively, if the scene is defined as a single swing of the bat, than only one swing from a single perspective is included in any one presentation segment.

In the playing of a set of presentation segments (e.g., a Cell Block), the navigation software retrieves the Multimedia Player's camera angle or presentation setting and plays the presentation segment (e.g., Cell) matching the presentation preference. A presentation preference may be established prior to playing the video, at some time prior to the playing of a scene, and/or during the playing of a scene.

FIG. 17A illustrates a seamless playing of segments from video stream 1701 including an interleaved set of four presentation segments. In a first example 1711, the playing of a video is responsive to one presentation preference (1). In a second example 1712, the playing of a video is responsive to a second presentation preference (3).

Figure 17B:
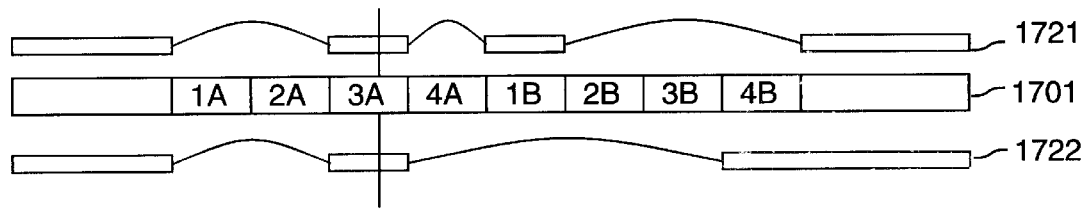

FIG. 17B shows two examples, where the playing of the video is responsive to a previously established presentation preference (3), and is responsive to a presentation preference change (3 to 1) and (3 to 4) resulting from a viewer request, system request, video authoring request during the playing of an interleaved unit. In both examples, when the presentation preference change request is initiated during the playing of an interleaved unit, the playing of the current interleaved unit is not terminated. The change in the playing of interleaved units occurs at the end of current interleaved unit, and proceeds with the beginning of the interleaved unit that follows in the next set of interleaved units. For example, when a presentation preference change occurs during the playing of unit 3A, from presentation segment (3) to presentation segment (1) 1721, the playing of the 3A unit is completed prior to the seamless playing of the 1B unit. Similarly, when a presentation preference change occurs during the playing of unit 3A, from presentation segment (3) to presentation segment (4) 1722, the playing of the 3A unit is completed prior to the seamless playing of the 4B unit. A jump from 3A to 4A is not considered a seamless presentation change.

The methods detailed with respect to FIGS. 17A and 17B are examples of seamless playing of a set of camera angles. In a "non-seamless" angle change, when a presentation preference change occurs, for example, during the playing of unit 3A, from presentation segment (3) to presentation segment (1), the playing of the 3A unit is interrupted and the interleaved unit 1A, rather than 1B, is played from the beginning.

Accordingly, what is now described are methods of playing presentation segments which are not provided by the above methods of playing a DVD. The unconventional methods that follow require a navigation software especially adapted, by including routines written, to selectively utilize navigation data. Here, the navigation data, e.g., segment information, may be provided by, or with, the source of the video and/or by an alternate source.

Figure 17C:
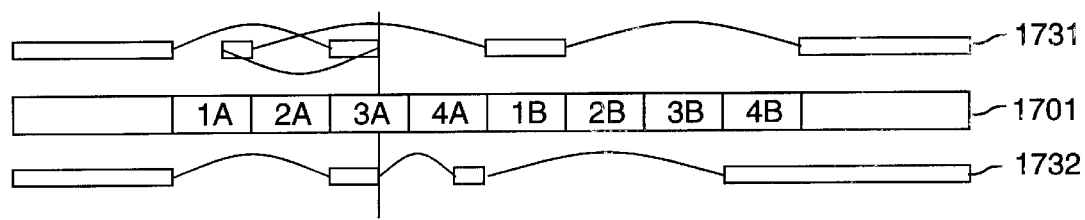

FIG. 17C shows two examples that make greater use of a buffering and random access capability to cause a faster change in the presentation segment displayed. In a first example, when a presentation preference change occurs during the playing of unit 3A, from presentation preference (3) to presentation preference (1) 1731, the playing of the 3A unit is interrupted immediately at that point that a seamless transition to the corresponding place in the interleaved unit 1A of the newly selected presentation segment (1) can be affected by the particular hardware implemented. This particular presentation change from (3) to (1) 1731 is distinguished from the second example, (3) to (4), 1732 of FIG. 17C, by the backward jump in the video stream.

The methodology detailed with respect to FIG. 17C is particularly advantageous in those instances where: i) the duration of the interleaved unit is sufficiently long; ii) the required video is previously retrieved and/or already buffered; and/or iii) the video source is a RAM, e.g., does not require a mechanical action.

FIG. 17D illustrates two methods, of playing a set of presentation segments 1701, which are not possible with the use of, for example, an RCA RC5200P DVD player. These particular methods are advantageous in those situations in which a viewer desires to view the entirety of a scene or section from two or more presentation perspectives without having to manually rewind, and without requiring changing a preference for a specific presentation segment during the playing of the set of presentation segments.

In the first example 1741, the video stream is played as if it did not comprise interleaved presentation segments. That is, the navigation software does not execute the seamless jumps of interleaved units which are conventionally executed in the response to a video map's presentation data. In a DVD embodiment, the navigation software is especially adapted to ignore, responsive to a viewer's content preferences, the data that causes the skipping of interleaved units. This method is particularly advantageous in those instances where the duration of the interleaved units are of sufficient time to provide a useful display, and/or where the viewer would prefer a playing characterized by frequent changes in the presentation perspective, as is the case in many music videos. Although the technical seamlessness of the method of the first example 1741, does not require random access and buffering beyond that which is available in current DVD players, the usefulness of the presentation may suffer from the high frequency of presentation changes.

In the second example 1742, responsive to, for example, a viewer's presentation preferences all of the interleaved units of a presentation segment from the set of interleaved presentation segments of a scene are first played before automatically playing any of the interleaved units of another presentation segment of the set. As is shown in the example, 1742, the process repeating itself as all of the presentation segments, or the desired presentation segments, are substantially played.

By utilizing the navigation software to accomplish this automatic sequential playing of a plurality of presentation segments of a set of presentation segments, the viewer is provided with a complete, uninterrupted, operationally seamless, and elegant playing of each presentation segment of a set of presentation segments without requiring interaction by the viewer.

Alternatively, a presentation preference may stipulate the playing of each of the presentation segments of each of the scenes in a section or plurality of sections that share the same perspective prior to playing another presentation segment having a different presentation perspective. In other words, responsive to a presentation preference, scene and section definitions are ignored, within, for example, a chapter. Such a playing could duplicate or skip, in a contemporaneous subsequent playing, those segments ("common segments") between sets of presentation segments.

The playing of multiple presentation segments may be responsive to preferences for a subset of the available presentation perspectives. For example, a viewer may not desire to view close ups. FIG. 17E shows two examples 1751 and 1752, corresponding to the two examples 1741 and 1742 of FIG. 17D, in which the presentation segment (2) is seamlessly skipped in response to a preestablished content preference that directly or indirectly excludes the particular presentation segment.

Further, as is shown in the third example 1753 of FIG. 17E, the playing of multiple presentations may also be responsive to a preference for the sequence that certain presentation perspectives are played. For example, while one viewer may prefer a sequence of presentations comprising a faraway, midrange, and close-up sequence, a second viewer may prefer a sequence of presentations comprising a faraway, close-up, and midrange sequence. The example 1753 of FIG. 17E, shows the playing of multiple presentations in which the presentation (2) is excluded, and the order of the presentations (1, 4, and 3) are played in a manner different from their physical order (1, 2, 3, and 4), and the manner shown in the second example 1752 (1, 3, and 4).

As shown in the fourth example 1754 of FIG. 17E, the playing of a plurality of presentation segments of a set of presentation segments of a scene and/or section may be set to loop any number of times or continually until the number of times established is played and/or the viewer causes an escape from the looping. In this example 1754, the looping, is also randomized. (For clarity, illustrations of interleaved units are duplicated.)

The activation of the playing of more than one presentation segment of a set of presentation segments, unless otherwise required or preferred, does not interrupt or discontinue a playing of a current presentation segment.

The segment information in a video map and random accessing and buffering capabilities are essential in the seamless playing of presentation segments, specially, for example, in a seamless playing comprising a plurality of skipping forwards and backwards within a video stream as required, by for example, a continuos looping of a set of interleaved presentation segments. Methods detailed herein may require either a faster random access capability, a larger buffer, or some combination of the two, than that required for the conventional playing of interleaved units to maintain a technical seamlessness.

A system, e.g. a Multimedia Player, capable of playing at least two presentation segments of a set of presentation segments, e.g. a set of camera angle presentations, of at least one scene of a video, comprises the preferencing, processing, random accessing, and buffering means for: playing, responsive to a presentation preference and segment information, at least one presentation segment of the set of presentation segments; skipping, responsive to the presentation preference and segment information, to a beginning of a presentation segment of the set of presentation segments; subsequently playing the skipped to presentation segment; and continuing, responsive to the presentation preference, the skipping and the subsequent playing.

Alternatively to playing the entirety of a presentation segment before playing a subsequent presentation segment of the same set of presentation segments, responsive to, for example, a viewer's presentation preference for a fragmented playing, only a substantial portion fragment, or number of the interleaved units ("fragment") of a first-played presentation segment from the set of interleaved presentation segments of a scene is first played, followed by playing a fragment of a next-played presentation segment in the set, before proceeding with playing another fragment of the first-played presentation segment.

In a fragmented playing, the substantial fragment or number of interleaved units played is responsive to a preference for the maximum duration of a playing of a presentation perspective. For example, in a single-pass playing (1742 FIG. 17D) of a set of presentation segments each of two minutes duration, the first 1.5 minutes of playing would be taken up with the playing of the first 1.5 minutes of only one presentation segment. By contrast in a fragmented playing, where the presentation preference is established at 30 seconds, the first 1.5 minutes would be taken with the playing of the first 30 seconds of each of three of the four presentation segments.

A fragmented playing method can still be implemented in the absence of, or independently of, an interleaved set of presentation segments, either by utilizing direct information provided by a video map, or by, for example, arbitrary fragmentation or calculation taking into account the particulars of the specific set of presentation segments.

A system capable of a fragmented playing of at least two presentation segments of a set of presentation segments of at least one scene of a video, comprises preferencing, processing, random accessing, and buffering for: sequentially and seamlessly playing, responsive to a presentation preference and segment information, and by means of a random accessing and buffering, a fragment of each of at least two presentation segments of the set of presentation segments; and continuing by sequentially and seamlessly playing, by means of the random accessing and buffering, a subsequent fragment of each of the at least two presentation segments until at least a last fragment of each of the at least two presentation segments has been played. The presentation preference being with respect to a maximum duration of a continuous playing of a presentation segment.

Figure 17F:
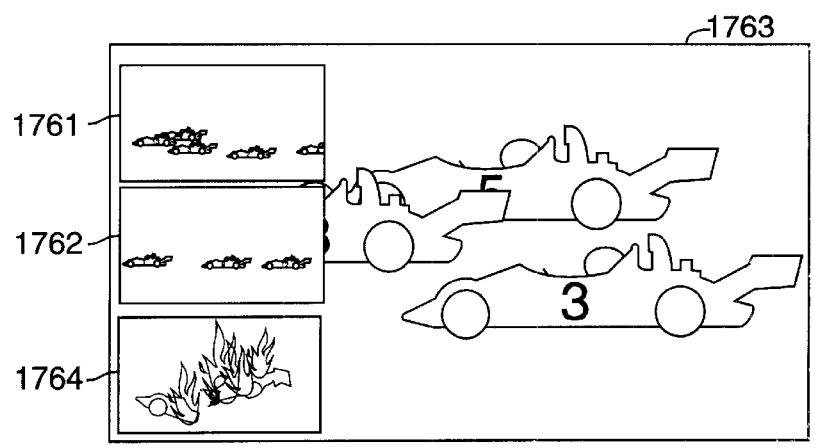
Figure 17G:
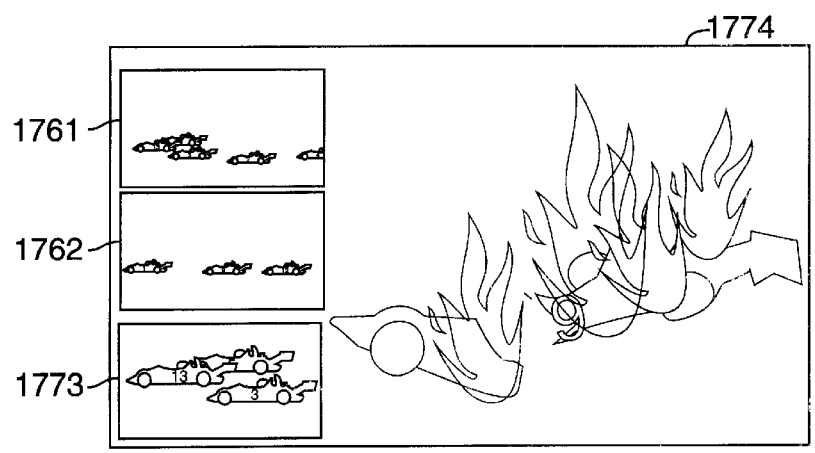

The playing of multiple presentation segments may be merged and displayed in a synchronized manner at the same time in equal size windows, or, as shown in FIGS. 17F and 17G, one presentation segment is shown full screen or nearly full screen ("primary window") 1763, and the other presentation segment are shown in smaller "secondary windows" 1761 1762 1764, either superimposed on the larger window or in a space left over by a near full screen primary window.

The particular configuration, placement, and relative sizes of the primary window 1763 and secondary windows 1761 1762 1764 being responsive to system defaults, viewer's preferences, information provided by the video map, and/or the application of the viewer's preferences to the information provided by the video map. A comparison of the illustrations of FIGS. 17F and 17G suggests that a presentation display preference change has been executed. In this example, the presentation being displayed in the primary window 1763 of FIG. 17F is now displayed in FIG. 17G in one of the secondary windows 1773. Conversely, the presentation being displayed in one of the secondary windows 1764 of FIG. 17F is now displayed in FIG. 17G in the primary window 1774. Viewer routines for accomplishing the switching between presentations is analogous to the switching of displays currently available in picture-in-picture ("PIP") applications.

The selection of a particular presentation for display in the primary window need not be static or responsive to the execution of a specific presentation display preference. The display of presentations in the primary window can be automatically rotated responsive to system parameters and/or viewer preferences. For example, in a looping of a set of presentation segments (1754 FIG. 17E), the synchronous simultaneous playing of a plurality of presentation segments is rotated among primary and secondary windows, with a "current" presentation segment occupying the primary window.

The techniques for, and methods of, merging multiple video streams being know in the art, as is evidenced by the PIP capabilities of various electronic devices. In the case where a set of presentation segments is provided by a single stream, as in the case of a DVD, the interleaving of the presentation segments, and a sufficient combination of a high video retrieval rate and buffering, enable retrieving, buffering, and synchronously simultaneously playing a plurality of presentation segments within a single or a plurality of images, windows, and/or displays.

Figure 17H:
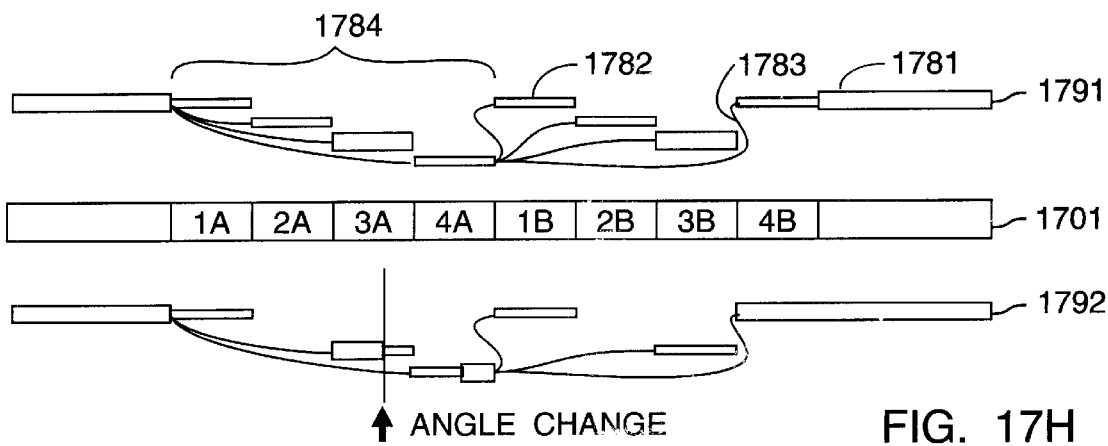

In order to provide a synchronized simultaneous display of the plurality of the desired and physically separately provided set of presentation segments, as illustrated in FIGS. 17F and 17G, each of the set of interleaved units is read, in advance of the time required for a seamless play, as is shown in the examples of FIG. 17H. In this method, the interleaved units are read into a buffer of a size sufficient to enable the processing of the video to play a synchronized simultaneous display. The interleaving of segments, and minimizing the size of the interleaved units reduces the buffering and random access requirements. As the size of the interleaved units approaches the method detailed previously with respect to FIG. 8B, and consistent with the minimal amount of data/frames required by the compression methodologies implemented, system requirements are reduced.

Nonetheless, as a result of the significantly larger amount of data being processed, and the fact that the authoring of a video may not be directly supportive of this particular feature, the buffering required can be expected, in certain embodiments, to be substantially larger than that found in the previously cited DVD player. However, certain configurations of a Multimedia Player detailed herein, already include significant memory assets that can be exploited for this particular purpose, for the purpose of maintaining a seamlessness in the presentation, and for any other specific and/or general purposes detailed herein.

In FIG. 17H the presentation displayed in the primary window is illustrated with the large blocks 1781, the presentations displayed in the secondary windows are illustrated with the small blocks 1782; the video retrieval paths are illustrated with the thinnest lines 1783, and a first set of interleaved presentation units or fragments are indicated by a bracket 1784.

The first example 1791 of FIG. 17H illustrates a case in which the plurality of presentation segments in a set are displayed, with presentation segment (3) being displayed in the primary window. The second example 1792 of FIG. 17H illustrates a case in which three of the four presentation segments are displayed, i.e. presentation segment (2) is not displayed, and a change in the display of the presentation segment (from 3 to 4) in the primary window has been executed. As in the example detailed with respect to FIGS. 17F and 17G, the display of presentation segment (3) in the primary window has been replaced by the display of presentation segment (4) during the synchronous simultaneous playing of a plurality of presentation segments.

A system capable of simultaneously playing at least two presentation segments of a set of presentation segments of at least one scene of a video, comprises preferencing, processing, random accessing, and buffering for: retrieving, responsive to a presentation preference and segment information, and by means of a random accessing, a portion of each of at least two presentation segments of the set of presentation segments; buffering the retrieved portion of each of the at least two presentation segments; simultaneously playing in a synchronized manner, by means of the retrieving and the buffering, the portion of each of the at least two presentation segments; and continuing the retrieving, buffering, and simultaneously playing until at least a last portion of each of the at least two presentation segments has been played. The playing of the at least two presentation segments is rotated among a primary and secondary windows. The displaying in a primary or a secondary window being responsive to a display preference.

It is emphasized that the methods herein shown are not confined to situations in which the various presentation segments in a set are of the same duration and/or interleaved in the manner prescribed by the DVD specifications. Further, methods herein shown are not confined to a video stream retrieved from, for example, a DVD. As previously suggested, a DSS video stream, for example, comprising the transmission of a set of presentation segments in faster than real time, utilizing multiples of the data bandwidth required by a single stream, and/or utilizing a plurality of video streams, and whether buffered or downloaded to a local storage, can also benefit from the methods herein detailed.

Further, the techniques detailed herein with respect to fragmenting of a segment and the looping in the playing of a segment may be combined and utilized in a playing of a segment, scene, and/or sector which is not a presentation segment or part of a set of segments. For example, the playing of a two minutes ice skating performance, could be fragmented and looped to create a four minutes presentation, or an endless presentation of random seamless fragments of one or more segments. This particular method may be advantageously be applied to scenes which are, for example, panoramic and/or visually interesting and where a redundancy of presentation would be enjoyable. A fragmented looped playing may also be advantageously utilized in those instances where repetition is an important aspect of a learning experience, e.g., learning videos for young children.

The fragmentation and looping of segments may be purely random, responsive to a video map defining fragments and/or segments and their potential order or combinations, and/or substantial changes in the comparative content of frames, e.g., perspective change.

Figure 171:
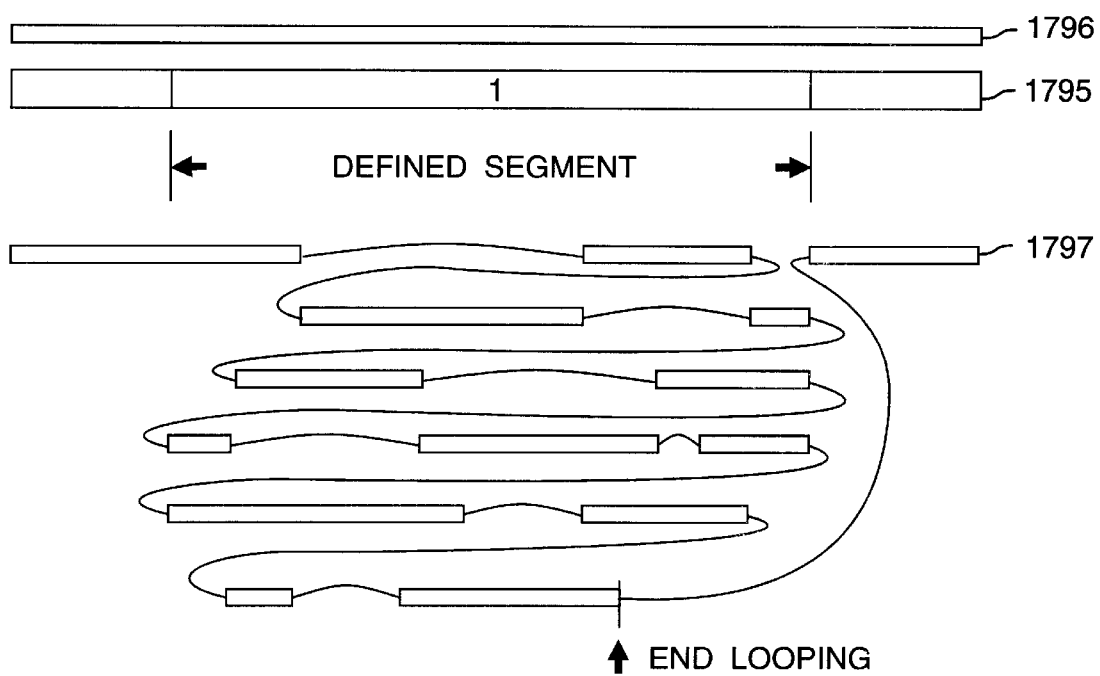

FIG. 171 illustrates an example of a fragmenting and looping of a playing of at least one segment of a video. In a linear playing 1796 of a video 1795 and in the absence of a viewer's interaction, e.g., rewinding of the video, the content of a video segment is only displayed once. In an example of a fragmented and looped playing of a segment 1797, a segment is defined by a video map, indirectly by a reception of a looping request, e.g., as in the activation of a replay function, or directly by a viewer identifying or marking (272 FIG. 2) a beginning point and an end point. The illustration 1797 shows a defined segment which has been arbitrarily fragmented, the firsts set of fragmented segments played, the segment is arbitrarily fragmented again, and as the second set of fragmented segments are played, the fragmentation of the segment and playing of a fragment is repeated with the playing of a single segment. In the illustration 1797, the looped playing of the fragmented segments is terminated in response to a termination command. The termination command may be issued by a viewer, be responsive to a viewer's preestablished presentation preference, e.g., amount of time or percent duplication, be responsive to system settings, in response to system controls provided with the video, and/or responsive to a perception that a viewer has lost interest (e.g. repeated eye movement away from the display). As in other methods herein, a fragmented looped playing method may also benefit from audio processing, e.g. dropping dialog.

A system capable of fragmenting and looping a playing of at least one segment of a video, comprises preferencing, processing, random accessing, and buffering for: responsive to a viewer's request, arbitrarily dividing a segment or a segment definition corresponding to a segment of a video into a plurality of fragment definitions corresponding to a plurality of fragments of the segment; utilizing the fragment definitions to play the plurality of fragments in a random, looped, and duplicative manner to produce a playing of the fragments of the segment that is of a longer duration than the playing of the segment. Advantageously, the arbitrary dividing is responsive to a presentation preference for a minimum duration of a fragment, produces fragments of unequal length, and is repeated prior to a playing of each set of fragments, and/or during a playing of set of fragments. Alternatively, or additionally, a random and repeated skipping within the boundaries of a segment is utilized to produce a fragmentized, randomized, looped playing of a segment.

In each method of playing a segment and/or presentation segment, where appropriate or advantageous, the presentation preference may be activated by a presentation command, e.g. a voice or remote control command, received during a playing of a segment, established prior to a first playing of a segment, for a sequence in the playing of segments, and/or, as detailed further below, responsive to a set of presentation perspective definitions established for a plurality of videos; the playing, seamless or otherwise, of a segment, a plurality of segments, or all of the segments of a set, may be looped a preestablished number of times and/or continuously until discontinued by a termination command; and/or the playing of presentation segments seamlessly skipping any fragment of, or the entirety of, a presentation segment or segments inconsistent with content preferences including content, technical, and presentation preferences.

The playing of presentation segments are further advanced by the implementation in the definition of segments of a standardized set or sets of presentation perspective definitions that would facilitate the establishing of presentation preferences applicable to a plurality of videos, and/or independently of any one video. For example, with respect to the utilization of cameras in the filming of a section of a dialog between two individuals, the standardized presentation definitions include: Long Shot, Medium Shot, Close Up, High Angle, Low Angle, Overhead, and Over the Shoulder, each or in combination, and with respect to, for example the principal actress or the actor in the section. Other presentation definitions which may serve to define a standard comprise, for example: Angle Front (Full, ¾, 1/2, 1/4), Angle Back (Full, ¾, 1/2, 1/4), Angle Side (Full, ¾, 1/2, 1/4), Angle Top (Full, ¾, 1/2, 1/4) Angle Bottom (Full, ¾, 1/2, 1/4) Perspective Female (None, Little, Mostly, Exclusive) Perspective Male (None, Little, Mostly, Exclusive). In the case of sporting events, the presentation definitions may be established both with respect to the areas of the field of play (e.g., in a baseball game, right outfield), a player position (e.g. pitcher), and with respect to the relative location of a primary or secondary object (e.g. the baseball and/or a base runner).

In general, content preferences, which include presentation preferences, may be established individually, in combinations, and/or as specified by logical or Boolean operators (e.g. AND, OR, NOT, AND, NEAR). Specifically, standardized presentations definitions enable a viewer to preestablish presentation preferences that would serve to automatically exclude and/or include certain presentations or perspectives with respect to, for example, an actor or actress, and with respect to the subject matter or content of a section. For example, a viewer may prefer to view, during romantic sections, a medium shot that includes the actress and actor, rather viewing a close-up of the actor. However, the same viewer may not prefer that the same presentation preferences be applied in violent sections or segments. Clearly, a viewer may prefer that a set of presentation preferences be applied in one context, and that an opposite set of content preferences be applied in another context.

An additional object and advantage of establishing a set of standardized presentation definitions is to enable a viewer to change presentation preferences without requiring that the video presentation be interrupted, and/or without requiring the utilization of a significant portion of the screen to identify or explain the presentation preferences available. For example, given a standardized set of presentations each always associated with a 1–9 key in a remote control, the placing of a 3×3 matrix of numerals, 3–4 letter codes, or icons, highlighted for available presentation perspectives, provides a viewer the information required for a purposeful presentation change.

Other simpler or more novel methods may be implemented, as, for example, may be suggested by the previous disclosure with respect to FIG. 15. Further, and in particular with respect to video of sporting events, for example, a particular symbol (e.g. logo) or numeral in a uniform may be computer highlighted to indicate the availability of a presentation.

As previously indicated, presentation preferences are a subset of a set of content preferences. It is intended that the methods herein detailed be responsive to content preferences, including the relevant technical preferences and presentation preferences to, for example, directly or indirectly exclude a particular presentation segment and/or portion of a presentation segment. For example, while a particular presentation segment may be consistent with a camera angle presentation preference, a portion of the presentation segment is seamlessly skipped because it provides a level of graphic bloodshed that is inconsistent with a content preference for implied rather than graphic bloodshed.

Further, some methods of playing presentation segments would be enhanced by incorporating the audio methodologies previously detailed with respect to FIG. 13, particularly where the incidence of presentation change is great and/or a looping is enabled. For example, the dialog may be turned off during a playing of a second or subsequent presentation segment following the playing of first or initial presentation segment in the same set of presentations segments.

Still further, the playing of presentation segments is responsive to the actual availability of content as opposed to being responsive to, for example, duplicated segment definitions, Duplicated segment definitions may be utilized to maintain a set number of presentation options across a plurality of sets of presentation segments, e.g. four camera angle options are provided in every set of presentation segments in a motion picture. Unless otherwise required, software routines would, for example, compare the segment definitions or utilize other video map data, to avoid playing content, interleaved units, portion of a segment, and/or segment definitions, that are duplicated.

Accordingly, the term "playing" as in playing a segment, and as in playing a presentation segment, should be understood as meaning, as the context may require, "playing meaningfully, substantially, and/or responsibly all or a portion" of a segment or presentation segment, . In other words, while a method may suggest or intend to play the entirety of, or all, of a selected presentation segment, it does not follow, that, for example, every video, audio, subpicture segment portion, interleaved unit, frame, and/or bit of data will be played or need be played. As previously indicated, the subsequent playing of a presentation segment may omit playing the dialog while still playing the background audio.

While not shown, it should be appreciated that the methods detailed can be equally applied to a "de-intertwining" of the playing of different sections or scenes that are intertwined in a video stream to reflect, or suggest, a time concurrence or a contemporaneous occurrence. For example, instead of playing sections in the intertwined manner that they are physically stored, the Multimedia Player utilizes a video map to reorganize the order of the intertwined segments of each of the scenes so that one scene is first played in its entirety before a segment of another of the interleaved sections is played. Conversely, scenes which are not physically intertwined may be played in an intertwined manner. In the extreme, a video map externally provided to a Multimedia Player can permit the seamless automated playing of a video in, for example, manners not intended by the director of a motion picture.

An example of the application of the teachings herein, would be a novel playing of the 1993 released motion picture "The Fugitive", in which at the beginning of the film, segments are played to indicate to the viewer that the doctor was innocent of the crime for which he is pursued. The playing, as per the teachings herein, for a viewer who may prefer, for example, to view the motion picture with a higher degree of intrigue, would play the particular segments at a later point in the playing of the motion picture.

It is intended herein that the methods of preestablishing or establishing of content preferences include the preestablishing and establishing of presentation perspective preferences. Additionally, the various viewer accessing means provide access to the specific functions relating to the preestablishing and/or establishing of presentation perspective preferences. For example, a voice command of, for example, "Angle Setup", or pressing the "Angle" key on a remote control (200 FIG. 2) would cause, for example, a system audio/voice response and/or a display of the appropriate presentation perspective preferences options.

Alternatively, or additionally, command and keys may be configured to toggle between options or respond to, for example, a contemporaneous subsequent request. For example, responsive to a viewer's preferences, a single pressing of the Angle key would change the presentation segment in a conventional fashion, while an initial and a contemporaneous subsequent request, e.g. double pressing the Angle key, would enable the looped random playing of presentation segments 1754 detailed with respect to FIG. 17E. A subsequent pressing of the Angle key would terminate the looping and/or the playing of the presentation segments in the set.

As it has been shown, while a particular specification or standard, e.g., the DVD specification, may call for certain functions, e.g., a method of playing camera Angles, it does not mean that the creative utilization of the data that may be obtained need be confined to what is required or suggested by a specification or standard that is advanced, published, and/or generally adopted, and embodied in the data. The point once more made, is that advantageous video services and features can be provided by the innovative utilization of random access and supportive autoactive software methods and principles.

As detailed with respect to FIG. 1, in a preferred embodiment a Multimedia Player is capable of simultaneously receiving and managing a variety of network transmissions. As indicated herein, and referring to FIG. 4, in a preferred embodiment the network provides video, data, voice/video communications and any variety of digital and/or analog transmissions.

A variable content video provides for an elegant integration of the video and communication services that can be delivered to a viewer by these and a variety of other communication systems. Specifically, while a Multimedia Player is retrieving a video from either a video services provider or from a storage device, a Multimedia Player may receive a communication. The "communication" may be in the form of a phone call, videophone call, fax, messaging and paging, and any analog or digital transmission.

A video and communication system for integrating the retrieval of a video and a communication comprises for example: i) retrieving means for retrieving a video from a video provider or from a storage means storing said video; ii) communicating means for receiving a communication; iii) accepting means for accepting said communication; iv) terminating means for terminating said communication; v) pausing means, responsive to said accepting means, for automatically pausing said retrieving; vi) resuming means, responsive to said terminating means, for resuming said retrieving; vii) transmitting means, responsive to said retrieving means, for transmitting to a viewing system; and viii) preferencing means for establishing video content preferences.

In those instances that the video comprises a video map defining a plurality of video segments of the video, the retrieving means, responsive to an application of the video content preferences to the video map, not only retrieves a version of the video, but also identifies an appropriate prior point to resume retrieving video segments following a pause in the retrieving.

Figure 18:
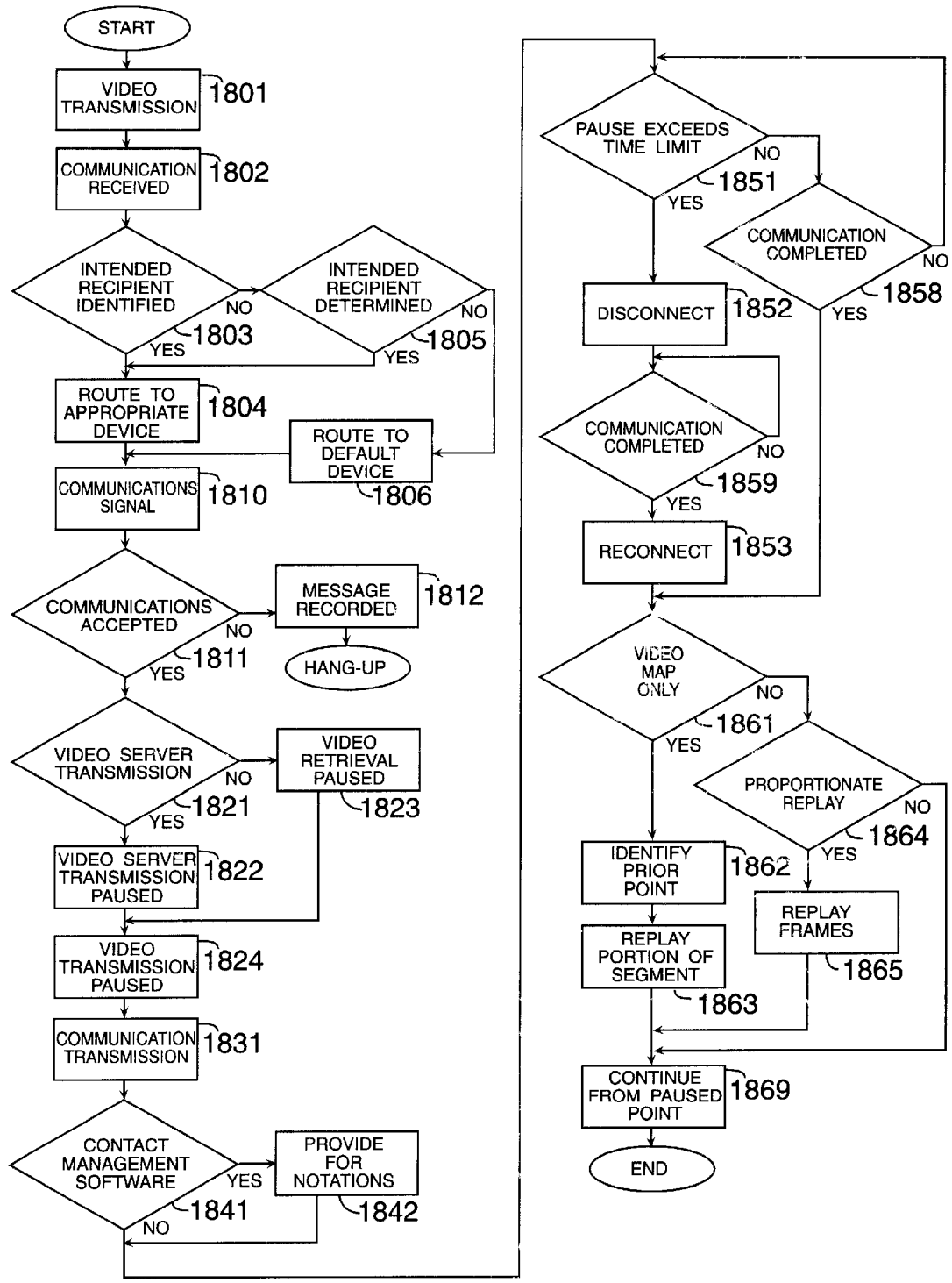
FIG. 18 is a flow chart detailing the steps of integrating the playing of a video with the acceptance of a communication.

Referring to FIG. 18, a viewer of the video being transmitted to the display is likely to have identified himself or herself to a Multimedia Player as was previously detailed with respect to FIG. 9A. Similarly, the user of a computer-type application may have logged in, and thereby also provided a Multimedia Player with his/her identity. Thus, during a Multimedia Player's transmission 1801 of a video to a display, when a Multimedia Player receives a communication 1802 and if the communication identifies the specific intended recipient 1803, a Multimedia Player's software routines are able to automatically direct the communication to an appropriate device. A Multimedia Player, in this case, automatically routes the communication 1804 to the display, the terminal, and/or the remote control.

Alternatively, depending on the nature of the communication, a Multimedia Player may provide the originator of the communication the means to direct the routing of the communication. For example, in a voice call, voice response software will provide the caller an appropriate voiced menu to provide the routing information. Other means active or passive may be available for a Multimedia Player to determine the proper routing 1805. For example matching "Caller ID" with a table matching callers with recipients.

If proper routing of the communication cannot be determined by a Multimedia Player, the communication is directed to a default device consistent with the character of the communication 1806. For example, in the case of a fax to fax machine or a Multimedia Player's fax software.

In this example, the communications is a videophone call and is directed to the display at the time that a Multimedia Player is transmitting a video to the display 1801.

Directing the communications to the display first causes a Multimedia Player to provide an appropriate video and/or audio signal 1810 to the viewer through the display. The signal may include caller identification and other data relevant to or associated with the call.

If the viewer accepts the call 1811, the Multimedia Player initiates routines 1821–1823 to cause that the transmission of the video to the display is paused 1824. Viewer acceptance of the communication may include, for example, picking up a receiver, pressing a key on a remote control device, a voice command, or directly touching an icon on a screen either in a remote control device or on the display itself. Thus, a single viewer action or command 1811 both accepts the call and pauses the video 1824.

If the viewer does not accept the call during a predefined time, the Multimedia Player terminates the audio/video signal and engages communications recording function or devises to receive a message 1813. At the end of the message, the Multimedia Player hang-up on the communication. In this case the video transmission to the display is not paused and Multimedia Player video transmission continues uninterrupted.

Where the video is being retrieved from a video services provider video server 1821, the Multimedia Player transmits to the video server the appropriate pause commands 1822, causing the video server to hold the further transmission of the video 1824. When the video is being retrieved from the Multimedia Player's own video storage module, (e.g. a DVD) the Multimedia Player pauses the retrieval 1823 of the video from the storage module, also pausing the video transmission 1824.

A Multimedia Player's automatic integration of the delivery of a video and the acceptance of a communications may be configured by the viewer in any of a plurality of modes. The viewer may configure the Multimedia Player to cause a display of information relating to the incoming communication (data and image) on a window, without necessarily pausing the transmission of the video but lowering the audio associated with the video if the communication comprises a sound element.

The flow chart of FIG. 18 presumes that the viewer has configured the system to pause the video when a communication is accepted. In this case, the video's image may be replaced with a blank screen, neutral image, or informational data. When the communication is a video call, the screen image is replaced with that of the incoming call 1831.

When contact management software is available, and if the communication is deemed to require the use of such software 1841, the viewer is provided the opportunity to make such notations with respect to the communication 1842 as the viewer may require. Alternatively, the viewer may cause the Multimedia Player to log the communication. The screen display is intended to accommodate both a communications window and a contact management window.

When a pause in the transmission of the video, whether resulting from the acceptance of a communications or a viewer's pause command, exceeds a certain time limit 1851, the Multimedia Player will automatically disconnect the linkage to the video server or put the disc module to sleep 1852. In such instances the Multimedia Player and/or the video server retains the required information to initiate transmission of the video at the appropriate point.

Upon completion of the communication 1858–1859 or when the play command is issued by the viewer, if disconnection occurred or the disc module was put to sleep 1852, the Multimedia Player will reestablish the linkage with the video server or awaken the disc module 1853.

Upon completion of the communication 1858–1859, the delivery of the video is automatically restarted at the point placed on hold 1869, at some predefined amount of time prior to the placing on hold of the video, or at a suitable prior point in the video.

When the video being delivered comprises a video map 1861, the map identifies the beginning point of the segment in which the pause occurred thus automatically identifying a suitable prior point 1862 in the video to restart the delivery of the video 1863. By automatically replaying at least the portion of the segment prior to the paused point 1863, and then continuing the play of the video from the paused point 1869, the viewer re-engages the video at the paused point 1869 without a loss of continuity.

Alternatively, or additionally, in the absence of a video map 1861, the amount of video replayed 1863 may be in some direct proportion to the duration of the pause 1864. That is, if the pause was only a few seconds in duration, only few seconds worth of frames or a single segment may be replayed 1865. However, if the pause was for a considerable longer period of time 1864, a greater number of frames or segments may be replayed 1865.

In instances where proportionate replay 1864 is combined with the availability of a video map, the map provides the necessary information to identify an appropriate prior point from which point the video is replayed 1865. The video is then continued from the paused point 1869.

If a video map is not available 1861, and proportionate replay is not elected 1864, or the viewer has elected that following the pause the video continue directly from the paused point, then the video is continued from the paused point 1869.

Thus a single viewer command, whether play or the termination of the communication, automatically "rewinds" the video to an appropriate point prior to the pause, and plays the video from that point.

A significant contribution intended by the present disclosure is to further advance the benefits to be provided to consumers by the synergistic inclusion of a video map with the visual and audio components of a video, and to further advance the potential of a variable content video.

The teachings disclosed herein, directly and indirectly by, for example, incorporation, are intended to show a variety of architectures, services, capabilities, systems, methods, and inventive elements which are combined and may be combined to suit particular embodiments. The synergies among and between the various inventive elements is a significant feature of the disclosures herein. The various examples included herein demonstrate that it is intended, and deemed advantageous, that each of the methods detailed herein benefit from the teachings presented with other methods detailed herein.

Further, it is the intent of incorporation to derive the full benefits, as an addition or an alternative, of the logical integration of the teachings herein with the teachings of the references cited. The incorporation by reference at a specific place within the specification is not intended to limit the extent to which the reference is incorporated, or the manner in which it may be integrated.

Where a teaching may be deemed to be at cross purposes, or otherwise incompatible, with some other teaching, it ought to be understood as a possible alternative to be utilized as a particular preferred embodiment may require. Clearly, it may be neither advantageous nor practical for all the elements or a particular combination of elements to be implemented in a single embodiment.

While elements of the inventions have been detailed in conjunction with specific embodiments thereof, it is evident that many alternatives, modifications and variations are possible and will be apparent to those skilled in the art in light of the foregoing description. Accordingly, it is intended to embrace all such alternatives, modifications, variations, and combinations as fall within the spirit and broad scope of the specification.

While the title, abstract, and claims initially presented are drawn to particular inventive elements, it is intended that other inventive elements disclosed herein will be the subject of their own corresponding claims.

The teachings that has been cited and incorporated herein are offered by way of example, and not limitation, of the underlying foundation of knowledge and skill that is available to a practitioner. Since the art is well established, many of the features, components, and methods found therein may be incorporated, as suggested herein, in a preferred embodiment; and since other modifications and changes varied to fit particular requirements and environments will be apparent to those skilled in the art, the inventions are not limited to the embodiments set forth or suggested herein. It is to be understood that the inventions are not limited thereby. It is also to be understood that the specific details shown are merely illustrative, and that the inventions may be carried out in other ways without departing from the broad spirit and scope of the specification.

What is claimed is:

1. A method of replaying a portion of a video comprising the steps of:

receiving, during a playing of a video, a replay request to replay a portion of a video;

storing a request position of the playing of the video responsive to the replay request;

skipping, responsive to the replay request, the video to a replay position that is responsive a preestablished replay preference;

enabling a playing of subtitles;

playing the video and the subtitles from the replay position; and discontinuing the playing of subtitles responsive to the request position.

2. The method of claim 1, wherein the replay request is a voice command.

3. The method of claim 1, wherein the skipping is responsive to a preestablished replay preference amount adjusted by segment information.

4. The method of claim 1, wherein the skipping is increased by a contemporaneous subsequent replay request.

5. The method of claim 1, wherein the skipping is responsive to a system preestablished replay preference amount, adjusted by segment information, and increased by a contemporaneous subsequent replay request.

6. The method of claim 1, wherein the replay request is a voice command; and wherein he subtitles played are in a language different from an audio language played.

7. A method of replaying a portion of a video comprising the steps of:

receiving during a playing of the video a replay request, from a user actuation of a single replay request control element, to replay a portion of the video;

replaying, in response to the user actuation of a single replay request control element, the video from a replay position in the video preceding an initial position in the video at which the replay request was received; and enabling a playing of subtitles for a portion of the video subsequent to the replay position.

8. The method of claim 7 wherein the replay position precedes the initial position by a predetermined period of playback time.

9. The method of claim 8 wherein the predetermined period of playback time is established by the user.

10. The method of claim 8 wherein the predetermined period of playback time is increased by a contemporaneous subsequent replay request.

11. The method of claim 7 wherein the portion of the video in which subtitles are played corresponds to the portion of the video between the replay position and the initial position.

12. The method of claim 7 wherein the portion of the video in which subtitles are played corresponds to a predetermined period of playback time from the replay position.

13. A system for playing a video comprising:

a replay device for playing the video;

a single replay request control element;

the replay device replaying the video from a replay position preceding an initial position at which a replay request was received from a user actuation of the single replay request control element; and the replay device playing subtitles during a portion of the video subsequent to the replay position.

14. The system defined by claim 13 wherein the replay position precedes the initial position by a predetermined period of playback time.

15. The system defined by claim 14 wherein the predetermined period of playback time is established by the user.

16. The system defined by claim 14 wherein the predetermined period of playback time is increased by a contemporaneous subsequent replay request.

17. The system defined by claim 13 wherein the portion of the video in which subtitles are played corresponds to the portion of the video between the replay position and the initial position.

18. The system defined by claim 13 wherein the portion of the video in which subtitles are played corresponds to a predetermined period of playback time from the replay position.

19. A system for playing a laser readable disc containing a video comprising:

a replay device for playing the laser readable disc containing the video;

a single replay request control element;

the replay device replaying the video from a replay position preceding an initial position at which a replay request was received from a user actuation of the single replay request control element; and the replay device playing subtitles during a portion the video subsequent to the replay position.

20. The system defined by claim 19 wherein the replay position precedes the initial position by a predetermined period of playback time.

21. The system defined by claim 20 wherein the predetermined period of playback time is established by the user.

22. The system defined by claim 20 wherein the predetermined period of playback time is increased by a contemporaneous subsequent replay request.

23. The system defined by claim 19 wherein the portion of the video in which subtitles are played corresponds to the portion of the laser readable disc containing a video between the replay position and the initial position.

24. The system defined by claim 19 wherein the portion of the laser readable disc containing a video in which subtitles are played corresponds to a predetermined period of playback time from the replay position.

25. The system defined by claim 19 wherein the laser readable disc is a DVD.

26. A method of replaying a portion of a video comprising the steps of:

receiving, during a playing of the video, a replay request to replay a portion of the video;

skipping, responsive to the replay request, the video to a replay position that is responsive to a preestablished replay preference;

enabling, responsive to the replay request, a playing of subtitles;

playing the video and the subtitles responsive to the replay position; and discontinuing, responsive to the replay request, the playing of subtitles.

27. The method of claim 26, wherein the replay request is a voice command.

28. The method of claim 26 wherein the skipping is responsive to a system preestablished replay preference adjusted by segment information.

29. The method of claim 26, wherein the skipping is responsive to a contemporaneous subsequent replay request.

30. The method of claim 26, wherein the subtitles played are in a language different from an audio language played.

31. The method of claim 26, wherein a discontinuing of the playing of subtitles is responsive to the replay request adjusted by a system defined amount.

32. A system capable of replaying a portion of a video comprising:

a user interface means for receiving, during a playing of the video, a replay request to replay a portion of the video;

a random accessing means for skipping, responsive to the replay request, the video to a replay position that is responsive to a preestablished replay preference;

a processing means for enabling, responsive to the replay request, a playing of subtitles; playing the video and the subtitles responsive to the replay position; and discontinuing, responsive to the replay request, the playing of subtitles.

33. The system of claim 32, wherein the user interface means comprises a remote control device.

34. The system of claim 32, wherein the skipping is responsive to a user preestablished replay preference adjusted by segment information.

35. The system of claim 32 wherein the skipping is responsive to a contemporaneous subsequent replay request.

36. The system of claim 32 wherein the subtitles played are in a language different from an audio language played.

* * * * *